(12) United States Patent
Chen et al.

(10) Patent No.: US 11,764,669 B2
(45) Date of Patent: Sep. 19, 2023

(54) POWER CONVERTER

(71) Applicants: The Trustees of Princeton University, Princeton, NJ (US); pSemi Corporation, San Diego, CA (US)

(72) Inventors: Minjie Chen, Princeton, NJ (US); Yenan Chen, Princeton, NJ (US); David Giuliano, San Diego, CA (US)

(73) Assignees: The Trustees of Princeton University, Princeton, NJ (US); pSemi Corporation, San Diego, CA (US)

( * ) Notice: Subject to any disclaimer, the term of this patent is extended or adjusted under 35 U.S.C. 154(b) by 17 days.

(21) Appl. No.: 17/131,150

(22) Filed: Dec. 22, 2020

(65) Prior Publication Data

US 2022/0103066 A1 Mar. 31, 2022

Related U.S. Application Data

(60) Provisional application No. 63/086,002, filed on Sep. 30, 2020.

(51) Int. Cl.
*H02M 3/07* (2006.01)
*H02M 3/158* (2006.01)
*H02M 1/00* (2006.01)

(52) U.S. Cl.
CPC ............. *H02M 3/07* (2013.01); *H02M 1/007* (2021.05); *H02M 3/158* (2013.01)

(58) Field of Classification Search
CPC ...... H02M 3/07; H02M 1/007; H02M 1/0095; H02M 3/158
See application file for complete search history.

(56) References Cited

U.S. PATENT DOCUMENTS

| | | | |
|---|---|---|---|
| 8,723,491 B2 | 5/2014 | Giuliano | |
| 8,724,353 B1 | 5/2014 | Giuliano et al. | |
| 8,860,396 B2 | 10/2014 | Giuliano | |
| 9,634,577 B2 | 4/2017 | Perreault | |
| 9,742,266 B2 | 8/2017 | Giuliano et al. | |
| 9,831,776 B1 * | 11/2017 | Jiang ..................... | H02M 1/15 |
| 9,882,471 B2 | 1/2018 | Giuliano | |
| 9,917,517 B1 | 3/2018 | Jiang et al. | |
| 10,193,441 B2 | 1/2019 | Giuliano | |
| 10,211,733 B1 | 2/2019 | Jiang et al. | |
| 10,381,924 B2 | 8/2019 | Giuliano | |
| 10,389,235 B2 | 8/2019 | Giuliano | |
| 11,258,371 B2 * | 2/2022 | Giuliano ............ | H02M 1/4208 |
| 2006/0087295 A1 * | 4/2006 | Jang ................... | H02M 3/1584 323/222 |
| 2008/0205098 A1 * | 8/2008 | Xu ...................... | H02M 3/1584 363/45 |
| 2016/0308443 A1 * | 10/2016 | Crossley ............... | H02M 3/158 |

(Continued)

OTHER PUBLICATIONS

Jong, O., "Multi Resonant Switched-Capacitor Converters", Master Thesis of the Virginia Polytechnic Institute and State University, Feb. 28, 2019, 98 pages.

(Continued)

*Primary Examiner* — Adolf D Berhane
*Assistant Examiner* — Afework S Demisse
(74) *Attorney, Agent, or Firm* — Finnegan, Henderson, Farabow, Garrett & Dunner LLP

(57) ABSTRACT

Subject matter disclosed herein may relate to power converters, and may more particularly relate to multi-stage hybrid power converters, for example.

57 Claims, 48 Drawing Sheets

(56) References Cited

U.S. PATENT DOCUMENTS

| | | |
|---|---|---|
| 2019/0273436 A1 | 9/2019 | Tang et al. |
| 2020/0177082 A1* | 6/2020 | Giuliano ............... H02M 3/158 |
| 2020/0177083 A1 | 6/2020 | Zambetti |
| 2021/0083571 A1 | 3/2021 | Giuliano et al. |

OTHER PUBLICATIONS

International Search Report and Written Opinion dated Jan. 21, 2022 in corresponding International Application No. PCT/US/2021/052914. 9 pages.

* cited by examiner

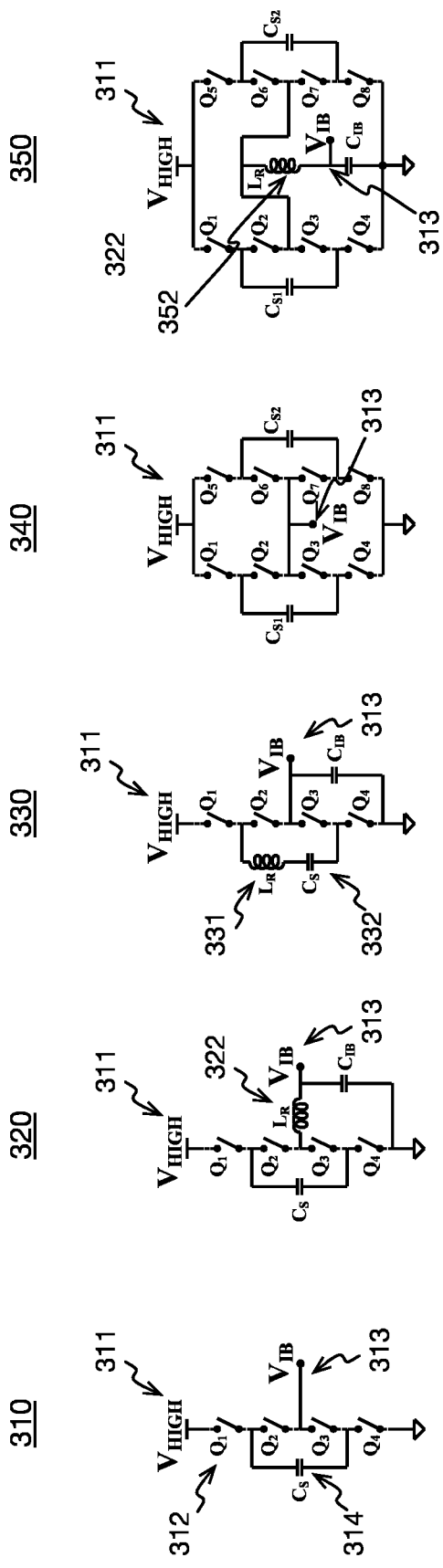

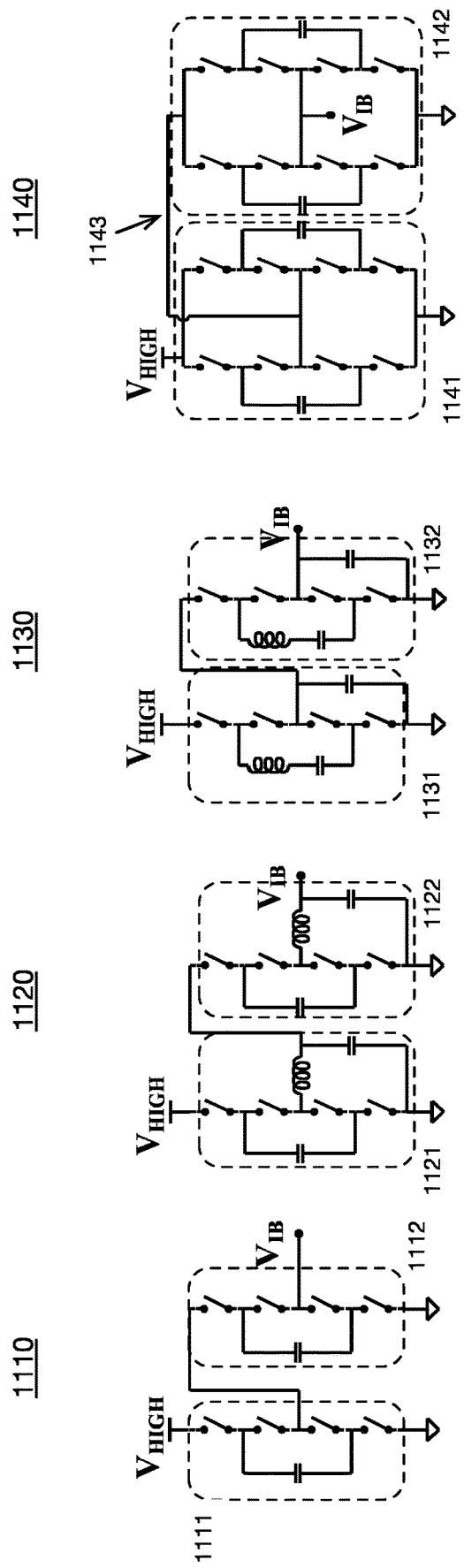

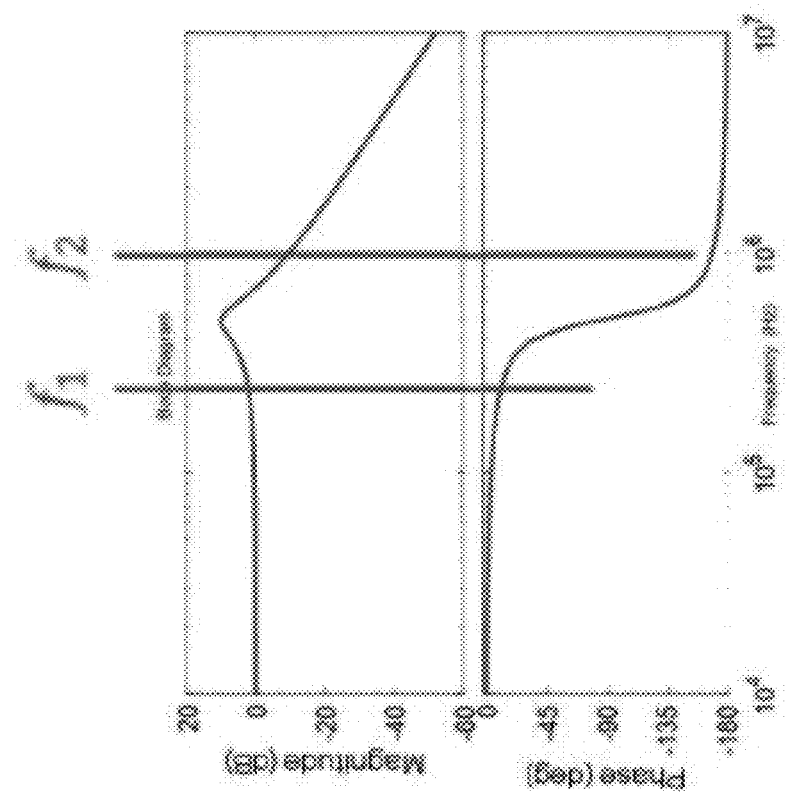
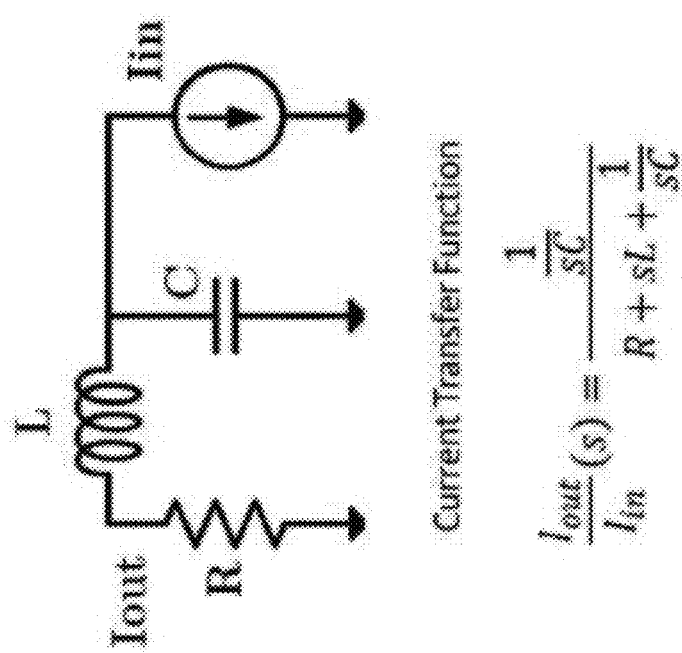
FIG. 14c

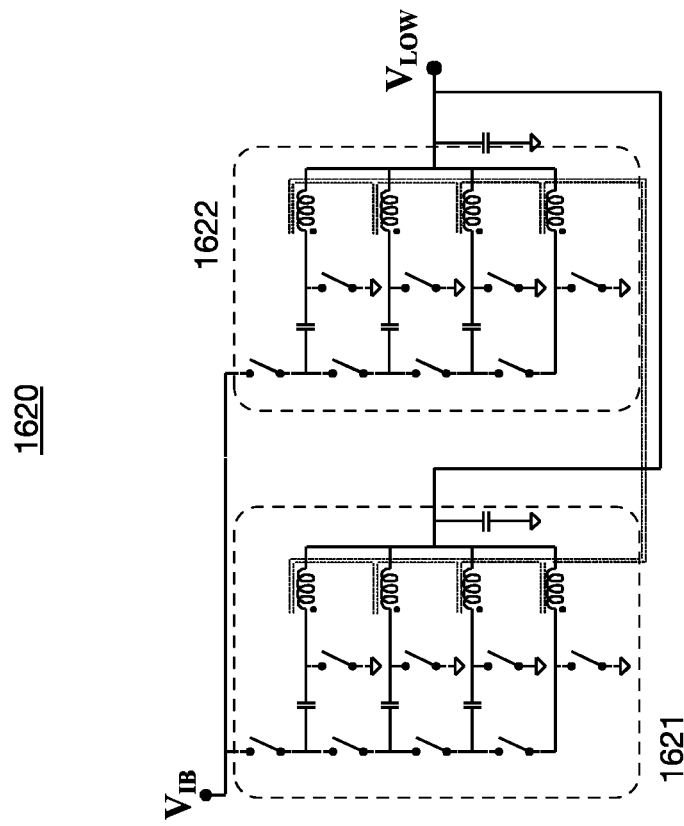
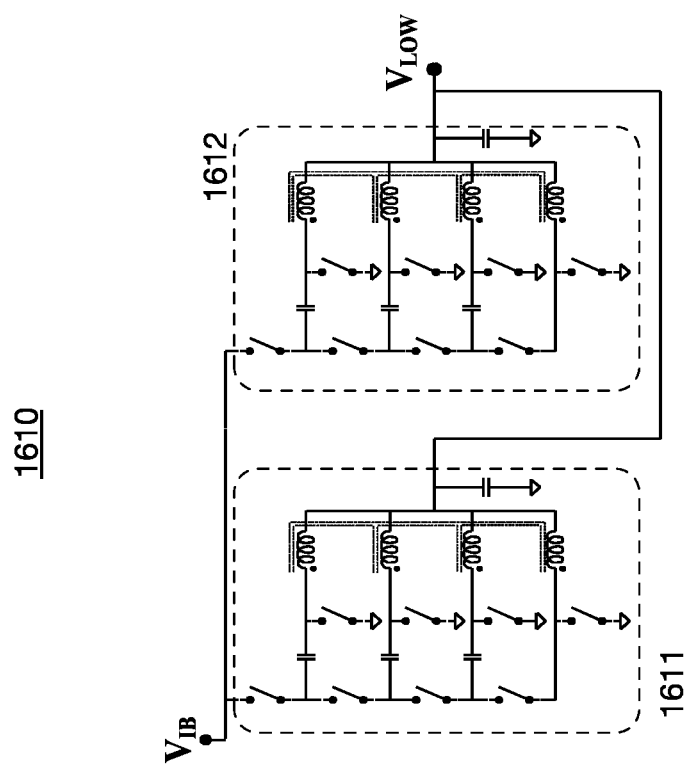
FIG. 16B
FIG. 16A

POWER CONVERTER

BACKGROUND

Field

Subject matter disclosed herein may relate to power converters, and may more particularly relate to hybrid power converters, such as multi-stage hybrid power converters, for example.

Information

Modern electronic devices may incorporate electronic components that may have fairly exacting operating parameters with respect to supply voltages, for example. As such, it may be advantageous to supply components with a quality and stable power source. Many electronic devices include power converters of some type to help provide appropriate power to various components. As power needs for various electronic device types continue to change due to continual development of electronic devices of all sorts, power converters that may achieve high performance, high voltage conversion ratio, low output current ripple and/or fast dynamic response, to name a few example parameters, would be advantageous.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 3a-3e depict schematic diagrams illustrating example 2:1 voltage divider arrangements in accordance with one or more embodiments.

FIGS. 11a-11d depict schematic diagrams illustrating example 4:1 switched capacitor-type voltage divider arrangements in accordance with one or more embodiments.

FIG. 14c depicts a schematic diagram illustrating an example low pass current filter in accordance with one or more embodiments.

FIGS. 16a and 16b depict schematic diagrams illustrating example regulator arrangements in accordance with one or more embodiments.

Figure 1:
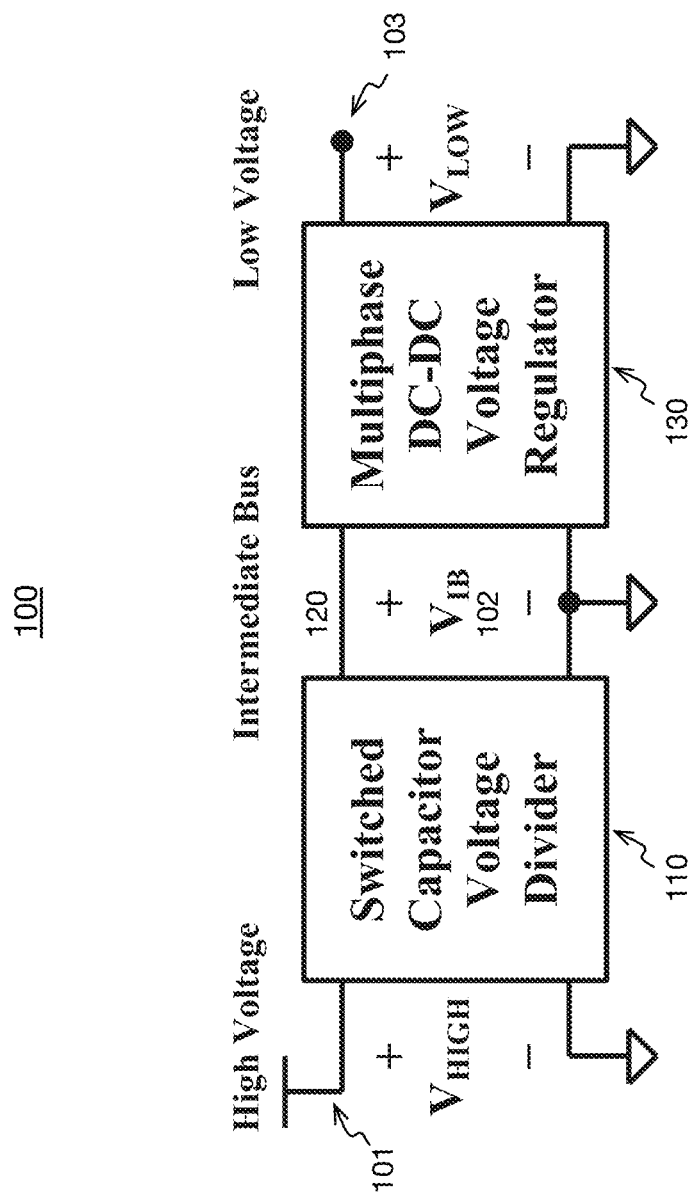
FIG. 1 depicts a schematic block diagram of an example multi-stage hybrid power converter comprising an example switched capacitor-type voltage divider and an example series buck converter voltage regulator in accordance with one or more embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

Higher performance microprocessors may include billions of transistors, may switch at several gigahertz and/or may consume hundreds of amperes of current at relatively lower voltages (e.g., less than 1.0 V in some circumstances), for example. Further, power consumption characteristics of modern microprocessors are growing with increasing computing performance, leading to challenges with respect to on-board point-of-load (PoL)-type converters and/or data center power delivery facilities, for example. Higher efficiency, higher power density and higher bandwidth PoL-type converters may be needed to support hundreds of amperes of current (e.g., greater than 50.0 A in some circumstances) being delivered at relatively lower voltages (e.g., less than 1.0 V). Such PoL-type converters may operate with relatively higher voltage conversion ratios (e.g., greater than 10:1) to support current and/or future high performance microprocessors. Also, the data center industry may be undergoing a transition from a 12 V bus architecture to a 48 V bus due to increasing server power consumption, which may allow for improved overall efficiency and/or lower cost. Delivering power at 48 V, for example, may also leverage existing 48 V telecom power ecosystems. Power converters that may provide a lower voltage output (e.g., less than 1.0 V), regulated at relatively higher bandwidths, while drawing energy from a relatively higher, wider-ranging input voltage (e.g., between 40.0 V to 60.0 V) may be particularly advantageous for supporting higher performance microprocessors and/or for supporting telecommunication loads, to name a couple example applications. Size, cost, and/or performance advantages provided via integration make it desirable to design modular and/or miniaturized dc-dc converters that may be relatively easily scaled in size and/or capabilities for a variety of applications having different voltage and/or current needs.

One possible approach to power conversion may include use of a switched-mode power converter in which energy may be transferred from a converter input to a converter output via one or more inductors and/or one or more coupled inductors. Such example magnetics-based topologies may include, for example, synchronous buck converters, interleaved synchronous buck converters, three-level buck converters, etc. Implementations of this type may efficiently provide a regulated output from a variable input voltage with relatively higher-bandwidth control of an output voltage. However, in some circumstances, designs of this type may not fit particular applications having relatively higher input voltages at least in part because switches of a buck-type converter may experience higher voltage stress and/or higher current stress. Because inductors may block higher voltages, inductor sizes may also be relatively large in such circumstances. Increasing operation frequency may allow for reduced component size and/or increased control bandwidth, for example. In some circumstances, relatively harder-switching operation of such types of converters may limit efficiency and/or power density that may be achieved and/or may provide challenges with respect to packaging.

Another possible power converter approach for relatively higher-voltage conversion ratio and/or relatively higher-output current applications may include a multi-stage intermediate bus architecture (IBA)-type converter. In a particular multi-stage IBA-type arrangement, a front-end stage may be implemented as a 48 V to 12 V transformer-based isolated dc-dc converter without regulation and/or switched-capacitor circuits, for example. A second stage may be implemented as a multi-phase buck converter, for example. In such a particular arrangement, switches of a front-end stage and/or a second stage may not need to handle both relatively higher voltage stress and relatively high current stress. However, isolation in a front-end stage of an IBA-type implementation may not be needed in at least some circumstances. Further, some transformer-based front-end implementations may suffer from lower control bandwidth due at least in part to inherent resonant behavior. Transformers in such implementations may also handle relatively higher flux while carry relatively higher current, thereby resulting in challenges with respect to efficiency, power density, and/or dynamic performance, for example.

An additional possible approach for a front-end stage of an IBA-type converter arrangement may include switched capacitor-type dc-dc converters. Such converter arrangements may be relatively well-suited for relatively higher density implementations. A switched capacitor-type arrangement may include a network of switches and/or capacitors, for example. Switches of a switched capacitor-type arrangement may be turned on and off periodically, for example, to cycle a network through different operation states. However, there may be a few issues to consider with respect to switched capacitor-type dc-dc converters. For example, at least some switched capacitor-type dc-dc converters may be characterized at least in part by relatively poor output voltage regulation in the presence of a varying input voltage and/or load. Also, for example, for at least some switched capacitor-type dc-dc converters, efficiency may drop relatively quickly as a conversion ratio differs from a more advantageous ratio.

A second stage for voltage regulation may be utilized in an IBA-type converter arrangement in light of at least some transformer-based dc-dc converters and/or switched capacitor-type dc-dc converters being unregulated. In a particular implementation, a second stage may be implemented as a multi-phase buck converter, for example, to regulate an output voltage received from an intermediate bus. In some implementations, decreasing an intermediate bus voltage may result in reduced switching losses, may enable relatively higher switching frequencies and/or may improve dynamic response of a multi-phase buck converter, for example. In particular implementations, to achieve a lower intermediate bus voltage, a front-end stage of an IBA-type converter may provide a relatively higher voltage conversion ratio. Because of relatively poor voltage regulation ability of at least some switched capacitor-type dc-dc converters, one or more switched capacitor-type converters having fixed step-down ratios may be cascaded in a front-end stage to provide a higher voltage conversion ratio, for example. Any of the various example approaches may lead to challenges in achieving advantageous levels of efficiency and/or power density for front-end stages and/or second stage voltage regulators in an IBA-type converter. A particular challenge may be to achieve higher efficiency and/or faster dynamic response with switched capacitor-type converters while maintaining relatively higher-bandwidth output regulation and/or relatively higher overall efficiency for current and/or future point-of-load applications, for example.

Embodiments described herein may relate to power converters and/or may relate more particularly to multi-stage hybrid power converters, for example. Power conversion arrangements and/or architectures may achieve relatively higher efficiency and higher power density and/or a relatively higher voltage conversion ratio by, for example, mixing operation of a switched capacitor-type voltage divider and a multiphase voltage regulator, for example. For particular implementations, power converter circuits may achieve relatively higher performance with relatively higher voltage conversion ratio while offering relatively lower output current ripple and/or relatively faster dynamic response. Embodiments may be particularly suitable for supplying power for microprocessors in data centers, telecom base stations and/or consumer electronics, for example, although embodiments are not limited in scope in these respects.

"Multi-stage hybrid power convertor" and/or the like refers to a power converter arrangement comprising at least first and second stages electrically coupled via a power path, wherein a first stage may include one or more switched capacitor-type voltage divider arrangements and wherein a second stage may include one or more voltage regulators. Further, "intermediate bus" and/or the like refers to an electrically conductive arrangement capable of providing a current from a first stage of a multi-stage power converter to a second stage of the multi-stage hybrid power converter.

As discussed in more detail herein, example embodiments may include, for example, a switched capacitor-type arrangement and may also include a regulator in an electrical configuration with the switched capacitor-type arrangement. An intermediate bus may electrically interconnect a switched capacitor-type arrangement of a first stage and one or more regulators of a second stage of a multi-stage hybrid power converter, for example. For example embodiments, a first node of the switched capacitor-type arrangement may be coupled to a voltage supply, wherein the switched capacitor-type arrangement may be operable to provide, via a second node of the switched capacitor-type arrangement, and intermediate voltage on the intermediate bus based at least in part on a particular topology. Further, for example embodiments, a regulator may receive the intermediate voltage at a first node of the regulator and the regulator may generate a regulated voltage at a second node of the regulator based at least in part on the particular topology. Various example implementations, topologies and/or arrangements are described herein, although embodiments are not limited in scope to the particular examples described herein.

As also discussed in more detail herein, example embodiments may include one or more controllers to generate one or more control signals to control various aspects of multi-stage hybrid power converter operation. For example, embodiments may include an arrangement to generate a periodic signal and/or may include a controller to generate one or more control signals to control at least a deadtime interval, for example, based, at least in part, on a periodic signal. Example embodiments may also include a multi-stage hybrid power converter comprising a resonant switched capacitor-type arrangement in a configuration with a voltage regulating arrangement to facilitate soft-charging and/or soft-switching of the multi-stage hybrid power converter based, at least in part, on an intermediate bus voltage coupled between a resonant switched capacitor-type arrangement and a voltage regulating arrangement. Further, an intermediate bus coupled between a resonant switched capacitor-type arrangement and a voltage regulating arrangement may facilitate charge sharing between at least some capacitors of a multi-stage hybrid power converter. In particular implementations, charge sharing may be implemented, at least in part, by way of a duty ratio implemented at least in part via a controller. As mentioned, various example implementations, topologies and/or arrangements are described herein although, again, embodiments are not limited in scope to the particular examples provided.

FIG. 1 depicts a schematic block diagram of an embodiment 100 of an example multi-stage hybrid power converter comprising an example switched capacitor-type voltage divider, such as switched capacitor voltage divider 110, and an example multi-phase voltage regulator, such as multi-phase voltage regulator 130. In a particular implementation, multi-phase voltage regulator 130 may comprise a series buck converter voltage regulator, for example. In a particular implementation, multi-stage hybrid power converter 100 may exhibit relatively higher step voltage conversion with relatively higher efficiency and/or relatively compact size. In an implementation, energy may be transferred from a high voltage (HV) node, such as HV node 101, to a low voltage (LV) node, such as LV node 103. For example, switched capacitor-type voltage divider 110 may convert an input voltage at HV node 101 to an intermediate bus voltage and/or may provide an intermediate bus voltage to intermediate bus 120. As utilized herein, "intermediate voltage" refers to a voltage that is smaller than an input voltage and greater than an output voltage for a particular power converter arrangement.

In an implementation, multi-phase voltage regulator 130 may receive an intermediate bus voltage via intermediate bus 120 and/or may provide a regulated output voltage at LV node 103. In an implementation, one or more example multi-stage hybrid power converters, such as multi-stage hybrid power converter 100, may be utilized to power one or more computer microprocessors, as mentioned. In an implementation, a voltage level at a high voltage node, such as HV node 101, may be between 40V-60V, for example. Also, for example, a voltage level of an intermediate voltage on an intermediate bus, such as intermediate bus 120, may be between 20V-30V. A voltage level at a low voltage node of a voltage regulator, such as node 103 of multi-phase voltage regulator 130, may be between 0.5V-3V, for example. Further, for example, a current level at a low voltage node of an example voltage regulator may be higher than 50 A, in an implementation. Of course, embodiments are not limited in scope in these respects.

In some circumstances, energy may be transferred from LV node 103 to HV node 101. For example, voltage regulator 130 may accept an input voltage at LV node 130 and may provide an intermediate bus voltage on intermediate bus 120 that may be higher than an input voltage. Further, in a particular implementation, switched capacitor-type voltage divider 110 may convert an intermediate bus voltage to an output voltage at HV node 101 which may be greater than the intermediate bus voltage.

In some implementations and/or circumstances, control and/or operation of switched capacitor-type voltage divider 110 and multi-phase voltage regulator 130 may be merged to create mutual advantages, as explained more fully below. In other implementations and/or circumstances, switched capacitor-type voltage divider 110 and/or multi-phase voltage regulator 130 may be substantially and/or completely decoupled from each other and/or may operate separately. Particular implementations of multi-stage hybrid-type power converters may be suitable to supply relatively lower voltages (e.g., between 0.5 V and 1.8 V) from relatively higher voltage levels with wide variation (e.g., 40.0 V to 60.0 V). Particular example implementations of multi-stage hybrid power converters may also be used to power digital circuits with dynamic voltage scaling and/or for supplying power to relatively lower power internet-of-things (IoT)-type devices, where wide output voltage ranges may be specified, for example.

Presented below are a number of example implementations of multi-stage hybrid-type power converter arrangements. Although particular implementations, arrangements, topologies, configurations, voltages, components, etc., are described, embodiments are not limited in scope to the particular examples presented.

Figure 2:
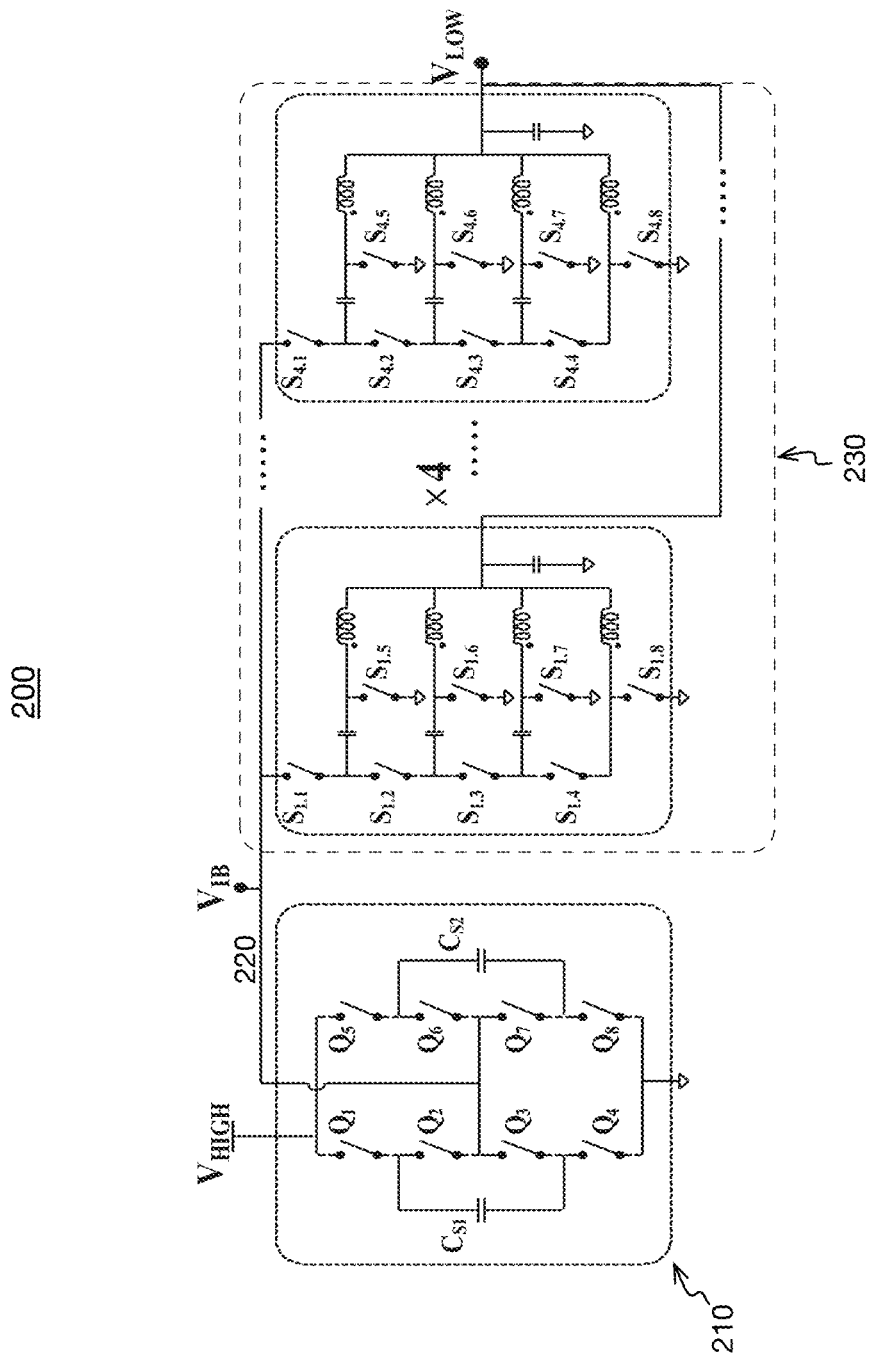
FIG. 2 depicts a schematic diagram illustrating an example multi-stage hybrid-type power converter comprising a switched capacitor-type voltage divider arrangement and a multiphase dc-dc voltage regulator arrangement in accordance with one or more embodiments.

FIG. 2 depicts an embodiment 200 of an example arrangement of a multi-stage hybrid-type power converter comprising a switched capacitor-type voltage divider arrangement, such as switched capacitor-type voltage divider 210, and a multiphase dc-dc voltage regulator arrangement, such as multi-phase voltage converter 230. Example advantages of different numbers of phases in multi-phase voltage converters are explained below in connection with FIG. 20. In a particular implementation, switched capacitor-type voltage divider arrangement 210 may be electrically coupled to multi-phase voltage converter 230 via an intermediate bus, such as intermediate bus 220. In a particular implementation, switched capacitor-type voltage divider 210 may comprise a pair of 2:1 switched capacitor voltage dividers and/or multi-phase voltage converter 230 may comprise four four-level series capacitor buck converters. Also, in a particular implementation, intermediate bus 220 may be floating (i.e., substantially no capacitive decoupling to a reference potential).

FIGS. 3a-3e depict example embodiments of several 2:1 voltage divider arrangements. In particular implementations, 2:1 voltage divider arrangements may be utilized as first stages in multi-stage hybrid power converters, such as multi-stage hybrid power converter 100 depicted in FIG. 1. For the examples depicted in FIGS. 3a-3e, a ratio of a voltage at a higher voltage node, such nodes 311, and a voltage at an intermediate bus node, such as nodes 313, may be approximately 2:1, for example. FIG. 3a depicts an example 2:1 switched capacitor-type voltage divider, such as switched capacitor-type voltage divider 310 comprising four switches 312 and one capacitor 314 for a particular implementation. FIG. 3b and FIG. 3c depict two example types of 2:1 resonant voltage divider arrangements individually comprising four switches, two capacitors, and one inductor. For example, FIG. 3b depicts an example 2:1 resonant switched capacitor voltage divider, such as resonant switched capacitor voltage divider 320 comprising an inductor 322 at an output node 313 that may be electrically coupled to an intermediate voltage bus; FIG. 3c depicts an example 2:1 resonant switched capacitor voltage divider arrangement, such as 2:1 resonant switched capacitor voltage divider including an inductor 331 connected in series with a capacitor 332; FIG. 3d depicts an example two-phase interleaved 2:1 switched capacitor voltage divider arrangement, such as two-phase interleaved 2:1 switched capacitor voltage divider 340 comprising eight switches and two capacitors, in a particular implementation. Further, FIG. 3e depicts an example two-phase interleaved 2:1 switched capacitor resonant voltage divider arrangement, such as two-phase interleaved 2:1 switched capacitor resonant voltage divider 350 comprising a commonly shared resonant inductor 352. For example arrangement 350, resonant inductor 352 may shape current in a sinusoidal manner and/or may create soft-charging and/or zero current switching opportunities. Also, for particular implementations of example arrangement 350, a string of capacitors may be connected at a high voltage side of voltage divider 350.

Figure 4C:
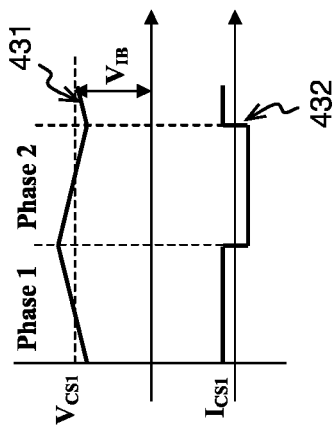
FIGS. 4a-4c depict example capacitor voltage and/or current waveforms for example voltage divider arrangements in accordance with one or more embodiments.
Figure 4B:
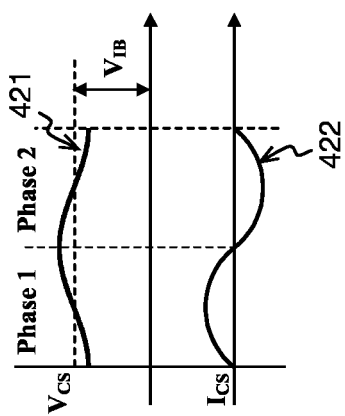
Figure 4A:
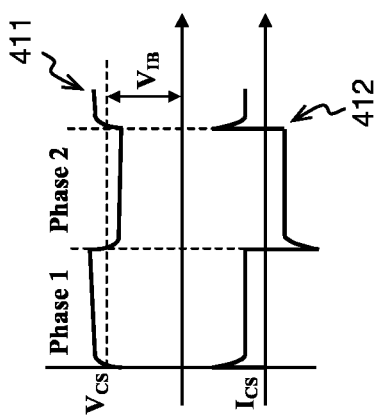

FIGS. 4a-4c depict example capacitor voltage and/or current waveforms with a resistive load at an intermediate bus for several example voltage divider arrangements that may be utilized as first stages of a multi-stage hybrid power converter. FIG. 4a, for example, depicts an example capacitor voltage waveform 411 and an example capacitor current waveform 412 for an example 2:1 switched capacitor voltage divider arrangement, such as example voltage divider 310, for example. FIG. 4b depicts an example capacitor voltage waveform 421 and an example capacitor current waveform 422 for an example 2:1 resonant switched capacitor voltage divider, such as 2:1 switched capacitor resonant voltage dividers 320 and/or 330. FIG. 4c depicts an example capacitor voltage waveform 431 and an example capacitor current waveform 432 for an example 2:1 two-phase interleaved 2:1 switched capacitor voltage divider, such as two-phase interleaved 2:1 switched capacitor voltage dividers 340 and/or 350. As may be discerned via example waveforms depicted in FIGS. 4a-4c, voltage dividers 310-350, for example, may be controlled in a similar manner. For example, switches $Q_1(Q_6)$ and $Q_3(Q_8)$ may be in an ON (i.e., electrically conductive) state while switches $Q_2(Q_5)$ and $Q_4(Q_7)$ may be in an OFF state (i.e., substantially electrically non-conductive) during Phase 1. Also, for example, switches $Q_1(Q_6)$ and $Q_3(Q_8)$ may be in an OFF state while switches $Q_2(Q_5)$ and $Q_4(Q_7)$ maya be in an ON state during Phase 2. In some implementations and/or circumstances, switched capacitors may be hard charged with relatively higher current spikes. In other implementations and/or circumstances, switched capacitors may be soft charged with sinusoidal, trapezoidal, or square wave current waveforms (e.g., through an inductor which may function as a current source).

Figure 5:
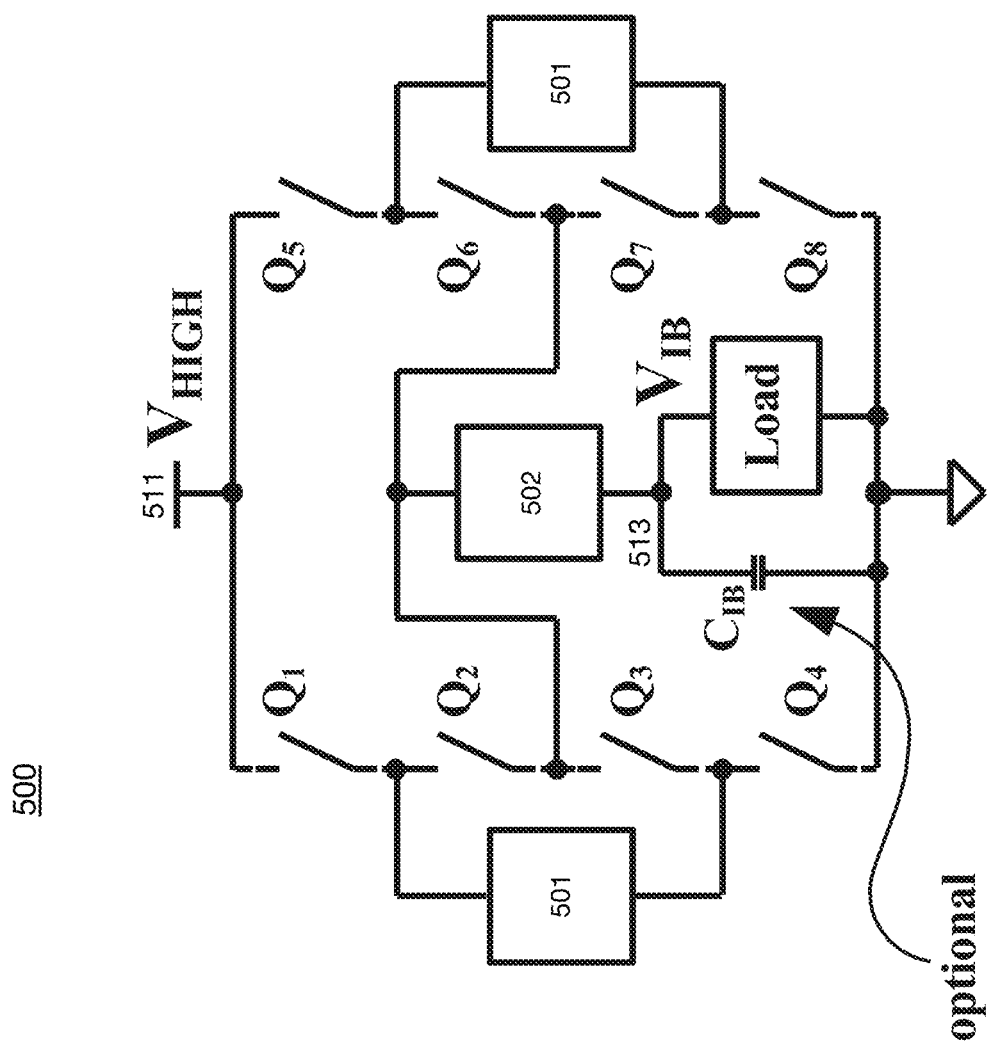
FIG. 5 depicts an schematic block diagram of an example 2:1 voltage divider arrangement in accordance with one or more embodiments.

FIG. 5 depicts an example generalized schematic block diagram of an embodiment 500 of an example 2:1 switched capacitor voltage divider arrangement. In particular implementations, 2:1 voltage divider 500 may include example arrangement blocks (i.e., building blocks) 501 and 502, discussed more fully below. In an implementation, capacitor $C_{IB}$ may be approximately at least 5 times smaller than other capacitors in the system. Of course, embodiments are not limited in scope in this respect. For some implementations, capacitor $C_{IB}$ may be eliminated, for example.

As depicted in FIG. 5, generalized 2:1 switched capacitor voltage divider arrangement 500, which may be utilized in a first stage of a multi-stage hybrid power converter, for example, may include multiple switches and may further include one or more capacitors and/or inductors. For example, voltage divider arrangement 500 may include eight switches $Q_1$-$Q_8$ and may further include one or more capacitors and/or inductors. Arrangement blocks 501 and/or 502, for example, may include one or more capacitors and/or inductors, as discussed more fully below.

In a particular implementation, during operations, a first subset of switches, such as switches $Q_1$, $Q_3$, $Q_6$ and/or $Q_8$, may be in an off state while a second subset of switches, such as switches $Q_2$, $Q_4$, $Q_5$ and/or $Q_7$ may be in an on state, and vise-versa. Also, for a particular implementation, subsets of switches, such as the first and second subsets mentioned above, may cycle on and off at a specified frequency. In particular implementations, switches, such as one or more of switches $Q_1$-$Q_8$, may comprise transistors. However, embodiments are not limited in scope in this respect. For example, some implementations may utilize other types of switching technologies such as MEMS and/or phase change material-based switches.

For particular implementations, a multi-stage hybrid power converter circuit, such as example converter arrangement 500, may include at least two operating configurations and/or states and/or one dead time configuration and/or state. For example, a dead time state may be cycled through between at least two operating states. In an implementation, approximately no power flows during a dead time state. Also, in an implementation, power may flow in either direction. For example, for circumstances wherein power flows from a higher voltage node, such as node 511, to a load, such as at node 513, a voltage may be reduced by a factor of approximately two. Further, for circumstances wherein power flows from a load, such as at node 513, to a higher voltage node, such as node 511, a voltage may be increased by a factor of approximately two.

Figure 6C:
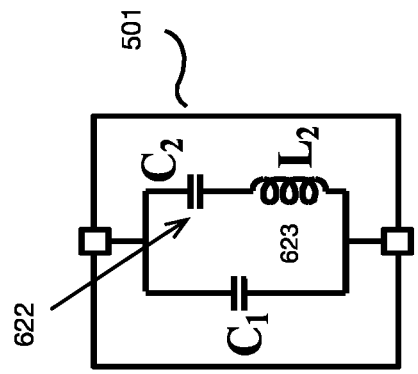
FIGS. 6a-6c depict schematic diagrams of example first stage arrangement blocks in accordance with one or more embodiments.
Figure 6B:
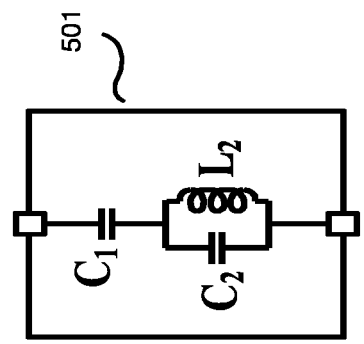
Figure 6A:
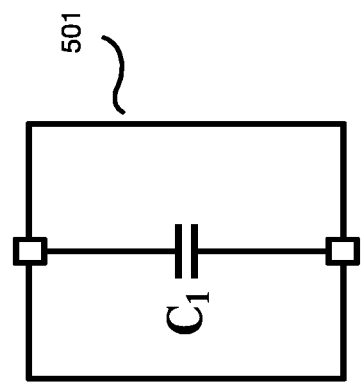

FIGS. 6a-6c depict example schematic diagrams of particular implementations of example arrangement block 501. For example, as depicted at FIG. 6a, arrangement block 501 may comprise a capacitor, such as capacitor $C_1$. Further, as depicted at FIG. 6b, arrangement block 501 may comprise a parallel-connected capacitor $C_2$ and inductor $L_2$ pair electrically coupled in series with a capacitor $C_1$. Additionally, as depicted at FIG. 6c, arrangement block 501 may comprise a series-connected capacitor $C_2$ and inductor $L_2$ electrically coupled in parallel with a capacitor $C_1$. Of course, these are merely example implementations for arrangement block 501, and embodiments are not limited in scope in these respects.

Figure 7C:
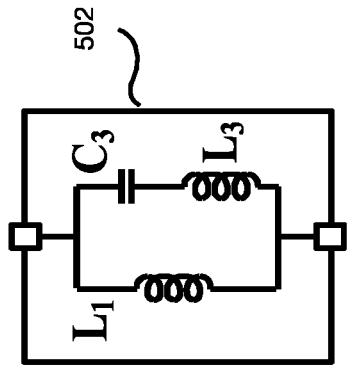
FIGS. 7a-7c depict schematic diagrams of example first stage arrangement blocks in accordance with one or more embodiments.
Figure 7B:
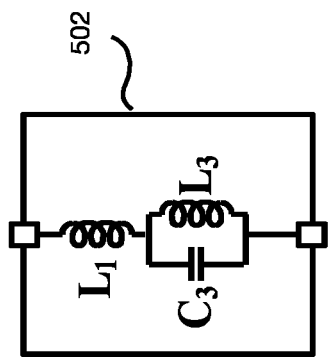
Figure 7A:
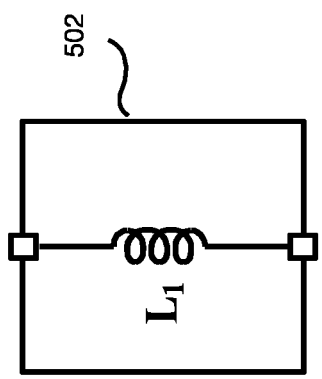

FIGS. 7a-7c depict example schematic diagrams of particular implementations of example arrangement block 502. For example, as depicted at FIG. 7a, arrangement block 502 may comprise an inductor, such as inductor $L_1$. Additionally, as depicted at FIG. 7b, arrangement block 502 may comprise a parallel-connected capacitor $C_3$ and inductor $L_3$ pair electrically coupled in series with an inductor $L_1$. Further, as depicted at FIG. 7c, arrangement block 502 may comprise a series-connected capacitor $C_3$ and inductor $L_3$ electrically coupled in parallel with an inductor $L_1$. Of course, these are merely example implementations for arrangement block 502, and embodiments are not limited in scope in these respects.

As seen in FIG. 6a and FIG. 7a, particular example multi-stage hybrid power converter arrangements may be implemented using a capacitor for arrangement block 501 and an inductor for arrangement block 502. However, more complex circuits, such as example implementations described herein in connection with FIGS. 6b-6c and/or FIGS. 7b-7c, for example, may provide advantages not achievable using relatively more simple capacitor and/or inductor arrangements for blocks 501 and/or 502. For example, more complex circuits may shape current as it flows through switches and/or may shape voltages across switches in particular implementations.

For example, implementing a capacitor for block 501 and/or an inductor for block 502, current and/or voltages may be sinusoidal. However, a more advantageous shape may be square wave in at least some circumstances. For example, a square wave may have a lower RMS value, so a square wave-type current may result in relatively lower power losses than a sinusoidal-type current. Also, for example, a square wave may have a lower peak value, and therefore a square wave-type voltage may result in reduced voltage stress placed across the switches which may, for example, allow for the use of relatively lower voltage-rated switches. In some circumstances, lower voltage-rated switches may provide improved performance, such as improved efficiency, reduced die area utilization, reduced cost and/or size, etc.

For a particular implementation including an example switched capacitor-type voltage divider arrangement 500 utilizing block 501 from FIG. 6a and utilizing block 502 from FIG. 7a, an example capacitor voltage and/or current waveform may resemble example capacitor voltage waveform 421 and/or example current waveform 422 depicted in FIG. 4b. As may be seen in FIG. 4b, capacitor voltage and/or current waveforms may comprise sinusoidal waveforms. Adding more capacitors and inductors into arrangement blocks 501 and/or 502 may create lower impedance current paths for different frequencies and/or may provide an advantage of ripple cancellation or ripple suppression, for example.

Figure 8:
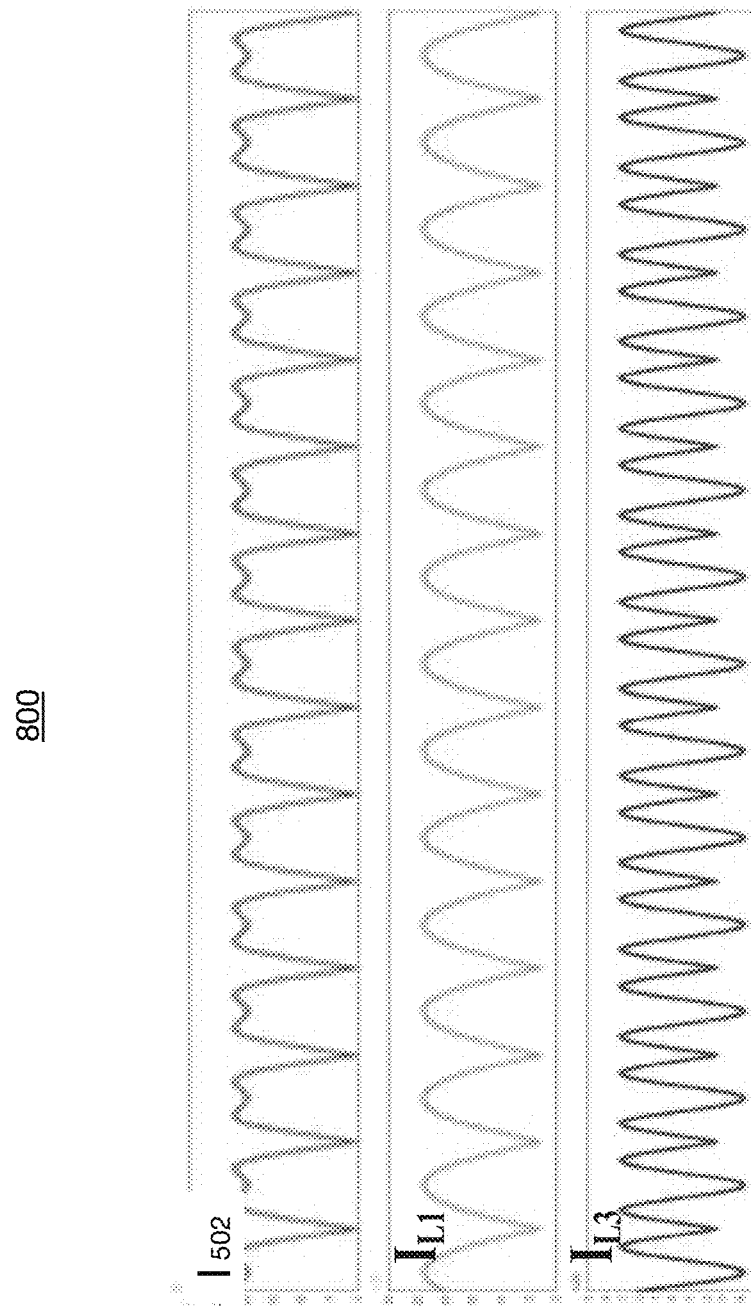
FIG. 8 depicts example current waveforms for a particular implementation of a 2:1 switched capacitor-type voltage divider arrangement in accordance with one or more embodiments.

FIG. 8 depicts example current waveforms 800 for a particular implementation of a 2:1 switched capacitor voltage divider, such as 2:1 switched capacitor voltage divider 500, utilizing FIG. 6a (i.e., a single capacitor $C_1$) as block 501 and FIG. 7c (i.e., pair of series-connected capacitor $C_3$ and inductor $L_3$ in parallel with an inductor $L_1$ as block 502. In an implementation, a frequency of a current $I_{L3}$ through inductor $L_3$ may be approximately three times of the frequency of a current $I_{L1}$ through inductor $L_1$. As depicted in example waveforms 800, a positive peak of $I_{L1}$ may be compensated by a negative peak of $I_{L3}$. Further, in an implementation, a current 1502 through example block 502 depicted in FIG. 7c may exhibit relatively lower peak and/or RMS values, which may also reduce conduction loss for one or more switches of example arrangement 500.

Figure 9B:
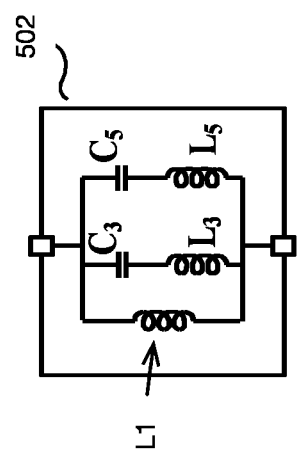
FIGS. 9a and 9b depict schematic diagrams illustrating additional example implementations of first stage arrangement blocks in accordance with one or more embodiments.
Figure 9A:
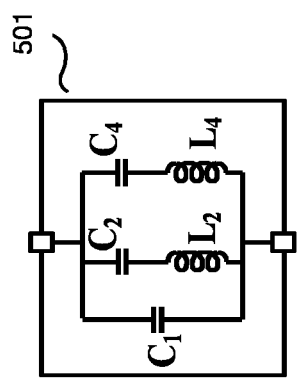

FIGS. 9a and 9b depict additional example implementations of arrangement blocks 501 and 502. For example, FIG. 9a depicts a further example implementation of arrangement block 501 including a capacitor, such as capacitor $C_1$, in parallel with two pairs of series-connected capacitors (e.g., $C_2$ and $C_4$) and inductors (e.g., $L_2$ and $L_4$). Further, FIG. 9b depicts a further example implementation of arrangement block 502 including an inductor $L_1$ in parallel with two pairs of series-connected capacitors (e.g., $C_3$ and $C_5$) and inductors (e.g., $L_3$ and $L_5$). FIG. 9a, for example, depicts a possible extension of an example implementation of arrangement block 501 depicted at FIG. 6c. Also, for example, FIG. 9b depicts a possible extension of an example implementation of arrangement block 502 depicted in FIG. 7c.

Figure 10:
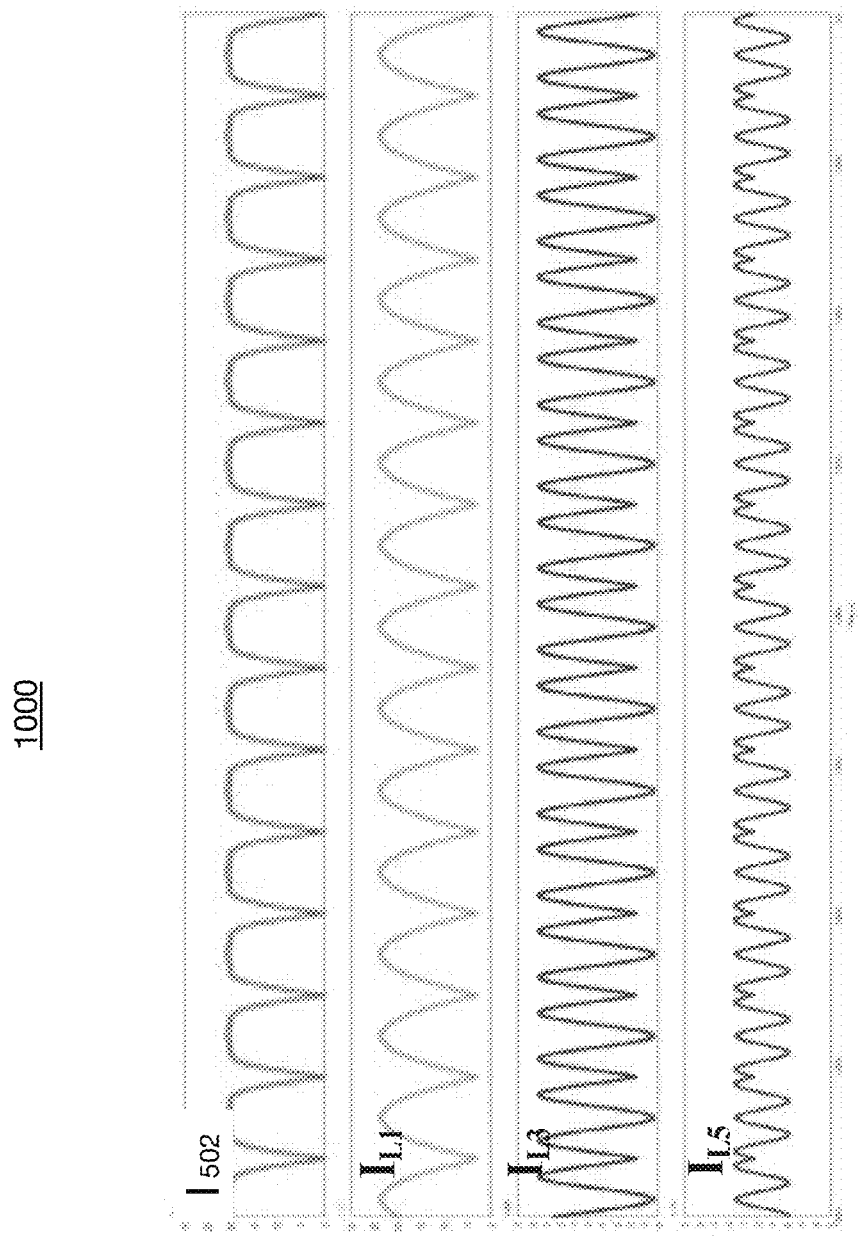
FIG. 10 depicts example current waveforms for an example 2:1 voltage divider in accordance with one or more embodiments.

FIG. 10 depicts example current waveforms 1000 for an example 2:1 voltage divider, such as example 2:1 switched capacitor voltage divider arrangement 500, utilizing example arrangement block 501 as depicted in FIG. 9a with example arrangement block 502 as depicted in FIG. 9b. For the present example, the frequencies of currents through inductors $L_5$ and $L_3$ (i.e., current waveforms ILS and $I_{L3}$ shown in FIG. 10) may be approximately five times and three times, respectively, of a frequency of a current through inductor $L_1$ (i.e., current waveform $I_{L1}$ depicted in FIG. 10). A positive peak of $I_{L1}$ may be compensated at least in part by a negative peak of $I_{L3}$. A positive peak of $I_{L3}$ may be further compensated at least in part by a negative peak of $I_{L5}$. In an implementation, an overall current of an example implementation of arrangement block 501 depicted at FIG. 9a may exhibit characteristics more closely resembling a trapezoidal wave current. For example, an overall current 1502 of an example implementation of arrangement block 502 depicted at FIG. 9b may exhibit characteristics more closely resembling a trapezoidal wave current with relatively lower peak and/or RMS values, in a particular implementation.

FIGS. 11a-11d depict several example implementations of 4:1 switched capacitor-type voltage divider arrangements, in accordance with one or more embodiments. For example, FIG. 11a depicts an example 4:1 switched capacitor-type voltage divider arrangement, such as switched capacitor-type voltage divider arrangement 1110, including two cascaded 2:1 voltage divider arrangements, such as 2:1 voltage divider arrangements 1111 and 1112. FIG. 11b, for example, depicts a particular implementation of a 4:1 resonant switched capacitor-type voltage divider arrangement, such as arrangement 1120, comprising two cascaded resonant 2:1 voltage divider arrangements, such as resonant 2:1 voltage divider arrangements 1121 and 1122. In a particular implementation, cascaded resonant 2:1 voltage divider arrangements 1121 and 1122 may have an inductor at their respective outputs. Further, FIG. 11c depicts an implementation 1130 of cascaded 4:1 resonant switched capacitor-type voltage divider arrangements, such as resonant switched capacitor-type voltage divider arrangements 1131 and 1132, wherein 4:1 resonant switched capacitor-type voltage divider arrangements 1131 and 1132 respectively include inductors connected in series with capacitors. Additionally, FIG. 11d depicts a particular implementation of a 4:1 two-phase interleaved switched capacitor-type voltage divider arrangement, such as arrangement 1140, including interleaved switched capacitor-type voltage divider arrangements, such as arrangements 1141 and 1142. It may be advantageous to utilize two or more interleaved switched capacitor-type voltage divider arrangements, such as arrangements 1141 and/or 1142. Also, for particular implementations, one or more capacitors may be installed at a higher voltage node, such as node 1143, electrically interconnecting the interleaved switched capacitor-type voltage divider arrangements, such as arrangements 1141 and 1142.

Figure 12C:
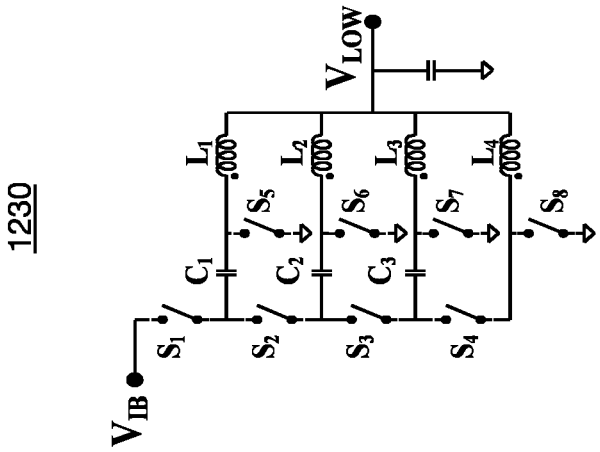
FIGS. 12a-12c depict schematic diagrams illustrating example regulator arrangements in accordance with one or more embodiments.
Figure 12B:
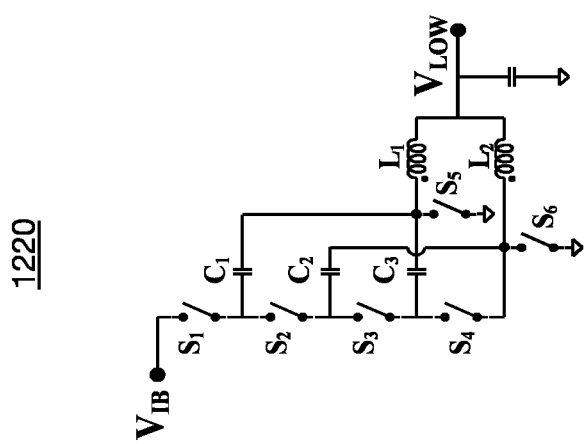
Figure 12A:
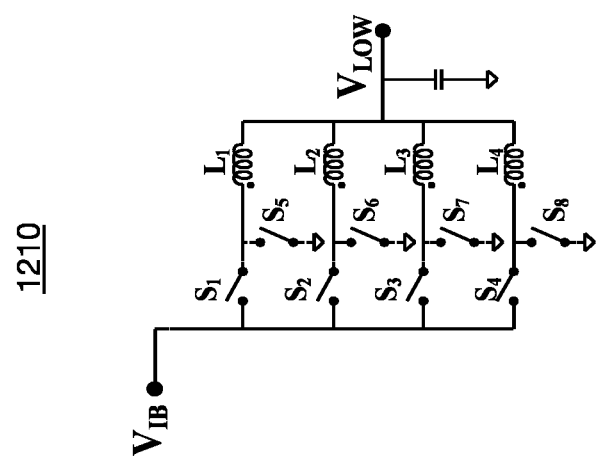

FIGS. 12a-12c depict example regulator arrangements, such as may be utilized in particular implementations as second stages of multi-stage hybrid power converter arrangements. In particular implementations, a multiphase dc-dc voltage regulator may be implemented as a multiphase buck converter and/or as a modified multi-phase buck converter, for example. Multi-phase buck arrangements may receive an intermediate bus voltage and may convert the intermediate bus voltage to a regulated lower voltage at a lower voltage node. For example, FIG. 12a depicts an example arrangement 1210 of a multiphase buck voltage regulator. In a particular implementation, arrangement 1210 may comprise a four-phase buck converter having coupled inductors. Also, for example, FIG. 12b depicts an example arrangement 1220 comprising a hybrid-switched-capacitor multi-inductor buck voltage regulator.

Further, FIG. 12c shows an example arrangement 1230 comprising a multiphase series-capacitor buck voltage regulator. In an implementation, a regulator arrangement, such as arrangement 1230, may comprise a four-phase series-capacitor buck converter with coupled inductors. In a particular implementation, a multi-phase series-capacitor buck converter, such as arrangement 1230, may receive an intermediate bus voltage $V_{IB}$ and may split the intermediate bus voltage with multiple series-stacked high side switches ($S_1$-$S_4$). In a particular implementation, a first node of a series capacitor, such as capacitor $C_1$, may be connected to a node of a high side switch, such as $S_1$, and a second node of the series capacitor may be connected to a node of a low side switch, such as $S_5$, in the same phase. In a particular implementation, high side switches, such as $S_1$, $S_2$, $S_3$ and $S_4$, and low side switches, such as $S_5$, $S_6$, $S_7$ and $S_8$, may be controlled by a pair of complementary gate driver signals such as may be generated by a controller, as discussed more fully below. In various implementation, inductors of a series-capacitor buck converter may or may not be coupled.

For particular implementations, a multi-phase series-capacitor buck converter may be characterized at least in part by relatively lower device voltage stress as compared to a multi-phase buck converter. For example, all the switches of a multi-phase buck converter, such as arrangement 1210 depicted in FIG. 12a, may block an entire intermediate bus voltage $V_{IB}$. On the other hand, for the example four-phase series-capacitor buck converter arrangement 1230 depicted in FIG. 12c, for example, voltage stress may be calculated as $V_{IB}/4$ for $S_1$, $S_5$-$S_8$, and $V_{IB}/2$ for $S_2$-$S_4$.

Figure 13C:
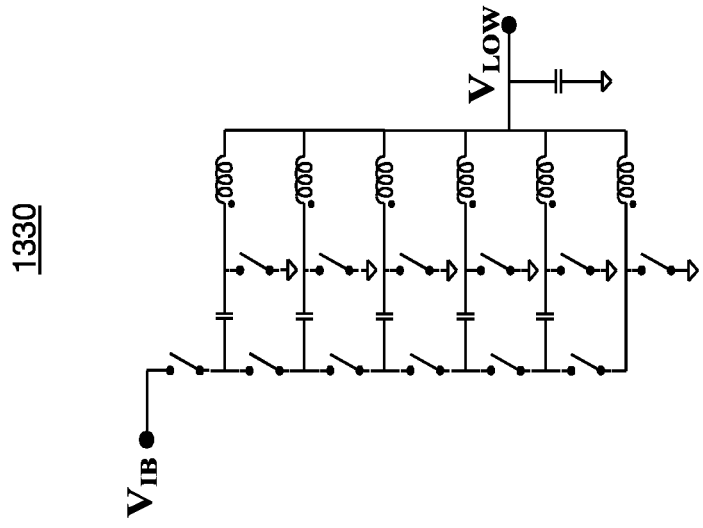
FIGS. 13a-13c depict schematic diagrams illustrating example series-capacitor buck converter arrangements in accordance with one or more embodiments.
Figure 13B:
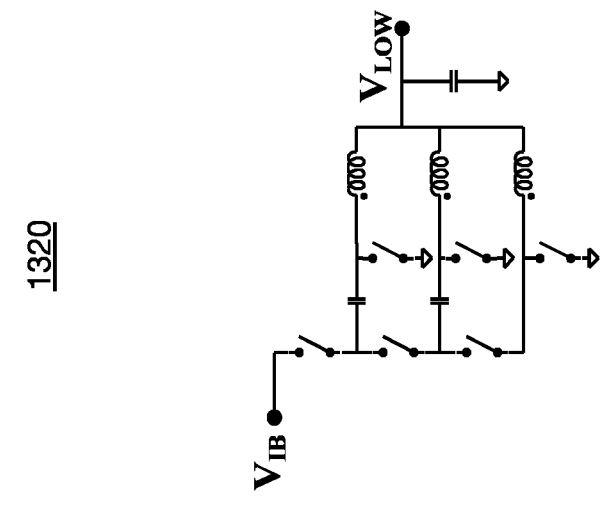
Figure 13A:
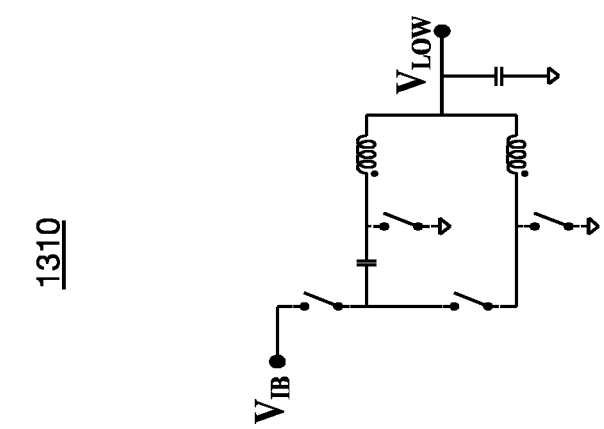

FIGS. 13a-13c depict several example series-capacitor buck converter arrangements. For example, FIG. 13a depicts an example series-capacitor buck converter arrangement 1310 comprising a two-phase series-capacitor buck converter. Further, FIG. 13b depicts an example series-capacitor buck converter arrangement 1320 comprising a three-phase series-capacitor buck converter, and FIG. 13c shows an example series-capacitor buck converter arrangement 1330 comprising a six-phase series-capacitor buck converter. For particular implementations, switches may be switched at $V_{IB}/2$ in a two-phase series-capacitor buck converter such as example two-phase series-capacitor buck converter arrangement 1310. Further, switches may be switched at $V_{IB}/3$ in a three-phase series-capacitor buck converter such as example three-phase series-capacitor buck converter arrangement 1320, and switches may be switched at $V_{IB}/6$ in a six-phase series-capacitor buck converter such as six-phase series-capacitor buck converter arrangement 1330.

Figure 14A:
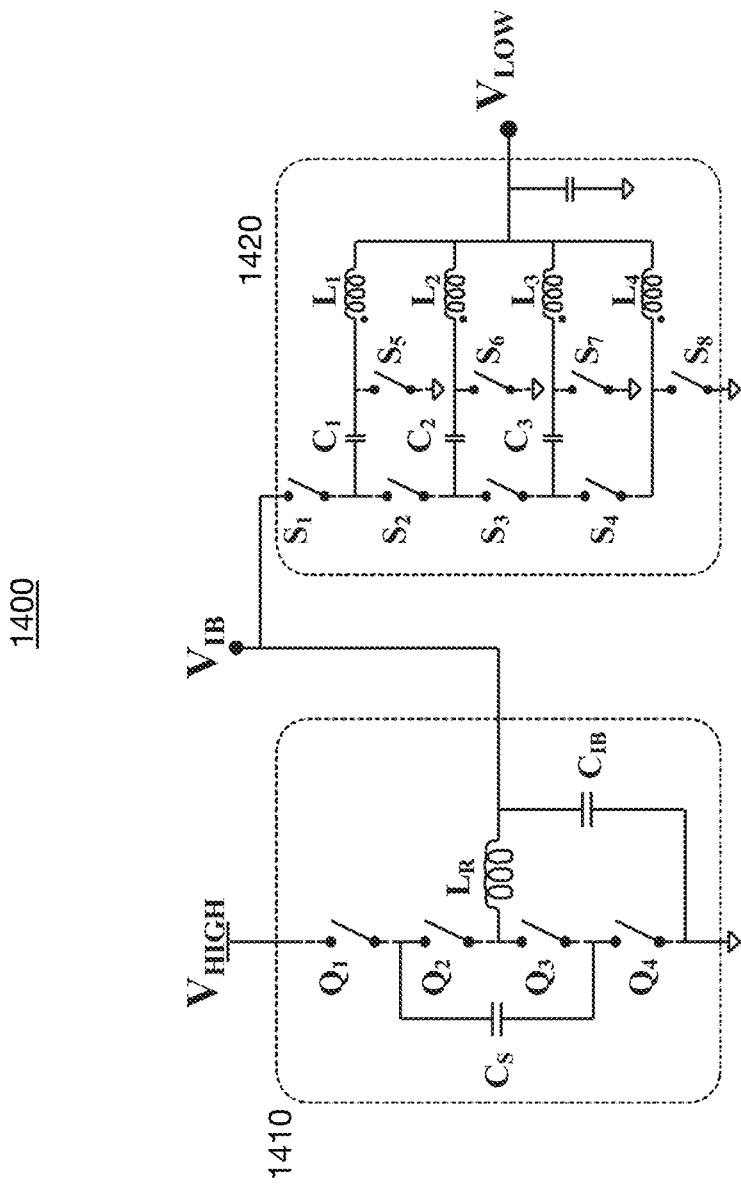
FIG. 14a depicts a schematic diagram illustrating an example topology for a multi-stage hybrid power converter arrangement in accordance with one or more embodiments.

FIG. 14a shows an example topology for an example multi-stage hybrid power converter arrangement 1400 including a voltage divider 1410 and a voltage regulator 1420. For example, voltage divider 1410 may comprise a 2:1 resonant charge pump and regulator 1420 may comprise a four-phase series-capacitor buck converter. In a particular implementation, a number of phases for a series-capacitor buck converter arrangement may be selected based at least in part on trade-offs between voltage stress, switching loss and/or circuit complexity, for example. Also, in a particular implementation, such as arrangement 1400, voltage divider 1410 and voltage regulator 1420 may be substantially and/or fully decoupled.

Figure 14B:
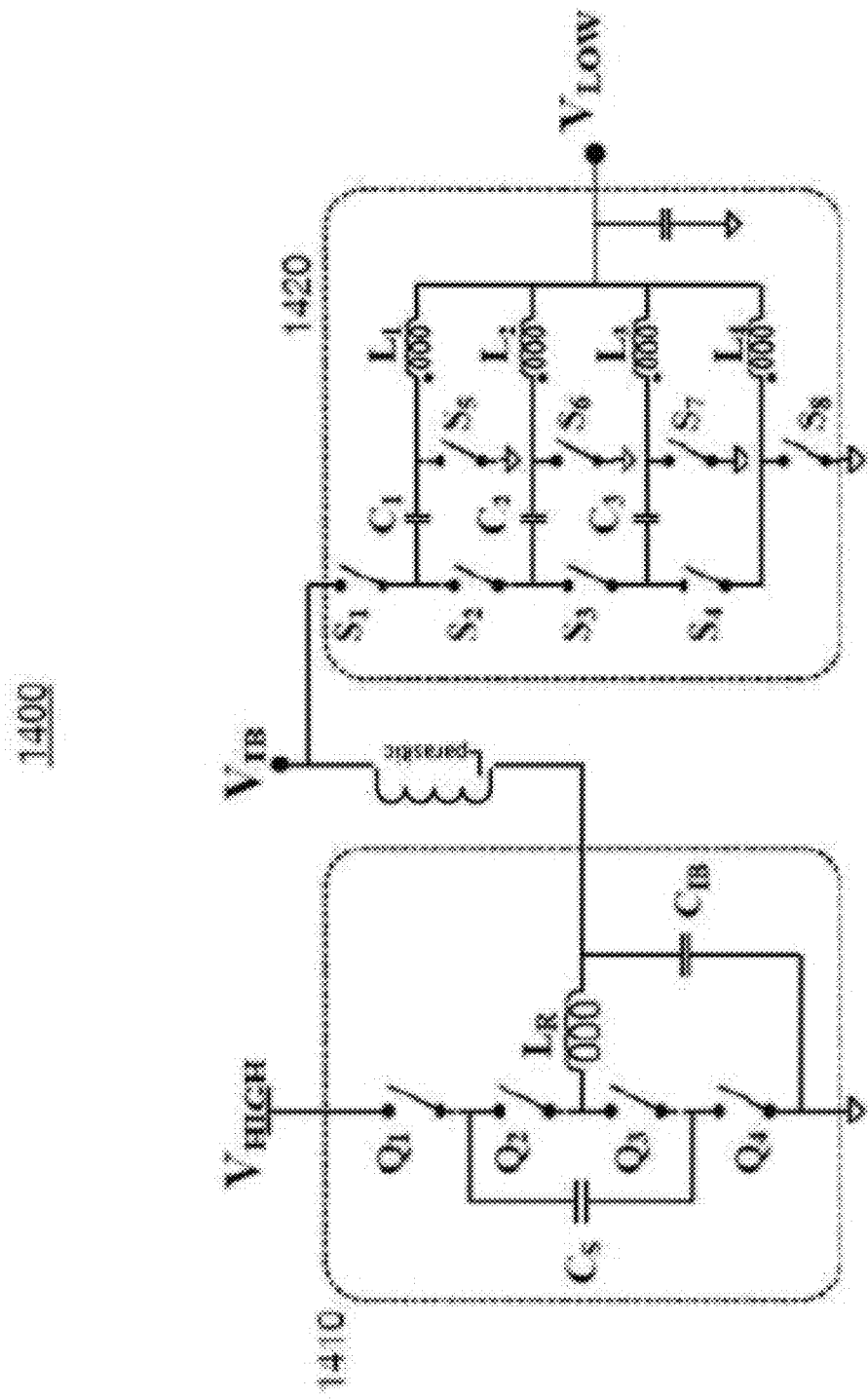
FIG. 14b depicts a schematic diagram illustrating an example topology for a multi-stage hybrid power converter arrangement in accordance with one or more embodiments.

As further depicted in FIG. 14b, in some implementations, a filter arrangement may be implemented to reduce magnitudes of voltage and/or current signals at frequencies substantially equal to resonant frequencies of a switched capacitor stage, such as voltage divider 1410. For example, filter arrangements may be designed and/or implemented to take into account parasitic effects, such as a parasitic inductance $L_{parasitic}$ as depicted in FIG. 14b. As shown in FIG. 14b, such a filter arrangement may comprise an inductor, capacitor, inductor (LCL) filter including an inductor $L_R$, a capacitor $C_{IB}$, and a parasitic inductance $L_{parasitic}$. Given an inductance value for $L_R$ and an inductance value for $L_{parasitic}$, a capacitance value for $C_{IB}$ may be selected such that a resulting LCL filter arrangement reduces magnitudes of resonant frequency current and/or voltage signals by a specified amount or to within an advantageous range, for example. In a particular implementation, a target range may be specified as at least a 50% reduction in signal magnitude. In further implementations, other filter topologies and/or technologies than LCL may be employed. For example, implementations may make advantageous use of parasitic impedances as part of a filter arrangement. Of course, embodiments are not limited in scope to these particular examples.

In particular implementations, intermediate capacitor $C_{IB}$, such as depicted in FIG. 14a and/or FIG. 14b, for example, may have a capacitance value selected to be large enough to filter higher frequency current ripple of a voltage regulator, such as voltage regulating arrangement 1420, and small enough to avoid charge sharing loss in a switched capacitor stage, such as switched capacitor arrangement 1410. One possible strategy to select a filter size may be to model the voltage regulator as a pulsed current source, to measure and/or estimate the parasitic inductance, and to design the intermediate capacitor as part of a low pass filter, in an implementation.

FIG. 14c depicts the principle of an example low pass current filter. For example, L may represent a lumped parasitic inductance of the entire current loop. R may represent a lumped resistance of the entire current loop. In a particular implementation, a goal for selecting a capacitance value for intermediate capacitor $C_{IB}$ may be to ensure that switching ripple current in $I_{in}$ receives sufficient attenuation while avoiding oscillation in the L-C filter created by the switching of the switched capacitor stage. For example, one strategy of selecting the size of the L-C filter may be to specify the natural frequency to be between the switching frequency of the switched capacitor stage $f_1$ and the switching frequency of the voltage regulator stage $f_2$, for example.

Figure 15:
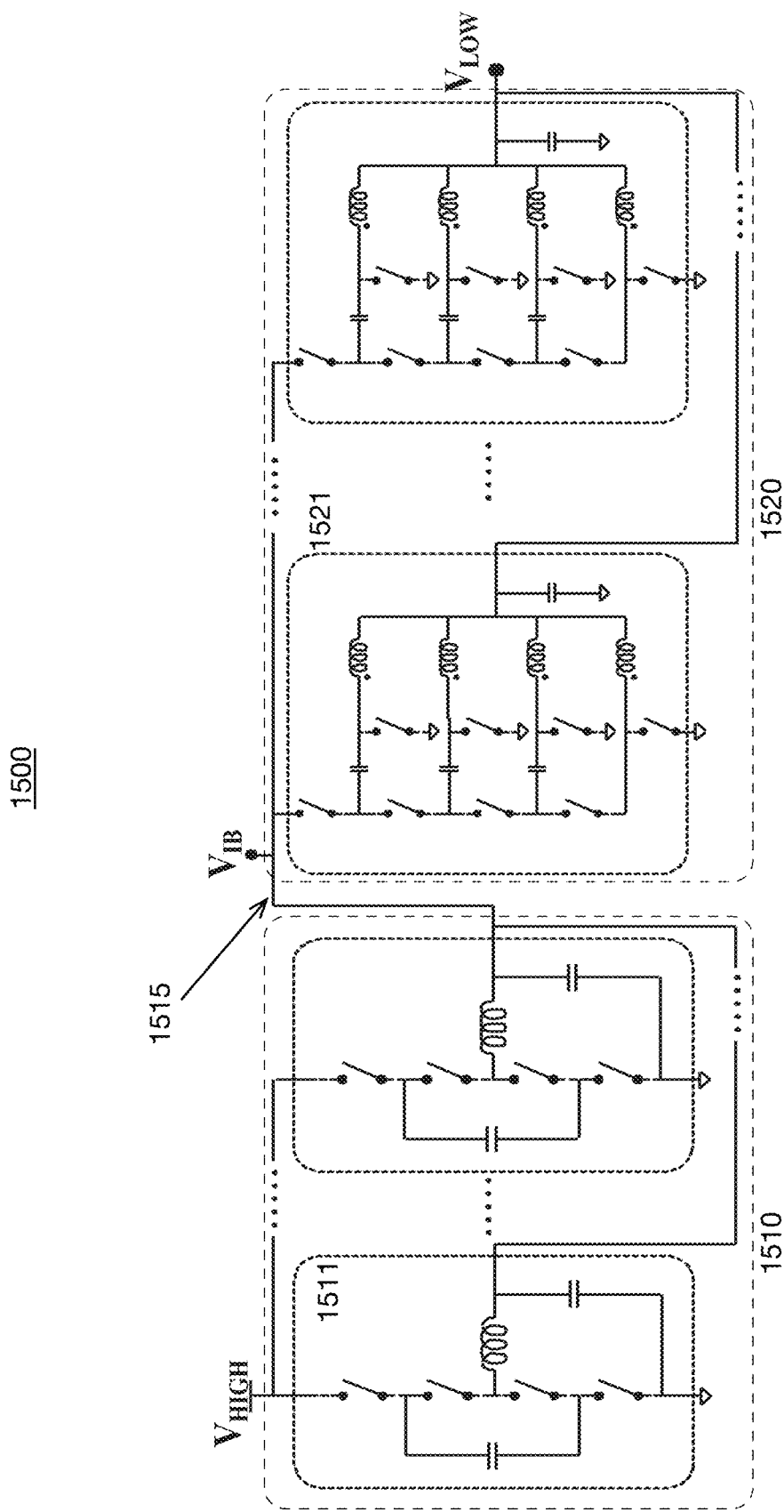
FIG. 15 depicts a schematic diagram illustrating an example multi-stage hybrid power converter arrangement 1500 in accordance with one or more embodiments.

FIG. 15 depicts a schematic diagram of an example multi-stage hybrid power converter arrangement 1500 including an example voltage divider arrangement 1510 and an example regulator arrangement 1520. In a particular implementation, voltage divider arrangement 1510 may comprise multiple parallel 2:1 resonant charge pump arrangements, such as 2:1 resonant charge pump arrangements 1511. Further, in a particular implementation, regulator arrangement 1520 may comprise multiple parallel four-phase series-capacitor buck arrangements, such as four-phase series-capacitor buck arrangements 1521. Example multi-stage hybrid power converter arrangement 1500, including multiple parallel 2:1 resonant charge pump arrangements 1511 of first-stage voltage divider arrangement 1510 and also including multiple parallel four-phase series-capacitor buck arrangements 1521 of second-stage regulator arrangement 1520, may be particularly suitable for relatively higher current applications, for particular implementations. As shown in multi-stage hybrid power converter arrangement 1500 of FIG. 15, multiple voltage dividers, such as multiple 2:1 resonant charge pump arrangements 1511, for example, may be connected in parallel between a higher voltage node, such as node $V_{HIGH}$, and an intermediate bus, such as intermediate bus 1515. Multiple voltage regulators, such as multiple four-phase series-capacitor buck arrangements 1521, may be also connected in parallel between an intermediate bus, such as intermediate bus 1515, and a lower voltage output node, such as $V_{LOW}$. Of course, embodiments are limited in scope in these respects.

FIGS. 16a and 16b depict example regulator arrangements, including examples of 24 V-1 V multi-phase series-capacitor buck arrangements with coupled inductors. FIG. 16a depicts an example regulator arrangement 1610, wherein a coupled inductor couples all buck phases in the same buck arrangement unit with a single magnetic core. For example, multi-phase series-capacitor buck arrangements 1611 and 1612 may individually include four buck phases, and all four buck phases may share the same magnetic core. That is, the buck phases of multi-phase series-capacitor buck arrangement 1611 may share a common magnetic core, for example. In an implementation, a total number of magnetic cores may equal the number of multiphase series-capacitor buck arrangements. For regulator arrangement 1610, for example, with multi-phase series-capacitor buck arrangements 1611 and 1612, the total number of magnetic cores utilized may equal the number two.

FIG. 16b depicts an additional example regulator arrangement 1620 including multi-phase series-capacitor buck arrangements 1621 and 1622. For example regulator arrangement 1620, the buck phases of both multi-phase series-capacitor buck arrangements 1621 and 1622 may share the same magnetic core. That is, even though regulator arrangement 1620 includes two multi-phase series-capacitor buck arrangements, only a single magnetic core may be utilized, for a particular implementation. In an implementation, a power density of the system may be further reduced in this manner, for example.

Figure 17:
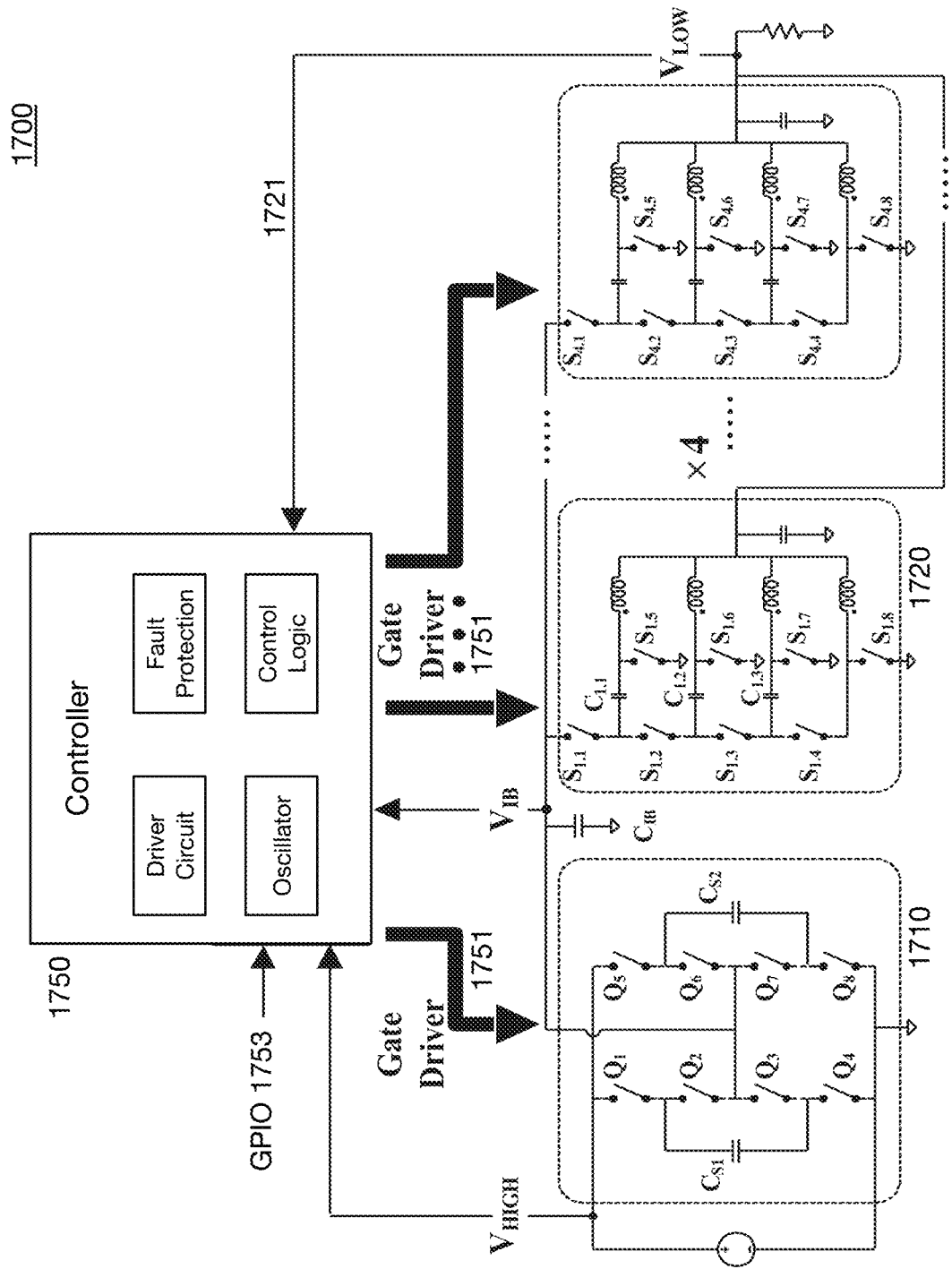
FIG. 17 depicts a schematic diagram illustrating an example multi-stage hybrid power converter arrangement with a merged multi-stage power converter topology in accordance with one or more embodiments.

FIG. 17 shows an example multi-stage hybrid power converter arrangement 1700 with a merged multi-stage power converter topology. In a particular implementation, multi-stage hybrid power converter arrangement 1700 may comprise a 48 V-1 V converter. In a particular implementation, a first stage 1710 may include an interleaved 2:1 switched capacitor-type voltage divider arrangement. A second stage 1720 may comprise four four-level series capacitor buck converters, for example. An intermediate bus $V_{IB}$ may be floating, in an implementation. For example, an intermediate bus capacitor $C_{IB}$ can be made relatively small or removed altogether.

Also, in a particular implementation, multi-stage hybrid power converter arrangement 1700 may include a controller, such as controller 1750. As depicted in FIG. 17, controller 1750 may include, for example, driver circuits for gate driver signals 1751, an oscillator, fault protection circuitry, and/or control logic. Of course, embodiments are not limited in scope in these respects. Controller 1750 may also receive general purpose input/output signals 1753, for example. In an implementation, an output voltage $V_{LOW}$ may be sampled and/or provided to a controller 1750 as a feedback signal 1721. Controller 1750 may calculate a duty ratio and/or may calculate a phase delay of one or more gate driver signals 1751 based at least in part on a reference voltage signal VREF and/or feedback signal 1721. In an implementation, gate driver signals 1751 may control the opening and/or closing of the various switches within first stage arrangement 1710 and/or within second stage arrangements 1720. Further, in an implementation, sampled signals and/or states derived from an input voltage $V_{HIGH}$ and/or derived from an intermediate bus voltage $V_{IB}$ may be optionally provided to controller 1750 depending at least in part on particular control mechanisms and/or specifications.

In particular implementations, a merged-multi-stage intermediate bus architecture/topology may be identified based, at least in part, on at least first and second stages not being fully decoupled by an intermediate bus capacitor $C_{IB}$. $C_{IB}$ may be smaller than 10% of what one might consider to be a more typical value of a decoupling capacitor for an intermediate bus. In particular implementations, $C_{IB}$ may be fully removed. As utilized herein, "merged topology," "merged multi-stage topology," "merged multi-stage architecture," "merged multi-stage arrangement," "merged multi-stage power converter" and/or the like, which may be utilized interchangeably, refer to at least a substantial majority of a current provided by a first stage of a multi-stage hybrid power converter arrangement being received via an intermediate bus at a second stage of the multi-stage hybrid power converter arrangement. For particular implementations, a merged-multi-stage topology may further be identified based, at least in part, on the first and second stages of the multi-stage hybrid power converter not being independently controlled. That is, for a merged multi-stage topology, control of the first and second stages of a power converter arrangement may be interdependent at least in part in an implementation.

Figure 18:
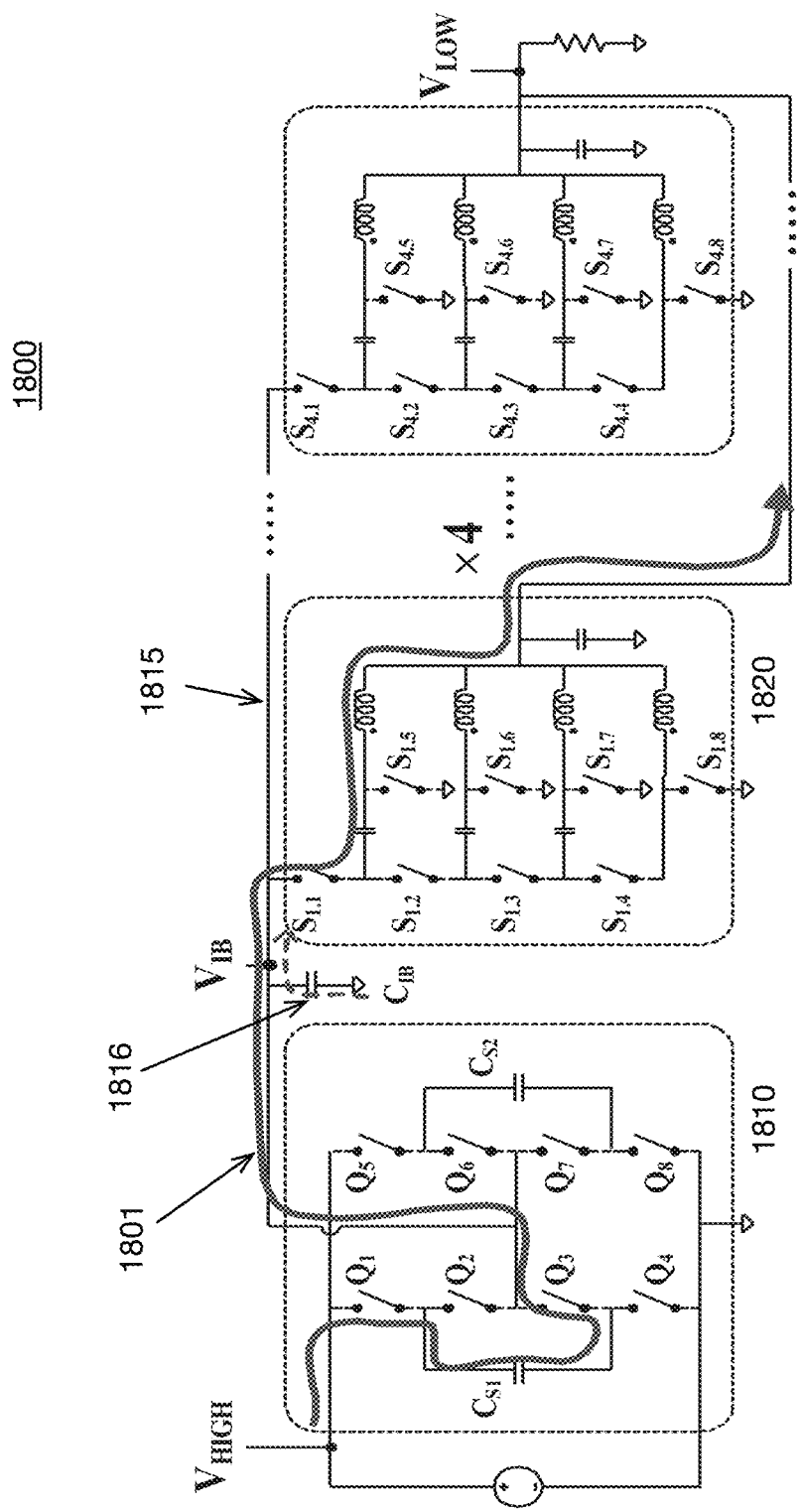
FIG. 18 depicts a schematic diagram illustrating an example multi-stage hybrid power converter arrangement with a merged multi-stage power converter topology in accordance with one or more embodiments.

FIG. 18 depicts an example multi-stage hybrid power converter arrangement 1800 with a merged multi-stage power converter topology. In a particular implementation, multi-stage hybrid power converter arrangement 1800 may share a number of characteristics with arrangement 1700 depicted in FIG. 17. As shown in FIG. 18, for a particular merged topology implementation, at least most of a current 1801 is conducted via intermediate bus 1815 from a first stage 1810 to a second stage 1820, with at most only a small part of current 1801 passing through a capacitor $C_{IB}$. As mentioned, for some implementations capacitor $C_{IB}$ may be absent and/or removed.

In particular implementations, to achieve improved efficiency and/or power density, it may be advantageous to operate a first stage voltage divider arrangement at a relatively lower frequency and to operate a second stage voltage regulator at a relatively higher frequency. For example, operating a first stage voltage divider arrangement at lower frequencies may improve system efficiency and operating a second stage voltage regulator at higher frequencies may extend a control bandwidth.

FIG. 19 shows example waveforms 1900 for gate driver signals of an example 2:1 switched capacitor-type voltage divider arrangement, such as interleaved 2:1 switched capacitor-type voltage divider arrangement 1810, and an example voltage regulator including four paralleled four-phase series-capacitor buck arrangements, such as four four-level series-capacitor buck converters 1820. In a particular implementation, the four paralleled 4-phase series-capacitor buck arrangements of example voltage regulator arrangement 1820, for example, may be interleaved.

As may be observed via example waveforms 1900, switching actions of a 2:1 switched capacitor-type voltage divider arrangement, such as example arrangement 1810, may be activated when the highest level second stage switches, such as switch $S_{1.1}$ of a first of the four four-level series-capacitor buck converters of voltage regulator arrangement 1820 and switch $S_{4.1}$ of a fourth of the four four-level series-capacitor buck converters of voltage regulator arrangement 1820, are off. That is, for example, none of the $S_{1.1}$, $S_{2.1}$ (not shown), $S_{3.1}$ (not shown), and $S_{4.1}$ switches of second stage arrangements 1820 are conducting during a dead-time DT for 2:1 switched capacitor-type voltage divider arrangement 1810. In a particular implementation, no current may flow through intermediate bus 1815 when $S_{1.1}$, $S_{2.1}$, $S_{3.1}$, $S_{4.1}$ are off and first stage arrangement 1810 is zero-current-switching.

Figure 19A:
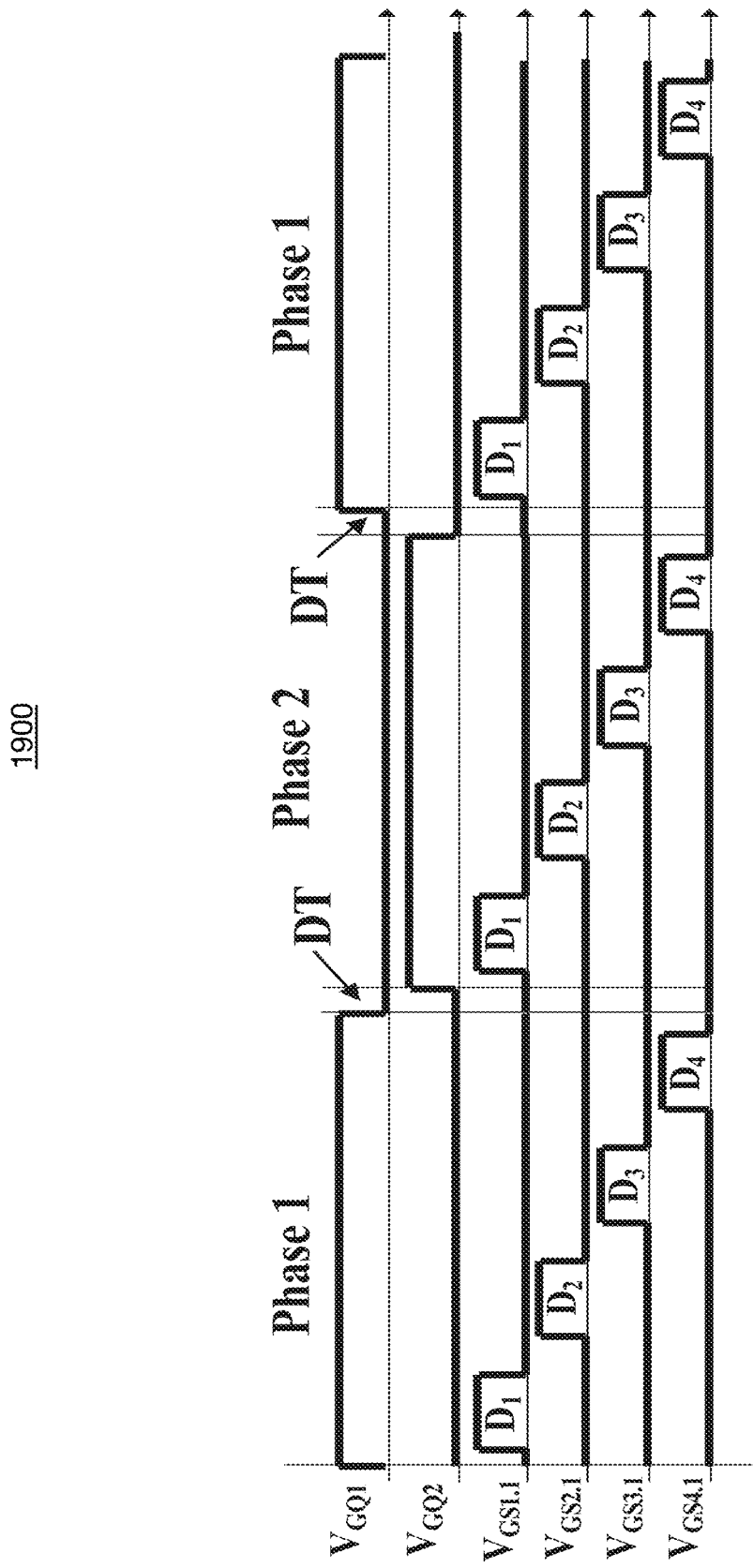
FIG. 19a shows example waveforms for gate driver signals of an example 2:1 switched capacitor-type voltage divider arrangement in accordance with one or more embodiments.
Figure 19B:
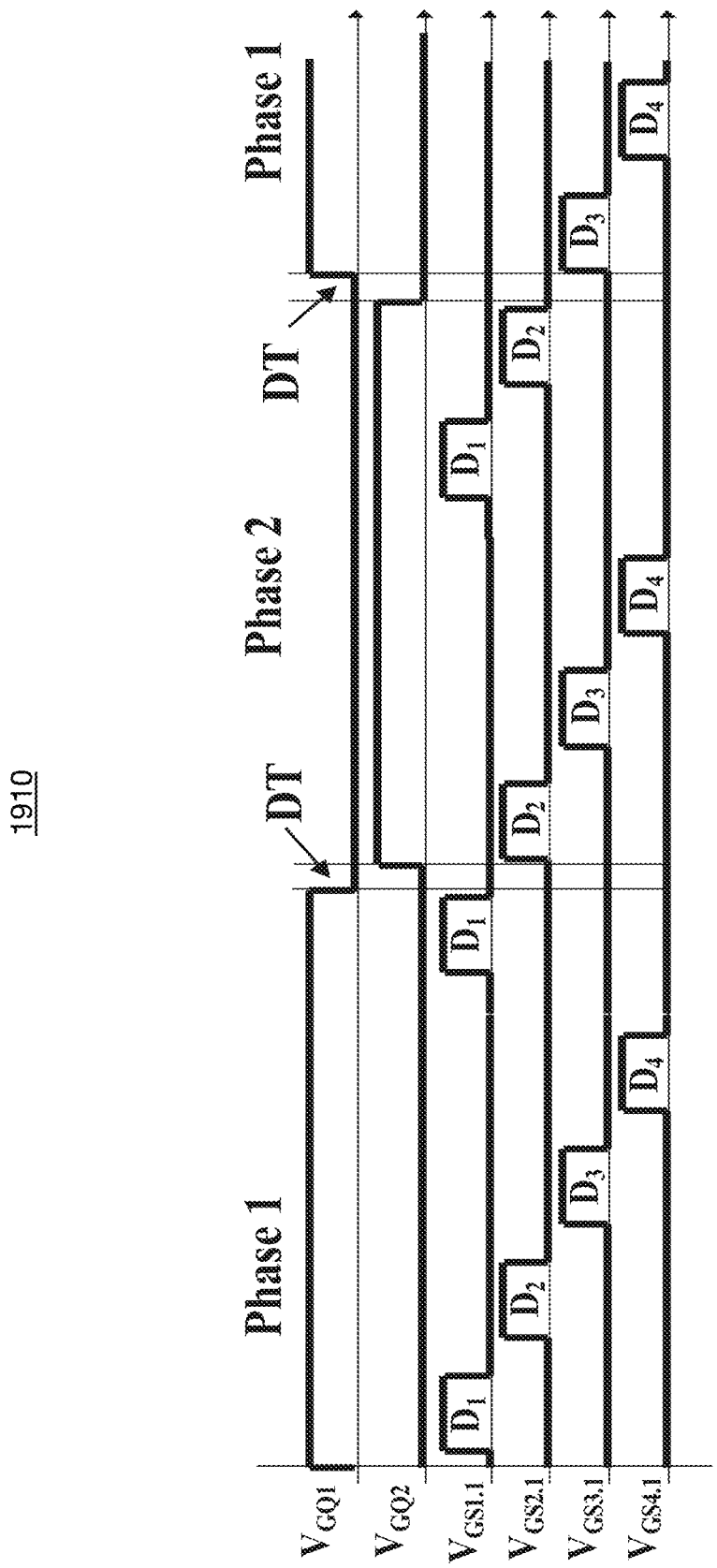
FIG. 19b shows example waveforms for gate driver signals of an example 2:1 switched capacitor-type voltage divider arrangement in accordance with one or more embodiments.

Further, as depicted in example waveforms 1900 of FIG. 19a, a switching frequency of a series-capacitor buck stage, such as example voltage regulator arrangement 1820, may be twice the switching frequency of a 2:1 switched capacitor-type voltage divider arrangement, such as example voltage divider arrangement 1810. In other implementations, a switching frequency of the series-capacitor buck stage may be 2.5 times of the switching frequency of the 2:1 capacitor divider stage. See, for example, waveforms 1910 depicted in FIG. 19b. Zero-current switching (i.e., with respect to the operation of particular switches) may be achieved if none of switches $S_{1.1}$, $S_{2.1}$, $S_{3.1}$, $S_{4.1}$, for example, are conducting during dead-time DT of the 2:1 switched capacitor-type voltage divider arrangement 1810.

Using multi-stage hybrid power converter arrangement 1700 of FIG. 17 as an example, a dc voltage rating of capacitors in 2:1 switched capacitor-type voltage divider arrangement 1710 may be calculated according to a relation $V_{HIGH}/2$, in an implementation. Also, for example, dc voltage ratings for series capacitors of the four four-level series-capacitor buck converters of voltage regulator arrangement 1720 may be calculated according to the following example relations: 1) $C_{1.1}$~$C_{4.1}$: $0.75*V_{IB}$, 2) $C_{1.2}$~$C_{4.2}$: $0.5*V_{IB}$, $C_{1.3}$~$C_{4.3}$: $0.25*V_{IB}$. In an implementation, an average level of an intermediate voltage $V_{IB}$ may equal approximately half of an input voltage $V_{HIGH}$. During normal operation, various capacitors of example arrangement 1700 may exhibit voltage ripple. Further, for example, amplitude of voltage ripple may depend at least in part on capacitance characteristics and/or parameters and/or on operational status. Additionally, for example, a dc voltage rating for switches of 2:1 switched capacitor-type voltage divider arrangement 1710 may be calculated via a relation $V_{HIGH}/2$.

Figure 20:
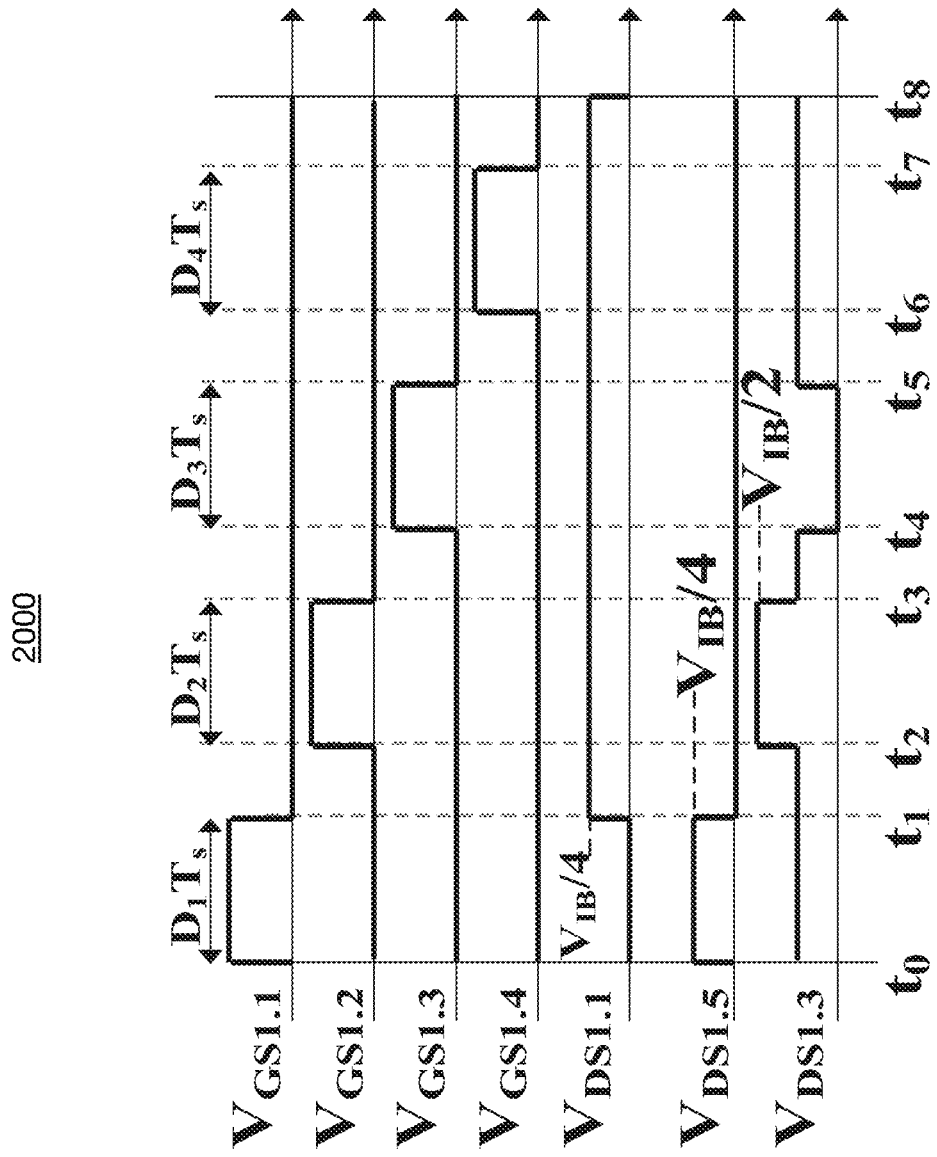
FIG. 20 depicts example waveforms 2000 showing example gate drive signals for switches of an example series-capacitor buck arrangement in accordance with one or more embodiments.

FIG. 20 depicts example waveforms 2000 showing example gate drive signals, such as gate drive signals 1751, and example drain source voltages for several switches (e.g., switch transistors) of a series-capacitor buck arrangement, such as a four-level series-capacitor buck converters of voltage regulator arrangement 1720, for a particular implementation. For example, waveforms $V_{GS1.1}$~$V_{GS4.1}$ represent gate driver signals, such as gate driver signals 1751, for four high side switches ($S_{1.1}$~$S_{1.4}$) of a first series-capacitor buck arrangement 1720. Parameters $D_1$~$D_4$ are representative of duty ratios. A maximum steady state voltage rating for switches $S_{1.2}$, $S_{1.3}$ and $S_{1.4}$ may be calculated according to a relation $V_{IB}/2$. For example, if an intermediate voltage level is determined to be 24.0 V, a steady state voltage rating for switches $S_{1.2}$, $S_{1.3}$ and $S_{1.4}$ may be calculated as 12 V. Further, for example, a maximum steady state voltage rating for switches $S_{1.1}$, $S_{1.5}$~$S_{1.8}$ may be calculated according to a relation $V_{IB}/4$. For example, if an intermediate voltage level is determined to be 24.0 V, a steady state voltage rating for switches $S_{1.1}$, $S_{1.5}$ $S_{1.8}$ may be calculated as 6 V. As depicted in example waveforms 2000, switches may switch at a voltage level $V_{IB}/4$, in an implementation.

In some multi-phase buck converters, input voltage ripple may affect buck converter phases. For particular implementations utilizing a multi-phase series-capacitor buck converter arrangement, such as for a second stage of a multi-stage hybrid power converter, for example, input voltage ripple may only affect a top phase (e.g., $S_1$, $C_1$, $S_5$, $L_1$ of example arrangement 1230 depicted in FIG. 12c). As a result, a duty ratio for a top phase of a multi-phase series-capacitor buck converter may need to compensate input voltage ripple, and a duty ratio for such a top phase may be different from other phases. For example, in an implementation, $D_1 \neq D_2 = D_3 = D_4$. For N-phase series-capacitor buck converters, an advantageous voltage conversion ratio may be approximately $N^2$, in an implementation. For example, for a four-phase series-capacitor buck converter, an advantageous voltage conversion ratio may be 16:1. For a five-phase series-capacitor buck converter, for example, an advantageous voltage conversion ratio may be 25:1. An advantageous duty ratio may be specified as 1/N, in an implementation. In an implementation, when series-capacitor buck converters operate close to an advantageous duty ratio, output current ripple may be at least substantially reduced and/or cancelled.

FIGS. 21-23 show schematic diagrams depicting a variety of example implementations of multi-stage hybrid power converters with a variety of possible topologies for first stage voltage divider arrangements and/or second stage voltage regulator arrangements.

Figure 21A:
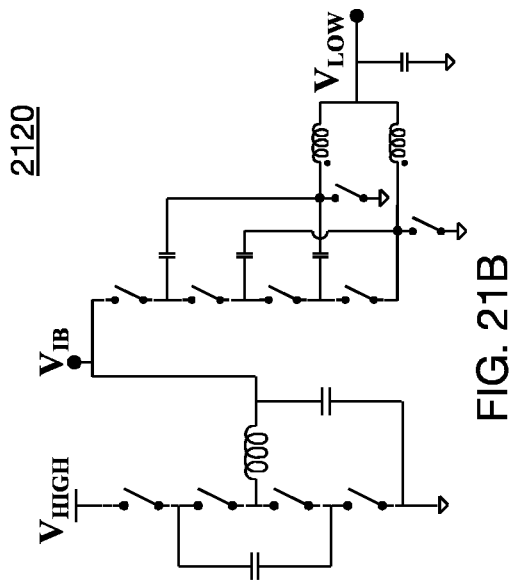
FIGS. 21a-21d show schematic diagrams depicting example multi-stage hybrid power converters in accordance with one or more embodiments.
Figure 21B:
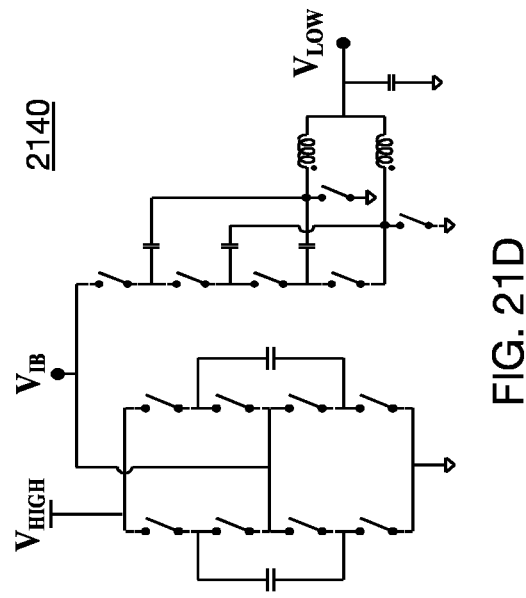
Figure 21C:
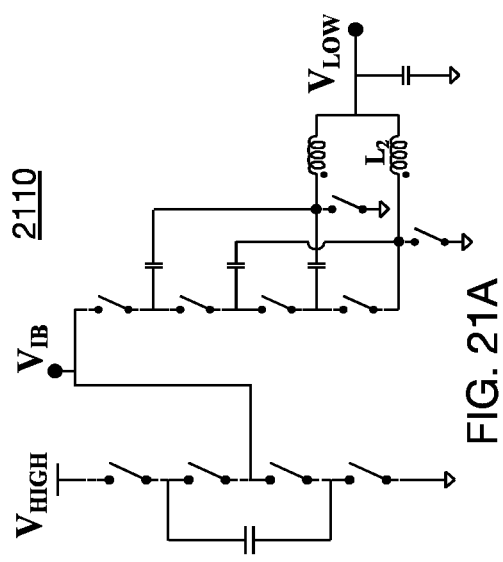
Figure 21D:
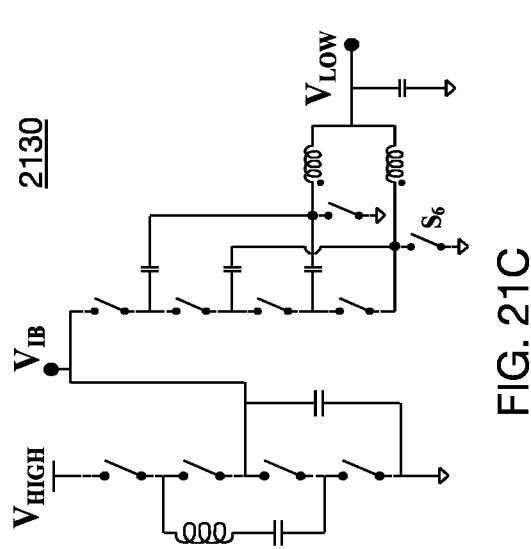

FIGS. 21a-21d show schematic diagrams depicting example multi-stage hybrid power converters, wherein a second stage of the multi-stage hybrid power converter comprises an example hybrid-capacitor-inductor voltage regulator. For example, FIG. 21a depicts a multi-stage hybrid power converter 2110 including a hybrid-capacitor-inductor voltage regulator for a second stage and further including a first stage comprising an example 2:1 charge pump arrangement. FIG. 21b, for example, depicts a multi-stage hybrid power converter 2120 including a hybridcapacitor-inductor voltage regulator for a second stage and including a first stage 2:1 resonant charge pump arrangement with an inductor at a first stage output. FIG. 21c depicts a multi-stage hybrid power converter 2130 including a hybrid-capacitor-inductor voltage regulator for a second stage and further including a first stage 2:1 resonant charge pump arrangement with a series-connected inductor, for example. Additionally, FIG. 21d depicts a multi-stage hybrid power converter 2140 including a hybrid-capacitor-inductor voltage regulator for a second stage and 2:1 switched capacitor-type voltage divider arrangement for a first stage. Of course, these are merely example implementations of multi-stage hybrid power converters, and embodiments are not limited in scope in this respect.

Figure 22B:
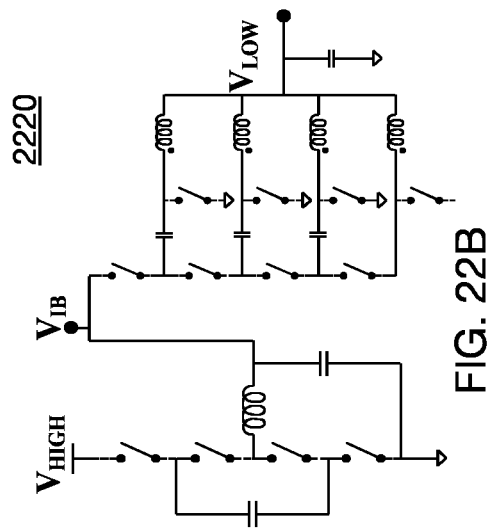
FIGS. 22a-22d depict schematic diagrams illustrating example multi-stage hybrid power converters in accordance with one or more embodiments.
Figure 22D:
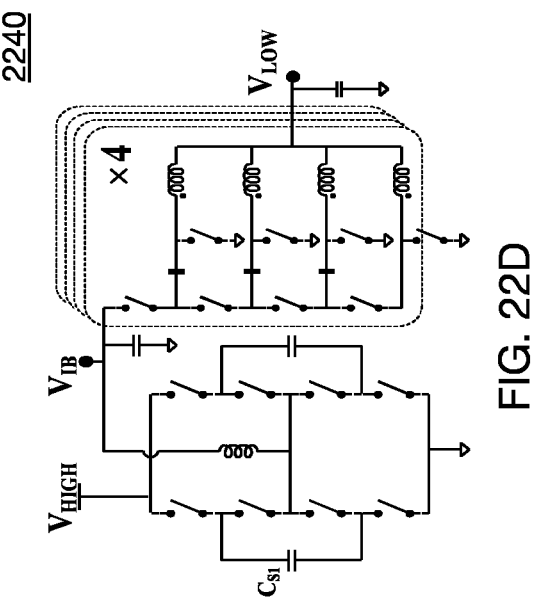
Figure 22A:
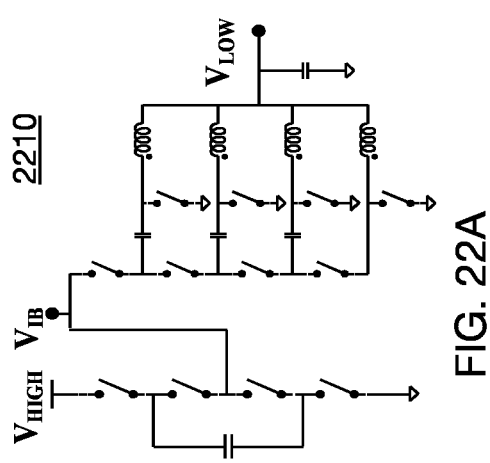
Figure 22C:
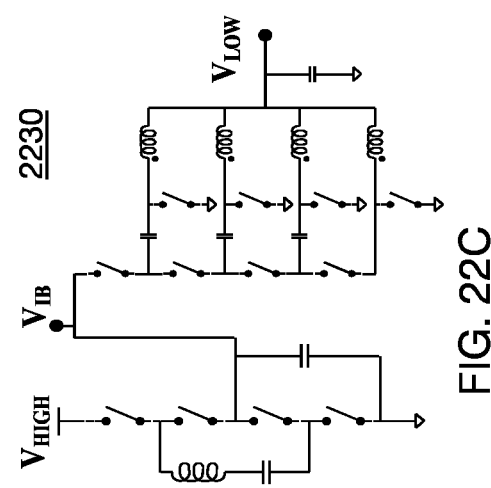

FIGS. 22a-22d show schematic diagrams depicting example multi-stage hybrid power converters, wherein a second stage of the multi-stage hybrid power converter comprises an example multi-phase series-capacitor buck converter as a second stage voltage regulator arrangement. FIG. 22a, for example, depicts a multi-stage hybrid power converter 2210 including a multi-phase series-capacitor buck converter as a second stage voltage regulator arrangement and also including a 2:1 charge pump arrangement as a first stage. Also, for example, FIG. 22b depicts a multi-stage hybrid power converter 2220 including a second-stage multi-phase series-capacitor buck converter and first stage 2:1 resonant charge pump with an inductor at a first stage output. Additionally, FIG. 22c depicts a multi-stage hybrid power converter 2230 including a second-stage multi-phase series-capacitor buck converter and a 2:1 resonant charge pump arrangement including a series-connected inductor. Further, FIG. 22d depicts a multi-stage hybrid power converter 2240 including a second-stage multi-phase series-capacitor buck converter and a 2:1 resonant switched capacitor-type voltage divider arrangement as a first stage. In an implementation, output inductors may or may not be coupled. The particular implementations depicted in FIGS. 22a-22d are merely examples of possible implementations of multi-stage hybrid power converters, and embodiments are not limited in scope in this respect.

Figure 23B:
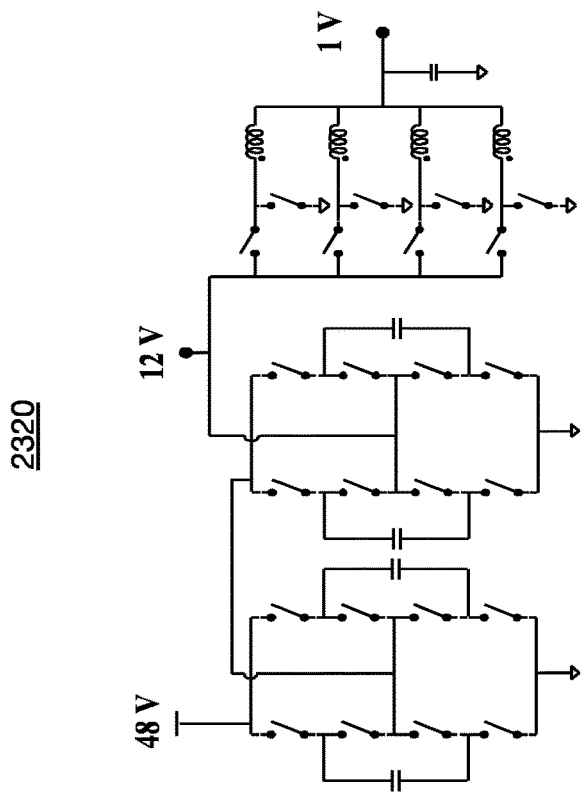
FIGS. 23a-23b depict schematic diagrams illustrating example 48 V-1 V converter arrangements including multi-phase buck converter in accordance with one or more embodiments.
Figure 23A:
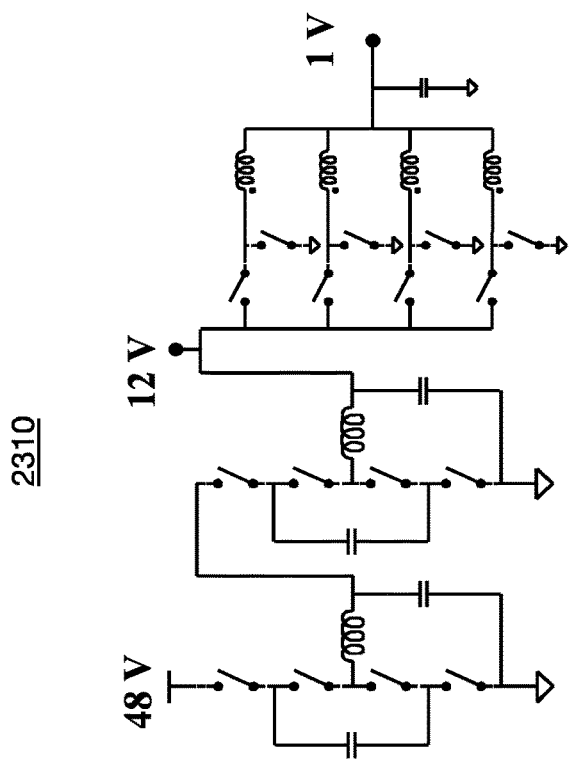

FIGS. 23a-23b depict schematic diagrams illustrating example implementations of 48 V-1 V converters using a multi-phase buck converter as a second stage of a multi-stage hybrid power converter. For example, FIG. 23a depicts a multi-stage hybrid power converter 2310 including a multi-phase buck converter arrangement for a second stage and a 4:1 resonant charge pump arrangement for a first stage. Further, for example, FIG. 23b depicts a multi-stage hybrid power converter 2320 including a multi-phase buck converter arrangement for a second stage and a 4:1 switched capacitor-type voltage divider arrangement for a first stage. Of course, these are merely examples of possible implementations for 48 V-1 V multi-stage hybrid power converters, and embodiments are not limited in scope in this respect.

Figure 24:
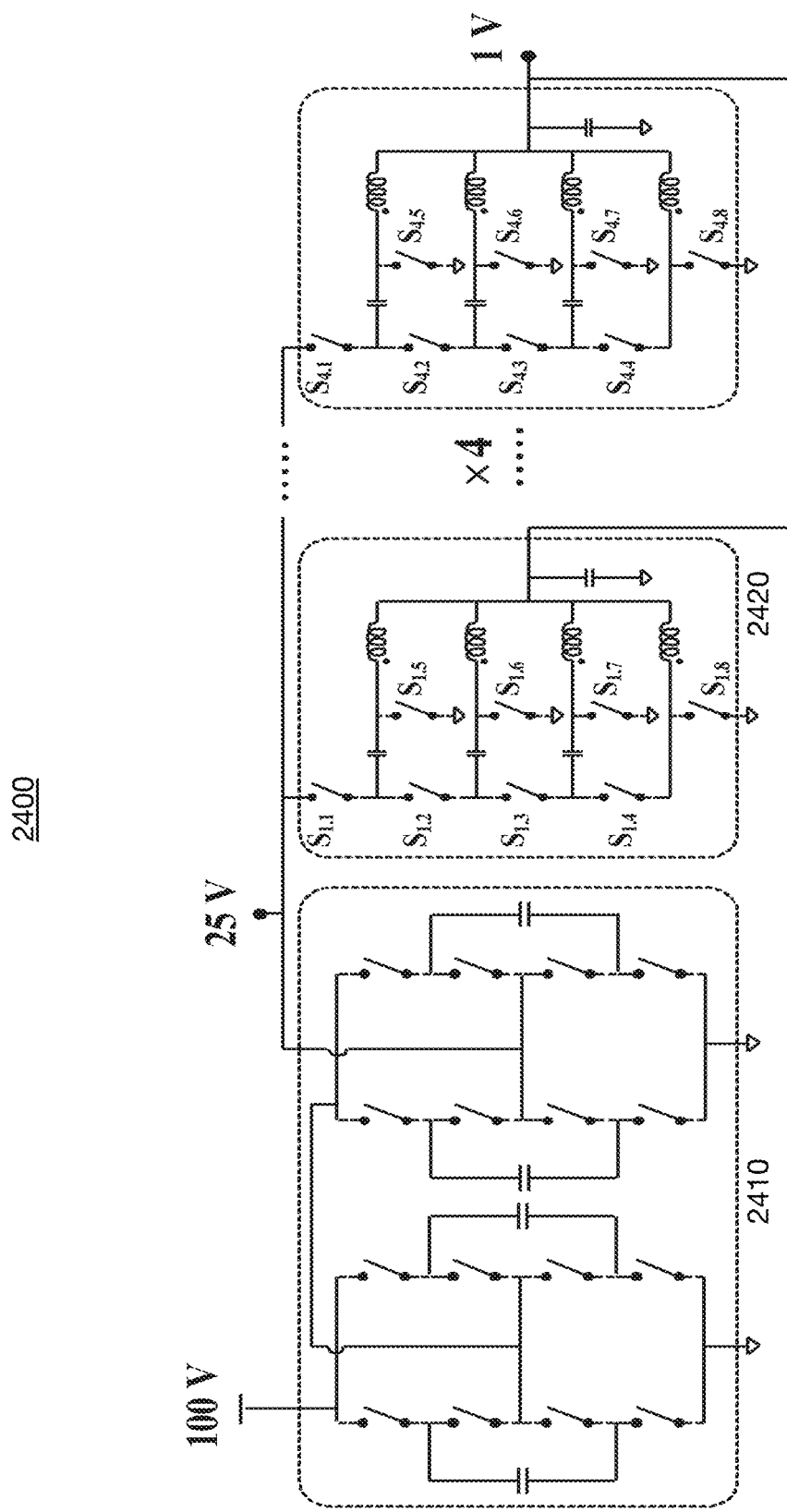
FIG. 24 depicts a schematic diagram illustrating an example 100 V-1 V multi-stage hybrid power converter in accordance with one or more embodiments.

FIG. 24 shows a schematic diagram depicting an example 100 V-1 V multi-stage hybrid power converter 2400. In an implementation, example 100 V-1 V multi-stage hybrid power converter 2400 may include a first stage comprising a 4:1 switched capacitor-type voltage divider arrangement 2410 and a second stage voltage regulator arrangement comprising multiple parallel multi-phase series-capacitor buck converters 2420. In an implementation, example arrangement 2400 depicted in FIG. 24 may have a voltage conversion ratio of 25:1. In an implementation, if multiple series-capacitor buck converters are operated in parallel, it may be advantageous to alternate a switching sequence for the multiple series-capacitor buck converters so that variation in intermediate bus voltage may be automatically compensated (i.e., avoiding switching the same series-capacitor buck converter at the same switching cycle of the first stage switched capacitor-type voltage divider). Further, when starting a multi-stage hybrid power converter system, operation of a first stage switched capacitor-type voltage divider arrangement, such as arrangement 2410, and the series-capacitor buck converters of a second stage, such as series-capacitor buck converter 2420, may be coordinated such that an intermediate bus voltage may relatively slowly ramp up to a target level without significant overshoot. In an implementation, inductors in series-capacitor buck converter 2420, for example, may be used to limit current in the switched capacitors of multi-stage hybrid power converter 2400. Example arrangement 2400 depicted in FIG. 24 represents merely one example of a 100 V-1 V multi-stage hybrid power converter, and embodiments are not limited in scope in this respect.

Figure 25A:
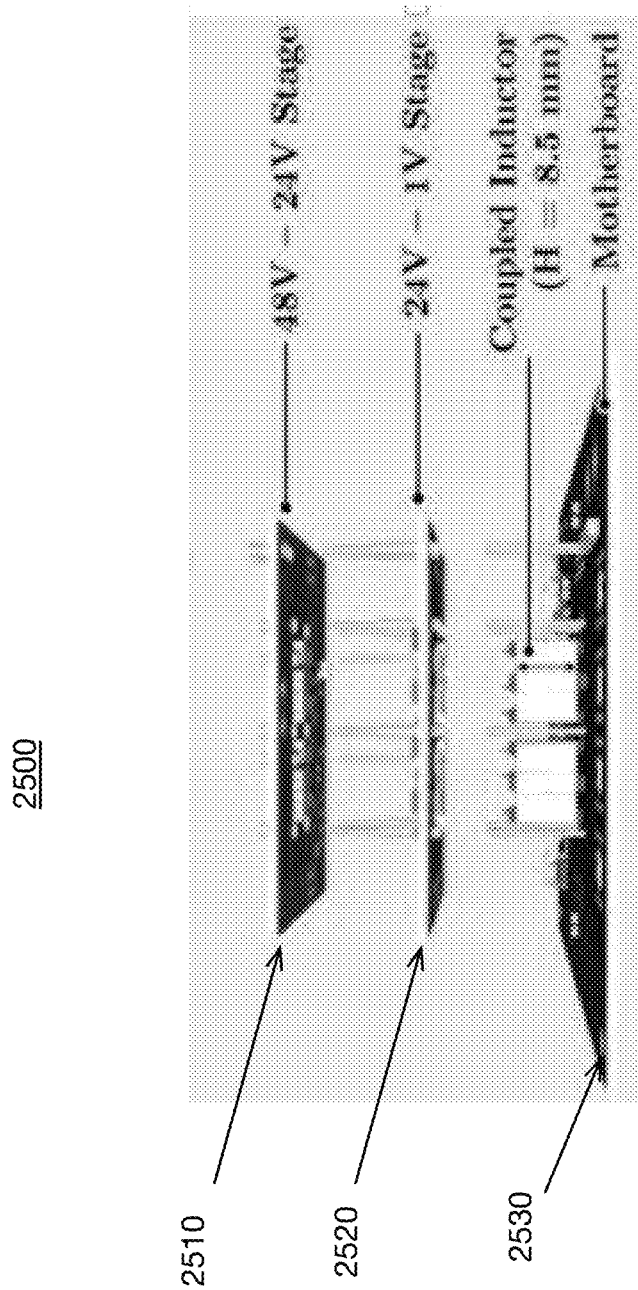
FIG. 25a depicts an illustration of an example assembly of a multi-stage hybrid power converter in accordance with one or more embodiments.

FIG. 25a depicts an illustration of an example assembly 2500 of a multi-stage hybrid power converter. In an implementation, power may be vertically delivered from a first stage of a multi-stage hybrid power converter located on a first layer of a multi-layer assembly (e.g., printed circuit board (PCB)), such as top PCB 2510, to a second stage of a multi-stage hybrid power converter located on a second PCB, such as middle PCB 2520, and to a third PCB, such as bottom PCB 2530. In an implementation, a multi-stage hybrid power converter may comprise a 48 V-1 V converter, although embodiments are not limited in scope in this respect. For example assembly 2500, a 48 V source voltage may be delivered from bottom PCB 2530 to first PCB 2510 via one or more vertical connectors 2501. A first stage located at first PCB 2510 may divide the 48 V voltage to generate an intermediate voltage of 24 V, for example. In an implementation, an intermediate voltage may be delivered from first PCB 2510 to second PCB 2520 via one or more of vertical connectors 2501.

Further, in an implementation, a second stage voltage regulator of a multi-stage hybrid power converter located at second PCB 2520 may convert the intermediate voltage of 24 V to a 1 V output voltage. The output voltage may be delivered to third PCB 2530 via one or more of vertical connectors 2501, for example. Also, in an implementation, one or more inductors, such as one or more coupled inductors, may be located on third PCB 2530. That is, for a particular implementation, a portion of a second stage regulator arrangement for a multi-stage hybrid power converter may be located at second PCB 2520 and another portion of the second state regulator arrangement may be located at third PCB 2530. However, embodiments are not limited in scope in these respects.

In particular implementations, third PCB 2530 may comprise a motherboard and/or other printed circuit board type. An output voltage from a second stage of a multi-stage hybrid power converter may be provided to one or more components residing on third PCB 2530, such as one or more microprocessors, for example. Further, in particular implementations, first PCB 2510 and/or second PCB 2520 may comprise one or more "daughtercards" meant to engage with a motherboard, such as third PCB 2530. Also, in particular implementations, current may flow vertically among the first, second and/or third PCBs 2510, 2520 and/or 2530 via electrically conductive vertical connectors 2501, wherein vertical connectors 2501 may stand between multiple boards and/or printed circuit boards. Although the example multi-layer assembly discussed in connection with FIGS. 25a and 25b (see below) may be implemented utilizing one or more PCBs, embodiments are not limited in this respect.

Figure 25B:
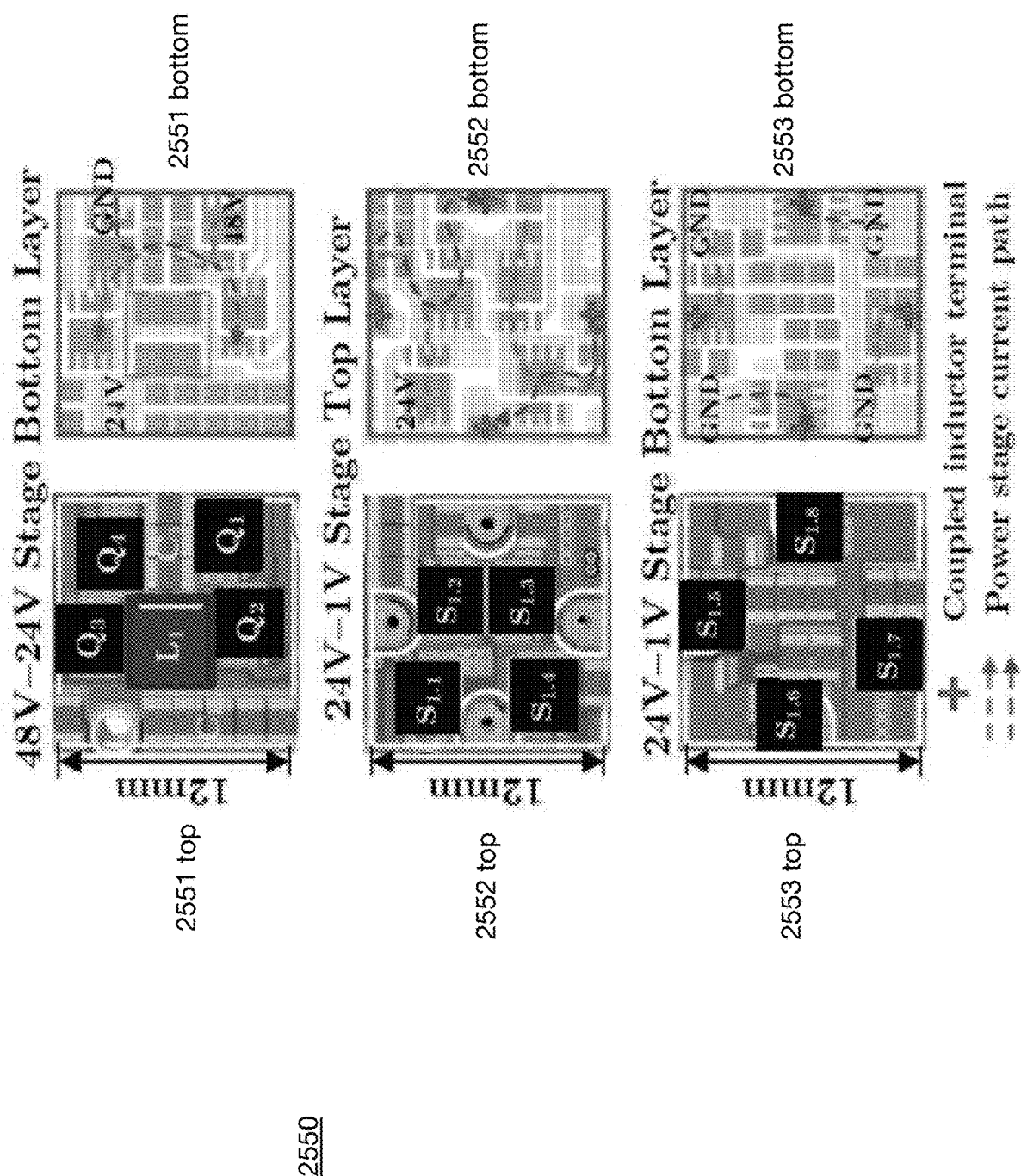
FIG. 25b depicts an illustration of an example layout for printed circuit boards of an example multi-stage hybrid power converter assembly in accordance with one or more embodiments.

FIG. 25b is an illustration showing an embodiment 2550 of an example components placement and/or layout for an example multi-stage hybrid power converter including a 48 V-24 V charge pump stage and a 24 V-1 V series buck stage. Of course, a variety of components placements and/or layouts in accordance with one or more embodiments may be utilized to implement, at least in part, any of the example implementations of multi-stage hybrid power converters described herein, and are not limited to the particular 48 V-1 V example of components placement and/or layout 2550 depicted in FIG. 25b. In a particular implementation, a charge pump arrangement and/or a series capacitor buck arrangement, for example, may occupy one or more layers individually comprising 12 mm×12 mm square areas of a PCB and/or other substrate type for the various components (switches, capacitors and inductors). For example, as depicted in FIG. 25b, a bottom layer of a charge pump arrangement may have components placed on one side (e.g., top side) of a particular PCB 2551. Example current flow paths are shown via dashed lines on another side (e.g., bottom side) of PCB 2551. A top layer for the charge pump arrangement may include intermediate bus capacitors, for example, and is not shown in FIG. 25b.

Continuing with FIG. 25b, for a particular implementation, a 24 V-1 V series buck arrangement (e.g., implemented as a second stage of a multi-stage hybrid power converter) may occupy one or more layers individually comprising 12 mm×12 mm square areas of a PCB and/or other substrate type for the various components (switches, capacitors and inductors). For example, in a particular implementation, a top layer of a series buck arrangement may have components (e.g., switches, capacitors, inductors, etc.) placed on one side (e.g., top side) of a PCB 2552. Example current flow paths are shown via dashed lines on another side (e.g., bottom side) of PCB 2552. Also depicted in FIG. 25b are example coupled inductor terminals. Further, for a particular implementation, a bottom layer of a series buck arrangement may have components placed on one side (e.g., top side) of a PCB 2553. Example current flow paths are illustrated via dashed lines on another side (e.g., bottom side) of PCB 2553, as depicted in FIG. 25b. In particular implementations, components placement and/or layout such as depicted, for example, in FIG. 25b may help ensure substantially symmetrical current paths for the different operational phases of a multi-stage hybrid power converter, including, for example, a 48 V-24 V charge pump stage and a 24 V-1 V series buck stage. Of course, embodiments are not limited to the particular examples discussed.

Figure 26:
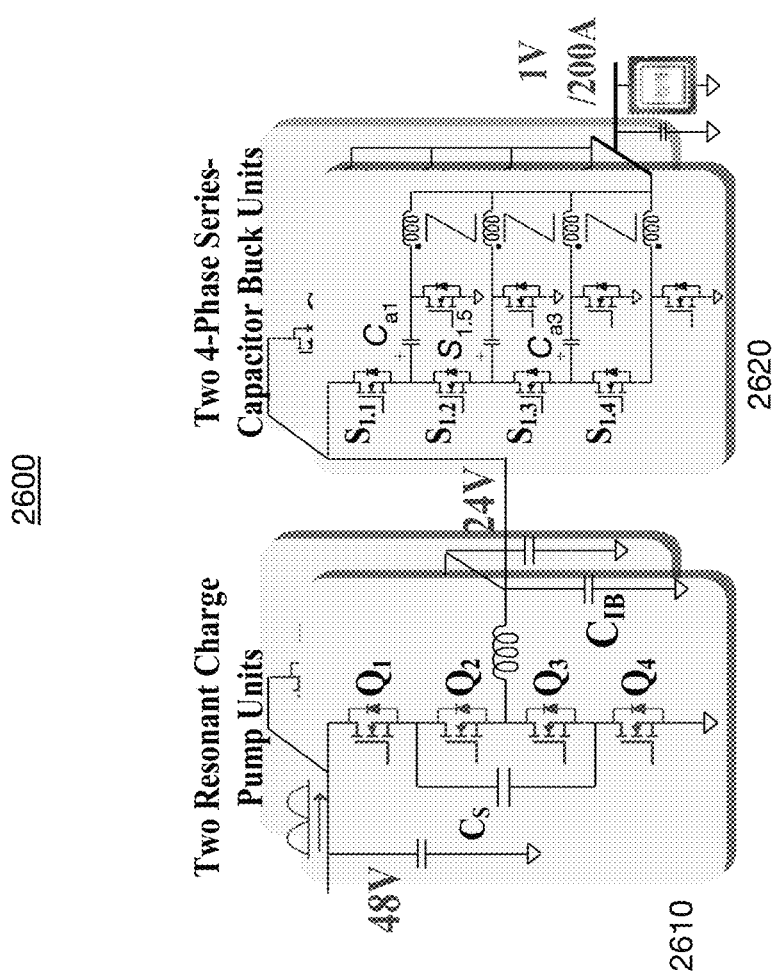
FIG. 26 depicts a schematic diagram illustrating an example multi-stage hybrid power converter that has been built as a prototype in accordance with one or more embodiments.

FIG. 26 depicts a schematic diagram illustrating an example multi-stage hybrid power converter 2600 that has been built and tested as a prototype to verify particular implementations. For example, prototype multi-stage hybrid power converter 2600 may comprise a 48 V-1 V/200 A Point-of-Load converter, wherein a first stage of multi-stage hybrid power converter 2600 may comprise two 2:1 resonant charge pump arrangements 2610 and wherein a second stage of converter 2600 may include two four-phase series-capacitor buck converters 2620. Prototype converter 2600 may be rated for 200 W with 200 A of output current, for example. Of course, although prototype multi-stage hybrid converter 2600 was built and/or tested according to a particular implementation, a great number of variations and alternate implementations are possible and embodiments are not limited in scope in these respects.

Figure 27:
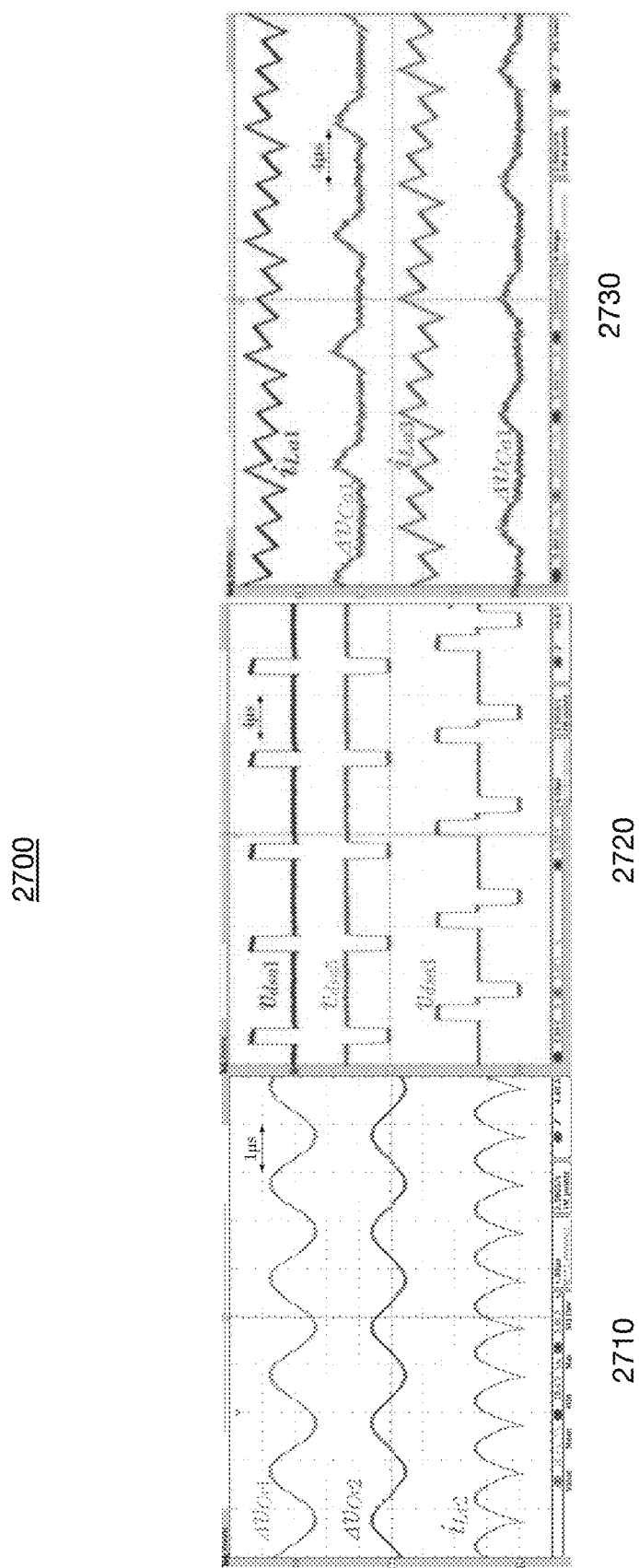
FIG. 27 depicts example measured waveforms of a prototype multi-stage hybrid power converter in accordance with one or more embodiments.

FIG. 27 depicts example measured waveforms of prototype multi-stage hybrid power converter 2600. Waveforms 2710 depict example measured current waveforms for resonant inductor $L_{r2}$ and voltage ripple of the resonant capacitors in the two resonant charge pump arrangements 2610. Waveforms 2720 depict example measured drain-source voltage for switches $S_{1,1}$, $S_{1,5}$ and $S_{1,3}$ in buck arrangements 2620. Waveforms 2730 depict example measured voltage ripple on Cal and Cas and currents $i_{La1}$ and $i_{La1}$ in the coupled inductors in buck arrangements 2620. For prototype converter 2600, the coupled inductor was implemented on a P18 N26 magnetic core with four evenly distributed 90-degree slots and a center rod. Four windings were wound around the four side rods.

Figure 28:
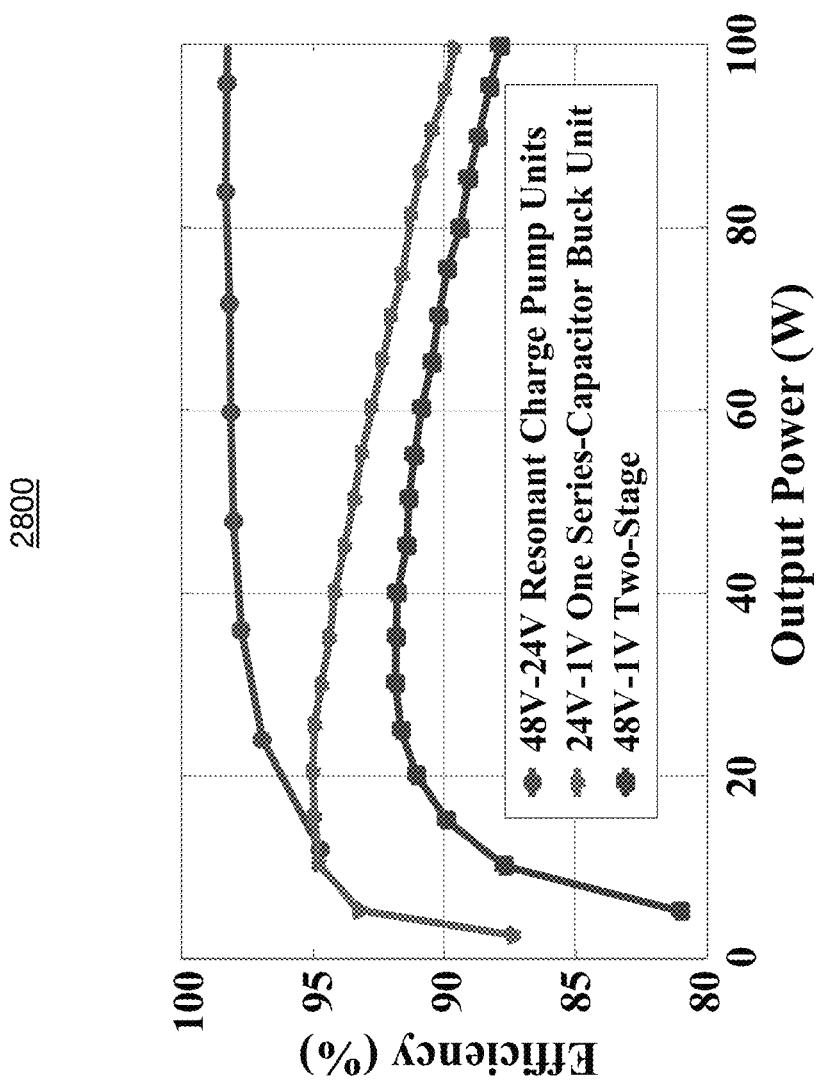
FIG. 28 depicts measured efficiency curves for a 48V-1V/200 A prototype multi-stage hybrid converter in accordance with one or more embodiments.

FIG. 28 depicts measured efficiency curves 2800 for the 48V-1V/200 A prototype multi-stage hybrid converter 2600 depicted in FIG. 26. A peak efficiency for the 48 V-24 V resonant switched capacitor-type first stage 2610 of prototype multi-stage hybrid power converter 2600 was measured to be 98%, and a peak efficiency of the 24 V-1 V four-phase series-capacitor buck converter second stage 2620 was measured to be 95%. The overall efficiency of the prototype 48 V-1 V multi-stage hybrid power converter 2600 was measured to be 92%.

Below, example implementations of multi-stage hybrid power converters are explained in further detail.

Figure 29:
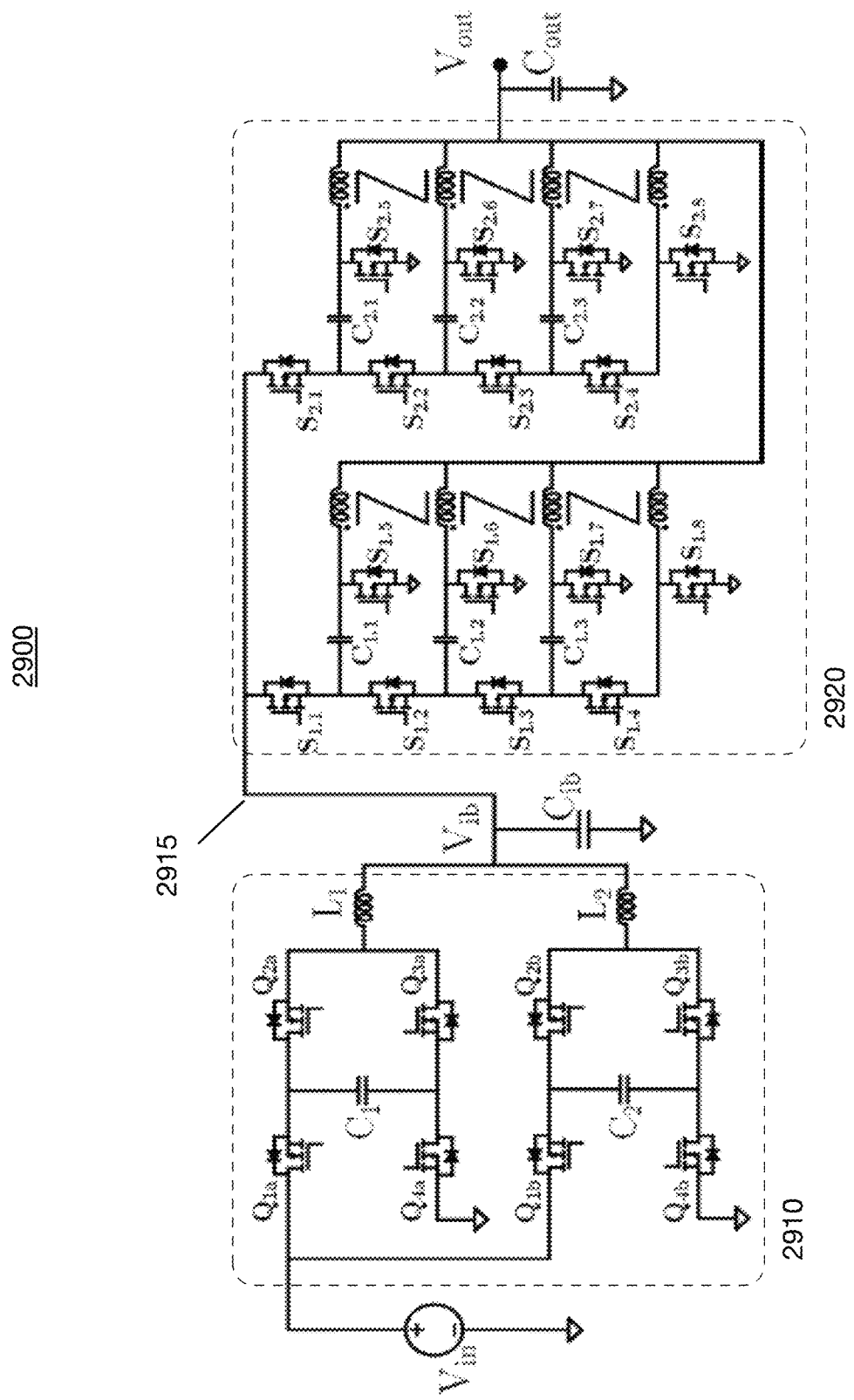
FIG. 29 depicts a schematic diagram of an example 48 V-1 V multi-stage hybrid power converter in accordance with one or more embodiments.

FIG. 29, for example, depicts an example 48 V-1 V multi-stage hybrid power converter 3000 (e.g., Point-of-Load converter) with a 24 V intermediate bus. Topology and/or operation principles of example 48 V-1 V multi-stage hybrid power converter 3000 are presented below. A prototype built in accordance with example 48 V-1 V multi-stage hybrid power converter 2900 (e.g., 48 V-1 V/150 A prototype) has achieved a peak efficiency of 90.6% at 60 A and a full load efficiency of 86.2% at 150 A, for example As depicted at FIG. 29, a first stage 2910 may comprise for a particular implementation two interleaved resonant charge pump converters for 48 V-24 V conversion. Charge pump converters of first stage 2910 may be controlled by a pair of complementary gate drive signals having a 50% duty ratio, for example. In a particular implementation, resonant operation may enable relatively high utilization of magnetics as well as soft-switching opportunities. Further, for example, interleaved operation of two resonant charge pump arrangements may help ensure substantially continuous input current and/or may help minimize input capacitor size. In a particular implementation, a 2:1 resonant charge pump arrangement, such as utilized in first stage 2910, may be unregulated. For example, a 2:1 resonant charge pump arrangement of first stage 2910 may operate at a fixed frequency and may achieve relatively higher efficiency and/or power density.

Figure 30:
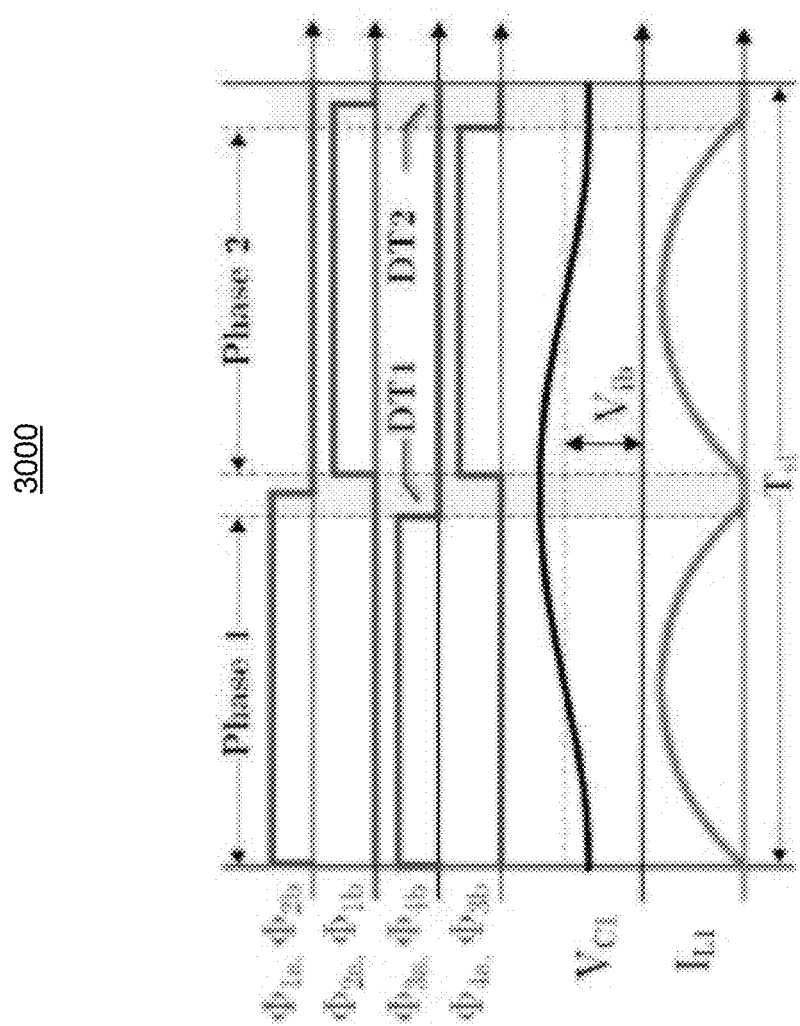
FIG. 30 depicts example waveforms representative of control signals for resonant charge pump arrangements in accordance with one or more embodiments.
Figure 31:
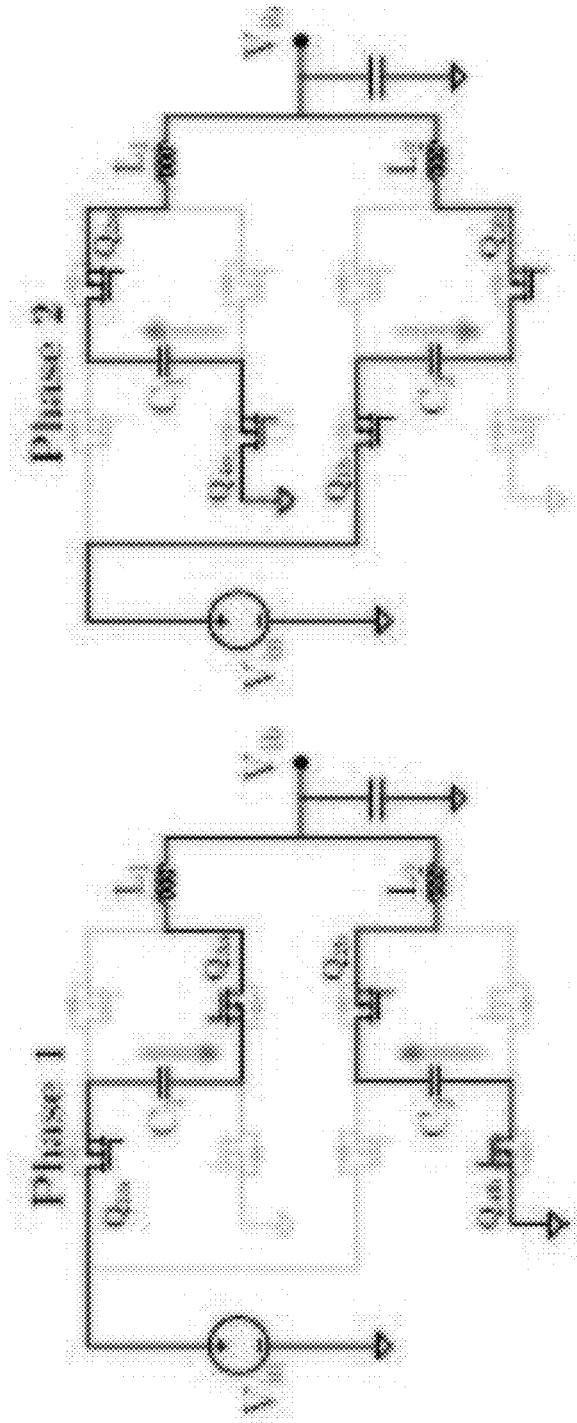
FIG. 31 depicts example phase states of example resonant charge pump arrangements of an example multi-phase hybrid power converter in accordance with one or more embodiments.

FIG. 30 depicts example waveforms representative of control signals for resonant charge pump arrangements of first stage 2910. A particular switching cycle Ts1 may be divided to four particular operational phases, including two charging/discharging phases (Phase 1 and Phase 2) and two dead-time phases (DT 1 and DT 2). Control signals (e.g., $\Phi_{3a}$, $\Phi_{4a}$, $\Phi_{3b}$, $\Phi_{4b}$) corresponding to lower switches (e.g., $Q_{3a}$, $Q_{4a}$, $Q_{3b}$, $Q_{4b}$) of first stage 2910 may be modified by high-side $Q_3a$, control signals (e.g., $\Phi_{1a}$, $\Phi_{2a}$, $\Phi_{1b}$, $\Phi_{2b}$) by enlarging a dead-time to ensure zero-current-switching, in an implementation. States of resonant charge pump arrangements of first stage 2910 in phase 1 and phase 2 are depicted in FIG. 31. In a particular implementation, charging and/or discharging states of the two capacitors in the charge pumps may be swapped transitioning between phase 1 and phase 2.

During a dead-time period, low side control signals are low while high side control signals are still high. A resonant current may be freewheeling in a body-diode of a MOSFET, such as may be utilized as switches in first stage 2910 charge pump arrangements, and the resonant current may be naturally blocked when the current falls to zero. Thus, switches in the resonant charge pump arrangements of first stage 2910 may achieve zero-current-switching for both turn-on and turn-off actions, in a particular implementation. In a particular implementation, the two inductors at the output of the resonant charge pumps of first stage 2910 may be combined, although embodiments are not limited in scope in this respect.

For some switched capacitor-type converters, capacitors may be electrically connected in parallel. Voltage differences among capacitors may causes relatively higher current spikes and/or may cause charge sharing loss in some circumstances. In the resonant charge pump arrangement of first stage 2910, capacitors C1 and C2 may not be directly electrically connected in parallel, in an implementation. Also, for example, C1 and C2 may be softly charged and/or discharged by resulting sinusoidal resonant currents.

In an implementation, a second stage 2920 of multi-stage hybrid power converter 2900 may comprise two parallel-connected series-capacitor buck converters with multi-phase coupled inductors. Multiple (e.g., two for example converter 2900) parallel structures may advantageously support higher-current load applications, for example. In an implementation, a series-input parallel-output configuration of a series-capacitor buck converter may decouple voltage stress from an input node and may decouple current stress from an output node. A 24 V intermediate bus voltage on intermediate bus 2915 may be substantially equally distributed among the four levels of the example parallel-connected series-capacitor buck converters of second stage 2920. In an implementation, four series-stacked switches and their complementary switches from second stage 2920 may be controlled in a similar way as an interleaved multi-phase buck converter with 6 V as a switch node voltage. A dc voltage bias may supported, for example, by series capacitors $C_{1.1}$, $C_{1.2}$, and/or $C_{1.3}$ with dc bias values of 18 V, 12 V and 6 V from top to bottom, respectively.

Figure 32:
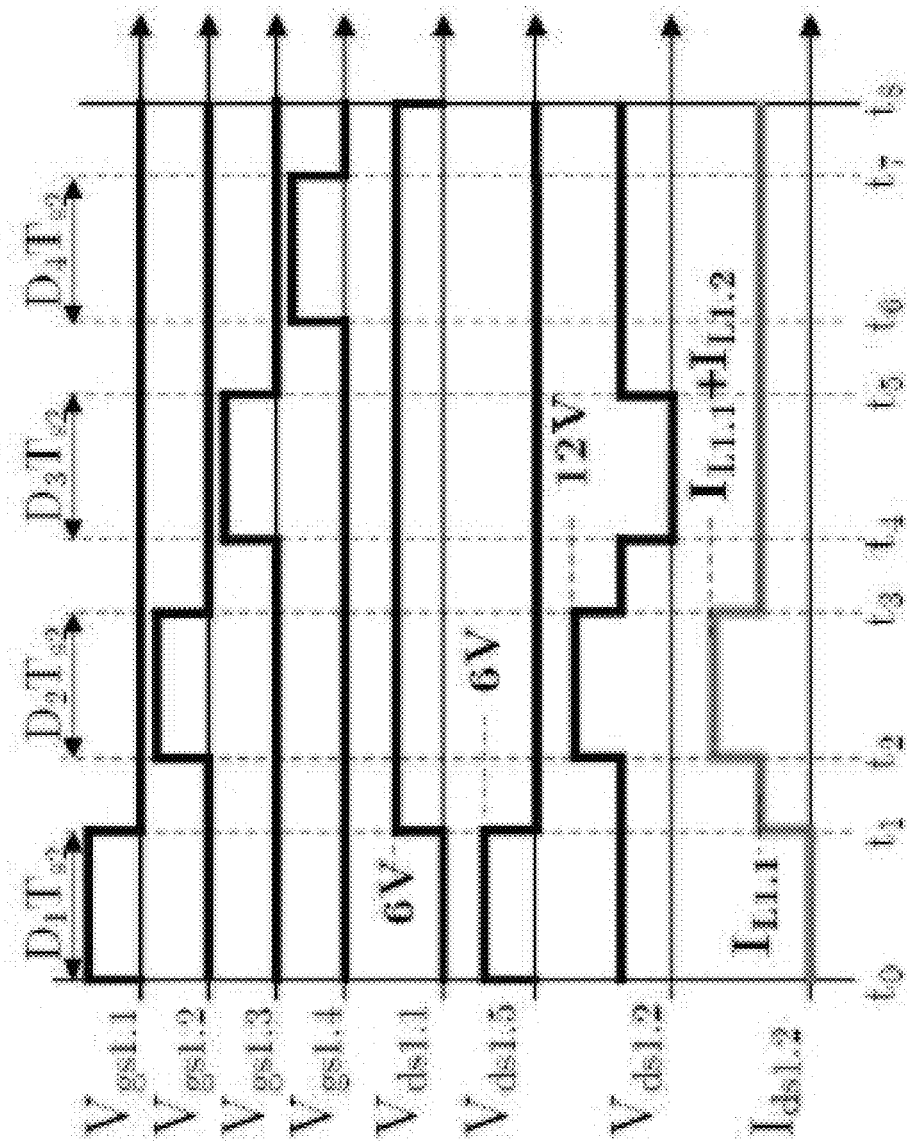
FIG. 32 depicts example waveforms for control signals for example four-phase series-capacitor buck converters in accordance with one or more embodiments.
Figure 33:
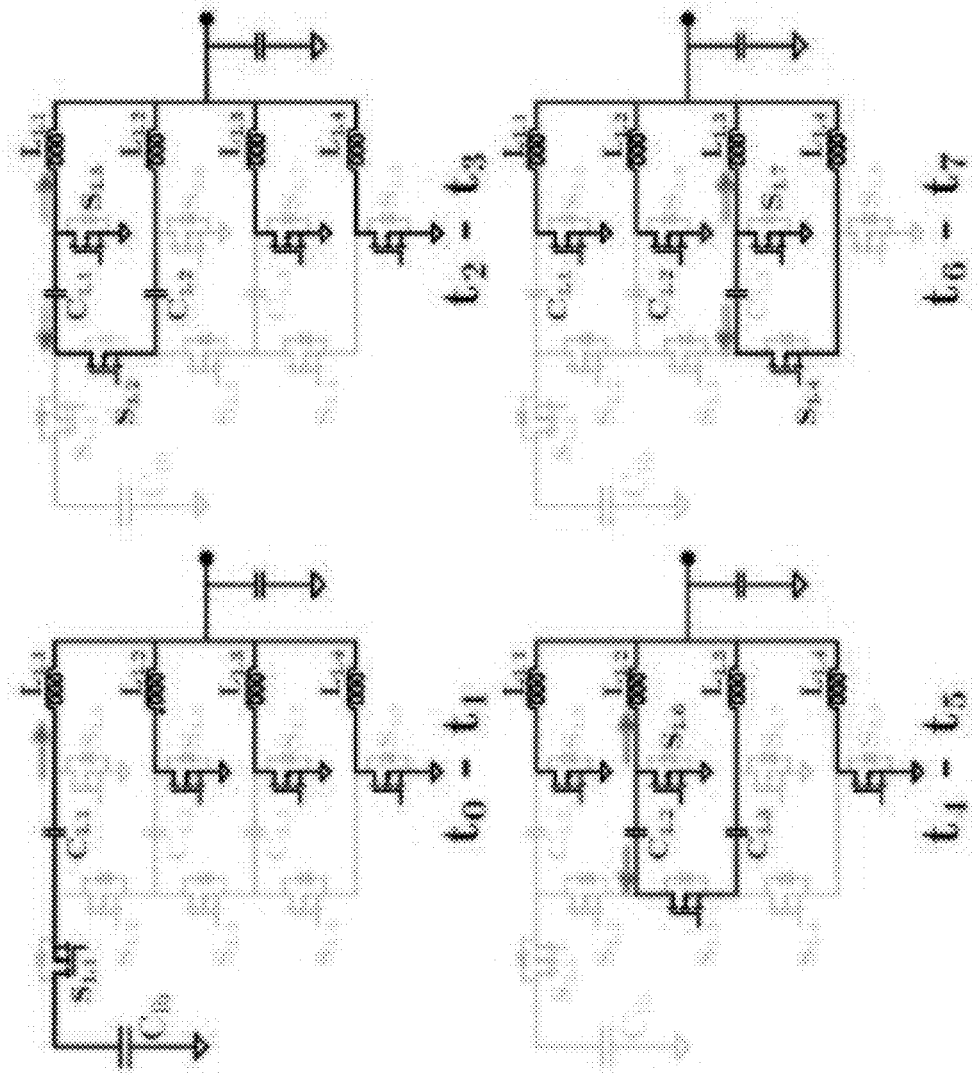
FIG. 33 shows a current flow of an example series-capacitor buck converter during a particular switching cycle in accordance with one or more embodiments.

FIG. 32 depicts example waveforms 3200 for control signals $V_{gs1.1}$, $V_{gs1.2}$, $V_{gs1.3}$ and $V_{gs1.4}$, drain-source voltages $V_{ds1.1}$, $V_{ds1.5}$ and $V_{ds1.2}$ and drain-source current $I_{ds1.2}$ of one of the four-phase series-capacitor buck converters of second stage 2920. Also, FIG. 33 shows a current flow of a series-capacitor buck converter of second stage 2920 during a particular switching cycle Ts2. In an implementation, control signals for the four phases may be substantially equally interleaved. Also, in an implementation, duty cycle ratios $D_1$-$D_4$ of respective high side switches $S_{1.1}$-$S_{1.4}$ may be smaller than 25% to charge and/or discharge series capacitors $C_{1.1}$-$C_{1.3}$ in a sequence. Individual series-capacitor buck phases are performing 6 V-1 V conversions and switches may be switching at 6 V, for example. Voltage stress of low side switches $S_{1.5}$-$S_{1.8}$ may be 6 V, for example, which may be similar to the low side switches in a 6 V-1 V buck converter. In a particular implementation, a voltage stress of switch $S_{1.1}$ may also be 6 V. An approximately maximum voltage blocked by switches $S_{1.1}$, $S_{1.1}$ and $S_{1.4}$ may be 12 V, in a particular implementation. An approximately maximum current of individual high side switches may be equal to an inductor current, which may also be similar to a 6 V-1 V buck converter, for example. Current ratings for low side switches $S_{1.5}$-$S_{1.7}$ may be relatively higher because they carry a freewheeling current for their own phase and a charging current for a neighboring phase for a short period. This may result in a relatively higher RMS current and/or a relatively higher conduction loss as compared with a multi-phase buck converter. A current waveform of $S_{1.8}$ may be similar to that of a low side switch in a 6 V-1 V buck converter, for example.

With similar voltage stress, current stress and/or duty ratios, the 24 V-1 V four-phase series capacitor buck converter of second stage 2920 of multi-stage hybrid power converter 2900, for example, may be expected to achieve similar performance as a 6 V-1 V four-phase buck converter. Further, as a hybrid switched capacitor topology for a particular implementation, capacitors $C_{1.1}$-$C_{1.3}$ in the series-capacitor buck converter of second stage 2920 may be softly charged and/or discharged by inductor current with square wave operation. Size of capacitors $C_{1.1}$-$C_{1.3}$, for example, may be limited by an equivalent series resistance but not limited by a maximum voltage ripple. Capacitors $C_{1.1}$-$C_{1.3}$, for example, may be sized relatively smaller because charge sharing loss may be substantially eliminated by soft-charging.

In a particular implementation, individual switched capacitors of a second stage, such as second stage 2920, may be charged by a particular inductor current for one ON-period and/or may be discharged by another particular inductor current during an ON-period of a next level. For example, capacitor $C_{1.1}$ may be charged by inductor current $iL_{1.1}$ from point in time $t_0$ to point in time $t_1$ and/or may be discharged by inductor current $iL_{1.2}$ from point in time $t_2$ to point in time $t_3$. By applying a voltage-second balance of an inductor and a charge balance of a series capacitor in individual phases, a large signal average model of a four-phase series-capacitor buck converter, such as depicted in example second stage 2920, for example, may be expressed according to relations (1) and (2), provided below.

$$V_{out} = D_1(V_{ib} - V_{C1.2}) = D_2(V_{C1.1} - V_{C1.2}) \qquad (1)$$
$$= D_3(V_{C1.2} - V_{C1.3}) = D_4 V_{C1.3},$$

$$D_1 I_{L1.1} = D_2 I_{L1.2} = D_3 I_{L1.3} = D_4 I_{L1.4}. \qquad (2)$$

In a particular implementation, $V_{C1.1}$-$V_{C1.3}$ may represent an average voltage at capacitors $C_{1.1}$-$C_{1.3}$ and $IL_{1.1}$-$IL_{1.3}$ may represent an average current of inductors $L_{1.1}$-$L_{1.4}$. Combining relations (1) and (2), a steady state value of state variables may be calculated in accordance with example relations (3), below.

$$V_{C1.1} = GV_{ib}\left(\frac{1}{D_2} + \frac{1}{D_3} + \frac{1}{D_4}\right), \qquad (3)$$

$$V_{C1.2} = GV_{ib}\left(\frac{1}{D_3} + \frac{1}{D_4}\right),$$

$$V_{C1.3} = GV_{ib}\frac{1}{D_4},$$

$$I_{L1.1} = \frac{I_{out}}{GD_1}, I_{L1.2} = \frac{I_{out}}{GD_2},$$

$$I_{L1.3} = \frac{I_{out}}{GD_3}, I_{L1.4} = \frac{I_{out}}{GD_4}.$$

In an implementation, $I_{out}$ may represent an average output current. G, for example, may represent a voltage conversion ratio $$G = \frac{V_{out}}{V_{ib}} = \frac{1}{\frac{1}{D_1} + \frac{1}{D_2} + \frac{1}{D_3} + \frac{1}{D_4}}.$$

If all four phases have substantially the same duty ratio, their average inductor currents may be substantially equal as well. Thus, the current balancing may be substantially ensured in circumstances wherein $D_1=D_2=D_3=D_4$. An average voltage of series capacitors may also be controlled in accordance with duty ratio. With substantially equal duty ratio, average voltages of series capacitor $C_{1.1}$-$C_{1.3}$ may be calculated in accordance with relations $$\frac{3V_{ib}}{4}, \frac{2V_{ib}}{4} \text{ and } \frac{V_{ib}}{4},$$

respectively.

In at least some circumstances, a duty ratio for individual phases of a series-capacitor buck converter such as implemented in example second stage 2920, for example, may advantageously be designated to be smaller than 1/N, where N is the number of phases. A maximum voltage conversion ratio of a series-capacitor buck converter with N series-stacked phases may be calculated in accordance with example relation $N^2$:1. For a four-phase series-capacitor buck converter arrangement, a 25% duty ratio may lead to a voltage conversion ratio of 16:1, for example. With a 24V input voltage, a nominal and/or advantageous output voltage may be 1.5V. A lower duty ratio may lead to relatively lower output voltage for a point-of-load converter, such as example multi-stage hybrid power converter 2900, for example. With the 2:1 front-end stage, such as first stage 2910, an overall voltage conversion ratio may be specified in accordance with relation (4), provided below:

$$\frac{V_{out}}{V_{ib}} = \frac{2}{G} : 1. \quad (4)$$

In an implementation with a substantially equal duty ratio for a series-capacitor buck converter, such as employed in example second stage 2920 of multi-stage hybrid power converter 2900, an overall voltage conversion ratio may be simplified to a relation 8/D:1 where D represents a duty ratio.

Figure 34:
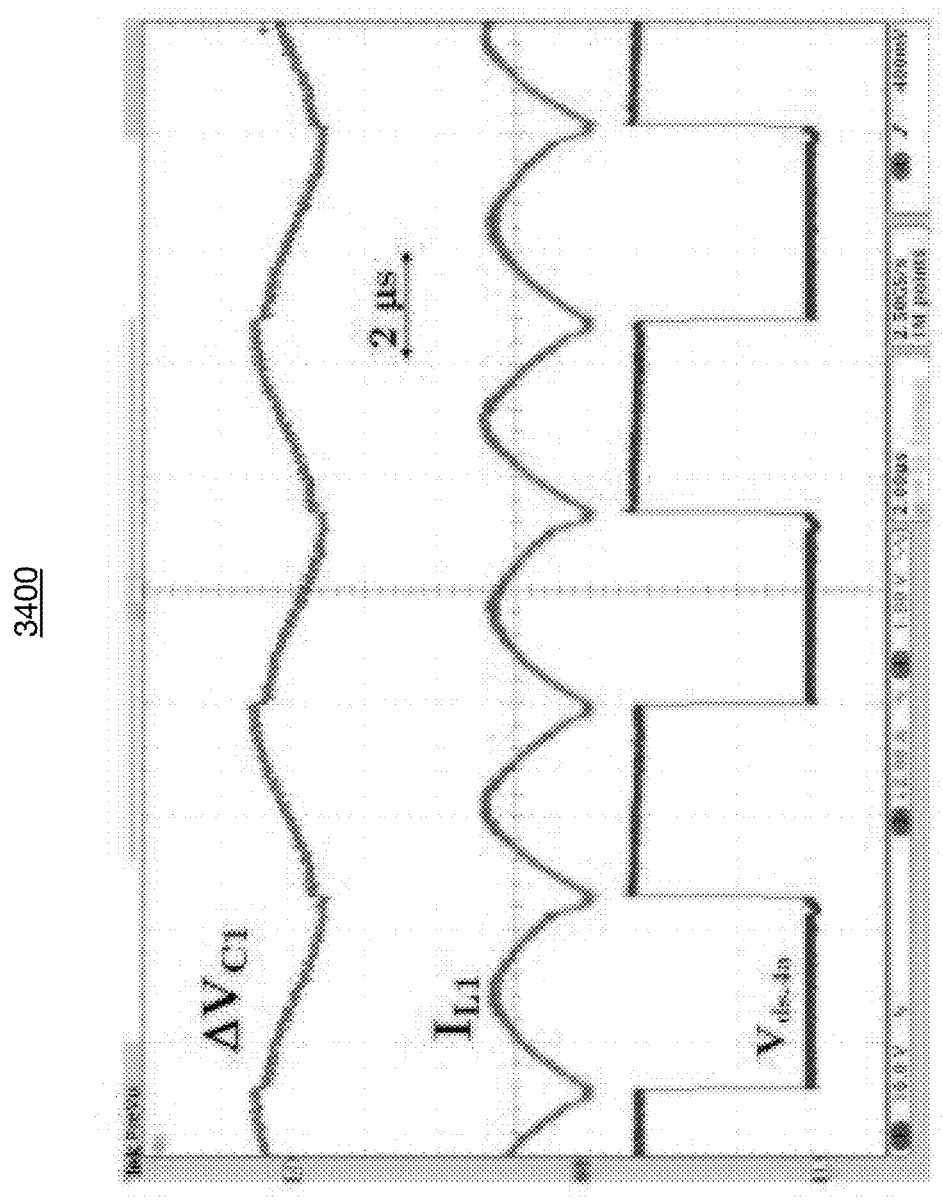
FIG. 34 depicts example waveforms showing measured capacitor voltage ripple, resonant inductor current and drain-source voltage in an example resonant charge pump in accordance with one or more embodiments.

As mentioned, a prototype was built in accordance with example 48 V-1 V multi-stage hybrid power converter 2900 depicted in FIG. 29. Various experimental results have been gathered. For example, FIG. 34 depicts example waveforms showing measured capacitor voltage ripple $\Delta V_{C1}$ at capacitor $C_1$, resonant inductor current $I_{L1}$ for inductor $L_1$ and a drain-source voltage $V_{ds.4a}$ of a bottom switch $Q_{4a}$ in a resonant charge pump of first stage 2910. For the prototype converter, a switching frequency of interleaved resonant charge pumps of first stage 2910 is 166 kHz which is slightly lower than resonant frequency. A small period of a zero-current state may be observed during a dead-time showing that zero-current-switching was achieved.

Figure 35:
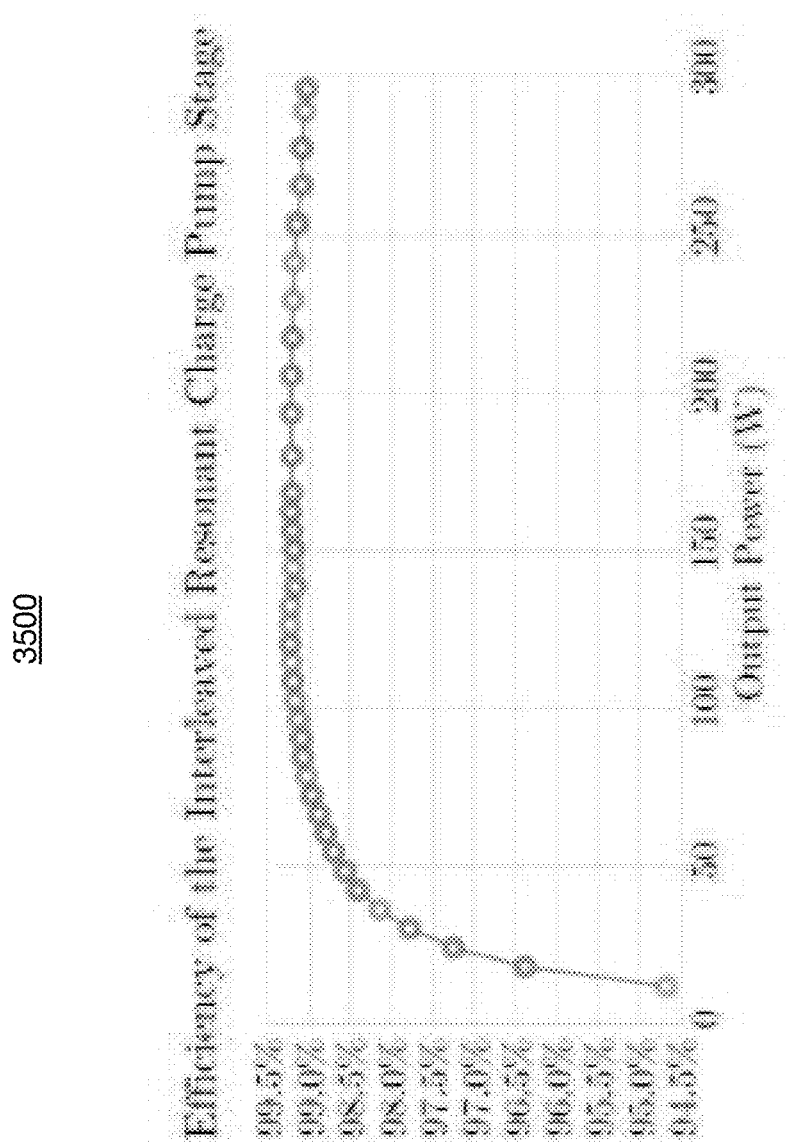
FIG. 35 depicts a graph showing measured efficiency of example 48 V-24 V interleaved resonant charge pumps of a first stage in accordance with one or more embodiments.
Figure 36:
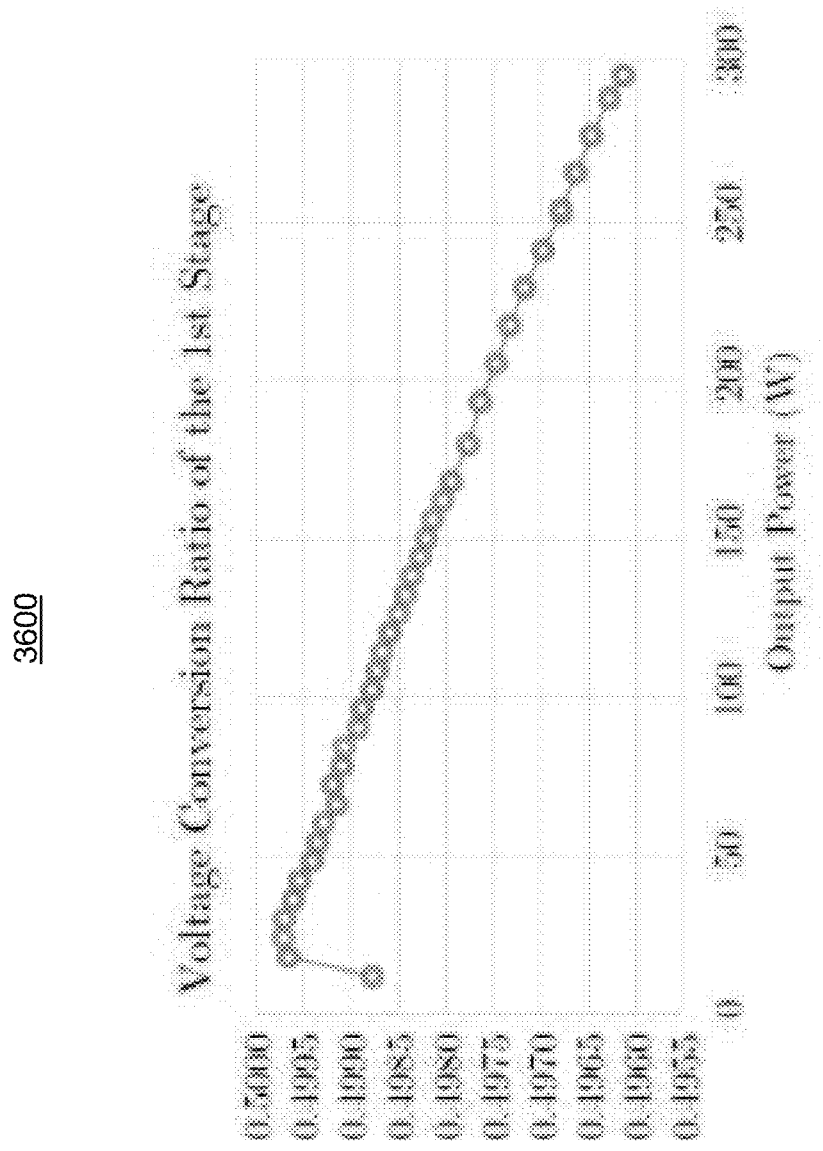
FIG. 36 depicts a graph showing measured voltage conversion ratio for an example first stage as a function of output power in accordance with one or more embodiments.

FIG. 35 depicts a graph 3500 showing measured efficiency of the 48 V-24 V interleaved resonant charge pumps of first stage 2910. In the prototype of multi-stage hybrid power converter 2900, first stage 2910 achieves 99.2% peak efficiency at 100 W, and further achieves above 99% efficiency at 300 W, as can be seen in graph 3500. Benefiting from a relatively higher efficiency, the power capacity of first stage 2910 is significantly higher than series-capacitor buck converters of second stage 2920. First stage 2910 may deliver power to additional paralleled series-capacitor buck converters to cover a higher output current range. For example, FIG. 36 depicts a graph 3600 showing a measured voltage conversion ratio $V_{ib}/V_{in}$ of first stage 2910 as a function of output power. An output resistance of first stage 2910 is relatively very low. The voltage conversion ratio was observed to drop slightly with increments of output power. A reduction of an intermediate bus voltage was observed to be less than 0.8% with the power up to 300 W.

Figure 37:
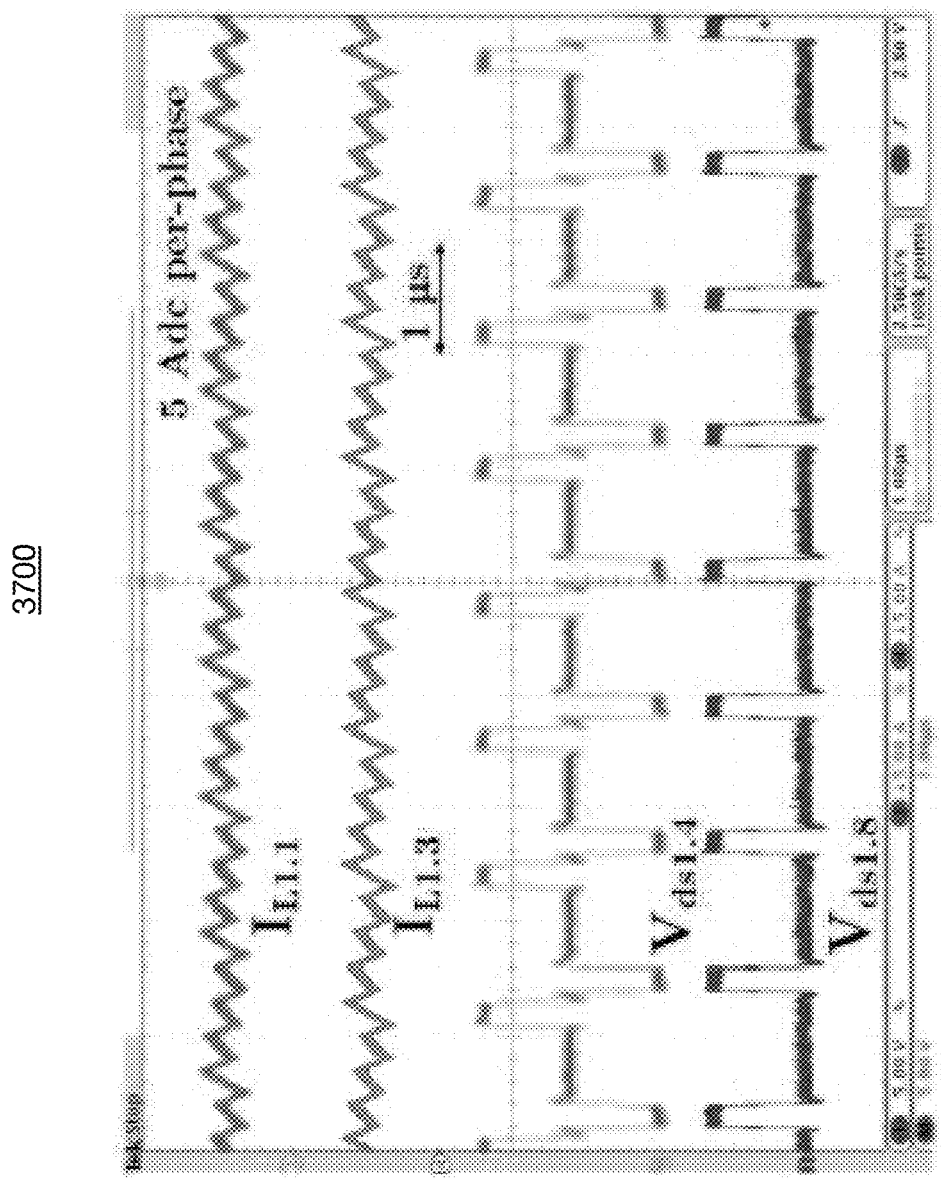
FIG. 37 depicts waveforms representative of coupled inductor currents and drain-source voltages for an example series-capacitor buck converter of a second stage in accordance with one or more embodiments.

FIG. 37 depicts waveforms 3700 representative of coupled inductor currents $I_{L1.1}$ and $I_{L1.3}$ and drain-source voltages $V_{ds1.4}$ and $V_{ds1.8}$, for the series-capacitor buck converter of second stage 2920. Waveforms 3700 were measured with a customized coupled inductor at a switching frequency of 833 kHz. A duty ratio of the four-phase series capacitor buck converter of second stage 2920 for 48 V-1 V conversion is ⅙. A ripple frequency of the coupled inductor current is four times the switching frequency of the series-capacitor buck converter. A peak-to-peak current ripple is 2.5 A, which indicates a per phase steady state inductance $L_{pss}$ of 400 nH. Drain-source voltages of the high side switch and the low side switch were observed to match theoretical analysis. An approximate maximum voltage of switch $S_{1.4}$ is 12 V and an approximate maximum voltage of switch $S_{1.8}$ is 6 V. Both switches are switching at approximately 6V.

Figure 38:
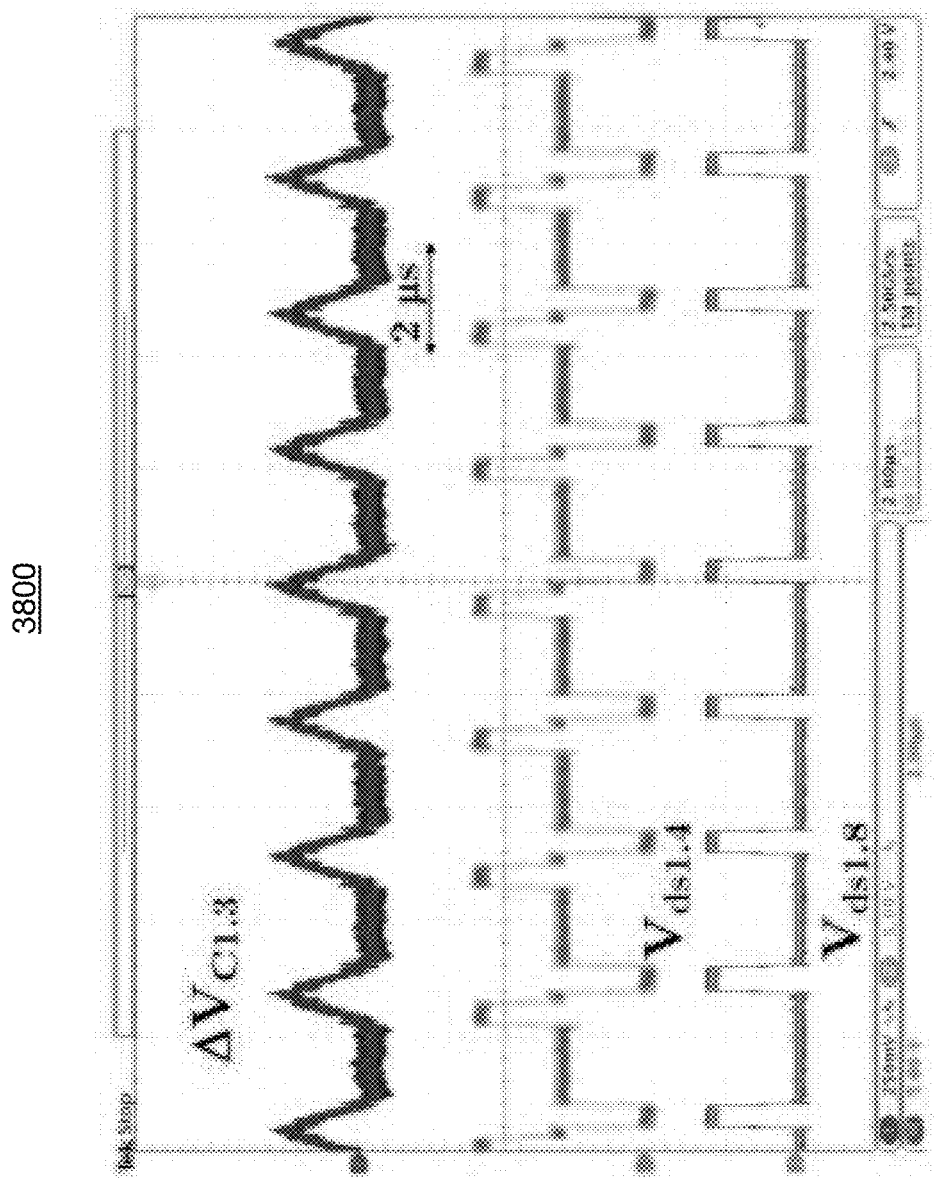
FIG. 38 depicts waveforms showing a measured voltage ripple and drain-source voltages for an example 24 V-1 V series-capacitor buck converter in accordance with one or more embodiments.

FIG. 38 depicts waveforms 3800 showing a measured voltage ripple $\Delta V_{C1.3}$ at capacitor $C_{1.3}$, drain-source voltages $V_{ds1.4}$ and $V_{ds1.8}$ for switch $S_{1.4}$ and $S_{1.8}$ in 24 V-1 V series-capacitor buck converter of second stage 2920 working at 60 A/416 kHz. Series capacitor $C_{1.3}$ is charged for a period of $DT_{s2}$ and then discharged for another period of $DT_{s2}$ by a neighboring phase.

Figure 39:
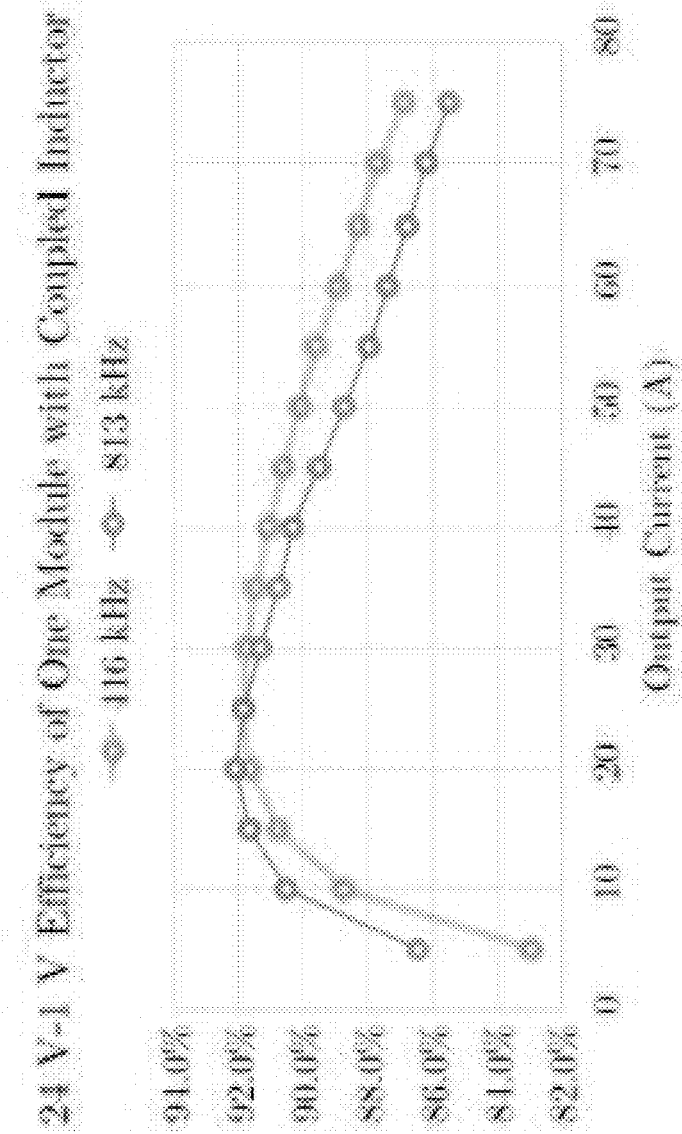
FIG. 39 depicts a graph showing an efficiency comparison of a 24 V-1 V series-capacitor buck converter with coupled inductor at multiple switching frequencies, in accordance with one or more embodiments.

FIG. 39 depicts a graph 3900 showing an efficiency comparison of a 24 V-1 V series-capacitor buck converter with coupled inductor, such as implemented in second stage 2920, working at 416 kHz and at 833 kHz. An output voltage was maintained at 1V via feedback control during the efficiency measurement. For the prototype converter 2900, the series-capacitor buck arrangement of second stage 2920 achieves 92.1% peak efficiency at 1 V/20 A, and above 85.5% efficiency at 1 V/75 A with a switching frequency of 833 kHz. It reaches 91.8% peak efficiency at 1 V/25 A, and reaches above 87% efficiency at 1 V/75 A with a switching frequency of 416 kHz. The efficiency curves for the two switching frequencies cross at an output current of 25 A. Efficiency at 813 kHz switching is higher below 25 A, and efficiency at 416 kHz switching is higher above 25 A. One possible explanation may be that conduction loss may be dominated by current ripple with a light load and by the average current with a heavy load. Based at least in part on the coupled inductor design and the measured results for prototype converter 2900, the peak-to-peak current ripple is 2.5 A with 833 kHz and 5 A with 416 kHz. In circumstances wherein ripple is close or larger than an average current, a root-mean-square (RMS) current of switches, capacitors and/or inductors of second stage 2920 may be mostly determined by current ripple. Higher current ripple may lead to higher conduction loss, for example. When output current goes higher, conduction loss with 2.5 A ripple and 5 A ripple is similar. Thus, efficiency at 416 kHz switching may be higher due at least in part to reduced switching loss. However, the core loss mechanism of the coupled inductor is still unknown and worth to be researched.

Figure 40:
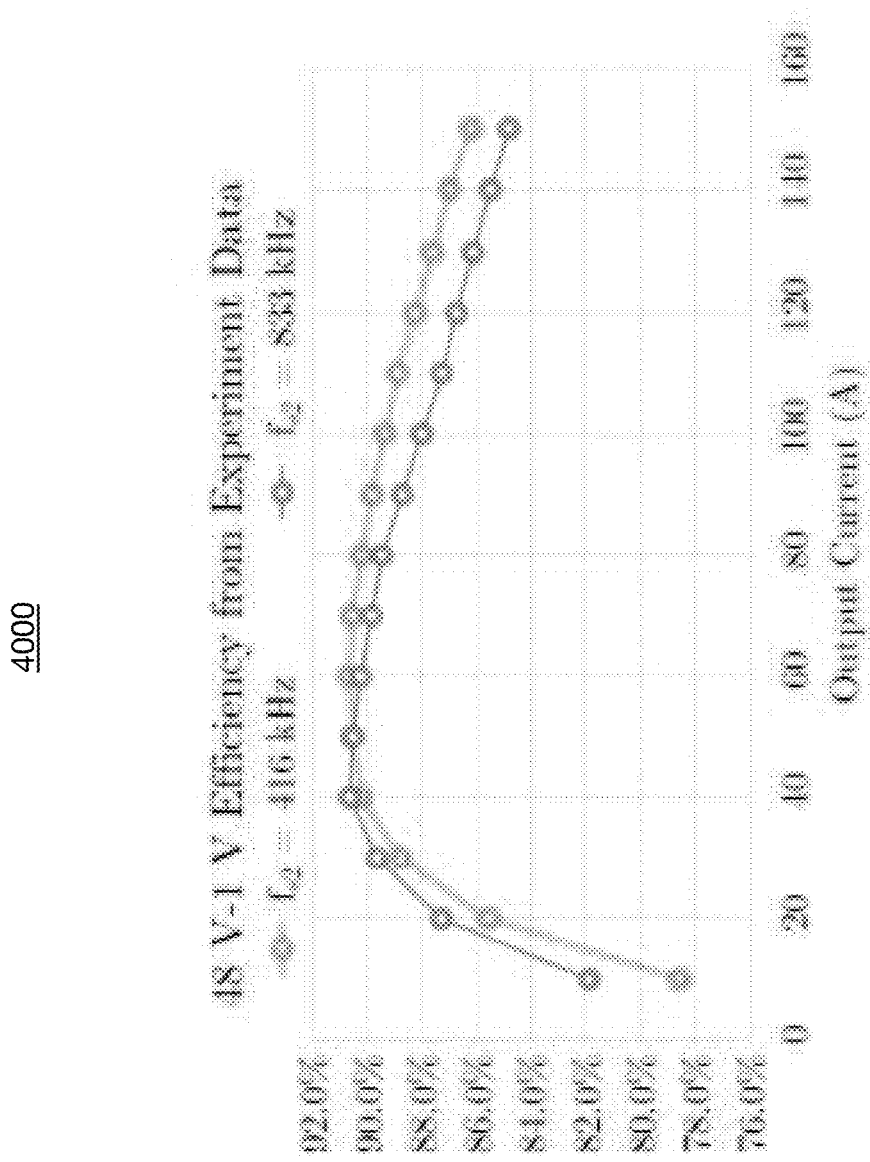
FIG. 40 depicts a graph showing full system efficiency by combining example first and second stages with a 24 V intermediate bus in accordance with one or more embodiments.

FIG. 40 depicts a graph 4000 showing full system efficiency by combining the first and second stages 2910 and 2920 with a 24 V intermediate bus 2915, as depicted in FIG. 29. Peak system efficiency for prototype converter 2900 is 90.6% at 1 V/60 A, and full load efficiency is above 86.2% with the series capacitor buck arrangement of second stage 2920 working at 416 Hz. Performance of several aspects of example 48 V-1 V multi-stage hybrid power converter 2900 are summarized in Table I. For example, power density of the 48 V-1 V converter 2900 is 283 W/in$^3$, with a current density of 0.346 A/mm$^2$.

TABLE 1

Performance Summary of Multi-Stage 48 V-1 V Hybrid Power Converter

| Circuit | Input | Output | Peak eff. | Full load eft. | PCB area | Box vol. | Power Density | Current Density |
|---|---|---|---|---|---|---|---|---|
| 2:1 resonant charge pump | 48 V | ~24 V | 99.2% @ 120 W | 90.0% @ 150 W | 434 mm$^2$ | 0.122 in$^3$ | 1230 W/in$^3$ | 0.014 A/mm$^2$ |
| 24:1 series-capacitor buck | 24 V | 1 V | 92.1% @ 40 W | 87.0% @ 150 W | 434 mm$^2$ | 0.408 in$^3$ | 368 W/in$^3$ | 0.346 A/mm$^2$ |
| Multi-stage 48 V-1 V PoL hybrid power converter | 48 V | 1 V | 90.6% @ 60 W | 86.2% @ 150 W | 434 mm$^2$ | 0.530 in$^3$ | 283 W/in$^3$ | 0.346 A/mm$^2$ |

Figure 41:
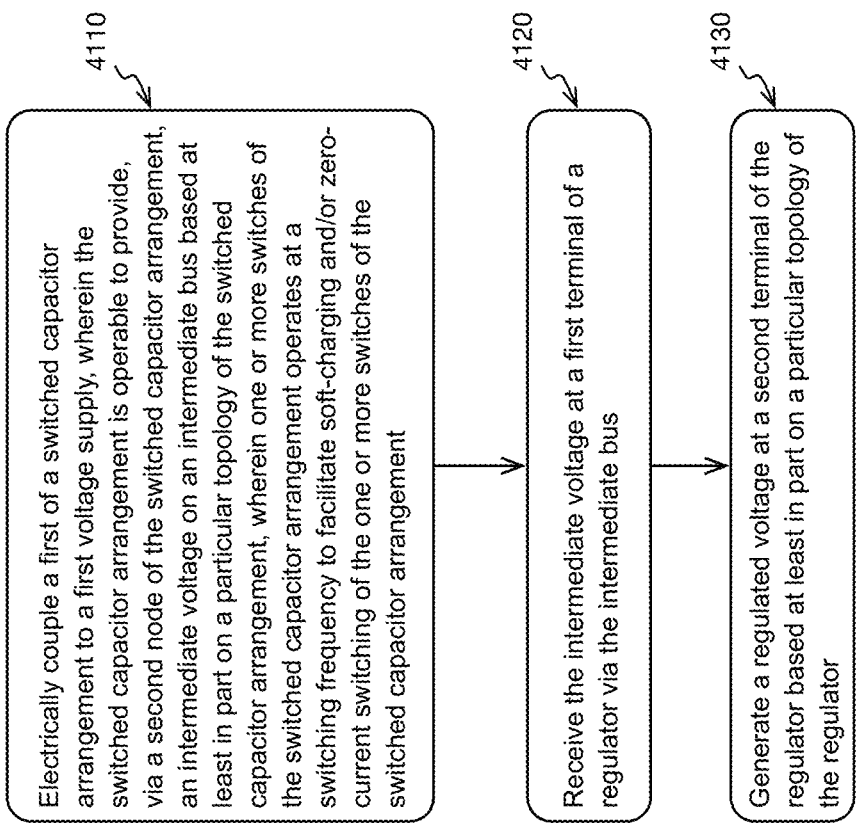
FIG. 41 is an illustration of an example flow diagram depicting an example process for converting and/or regulating a voltage, in accordance with one or more embodiments.

FIG. 41 is an illustration of an example flow diagram depicting an example process for converting and/or regulating a voltage signal. It should be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features.

In a particular implementation, as depicted at block 4110, an example process for converting and/or regulating a voltage signal may include electrically coupling a first node of a switched capacitor arrangement, such as switched capacitor arrangement 110 of FIG. 1, to a first voltage supply, wherein the switched capacitor arrangement is operable to provide, via a second node of the switched capacitor arrangement, an intermediate voltage on an intermediate bus, such as intermediate bus 120 of FIG. 1, based at least in part on a particular topology of the switched capacitor arrangement. In an implementation, one or more switches of the switched capacitor arrangement may operate at a switching frequency to facilitate soft-charging and/or zero-current switching of the one or more switches of the switched-capacitor arrangement.

Further, in a particular implementation, an intermediate voltage may be received at a first node of a regulator, such as regulator 130 of FIG. 1, via an intermediate bus, such as intermediate bus 120, for example, as depicted at block 4120. Additionally, as depicted at block 4130, a regulated voltage may be generated at a second node of the regulator based at least in part on a particular topology of the regulator.

Figure 42:
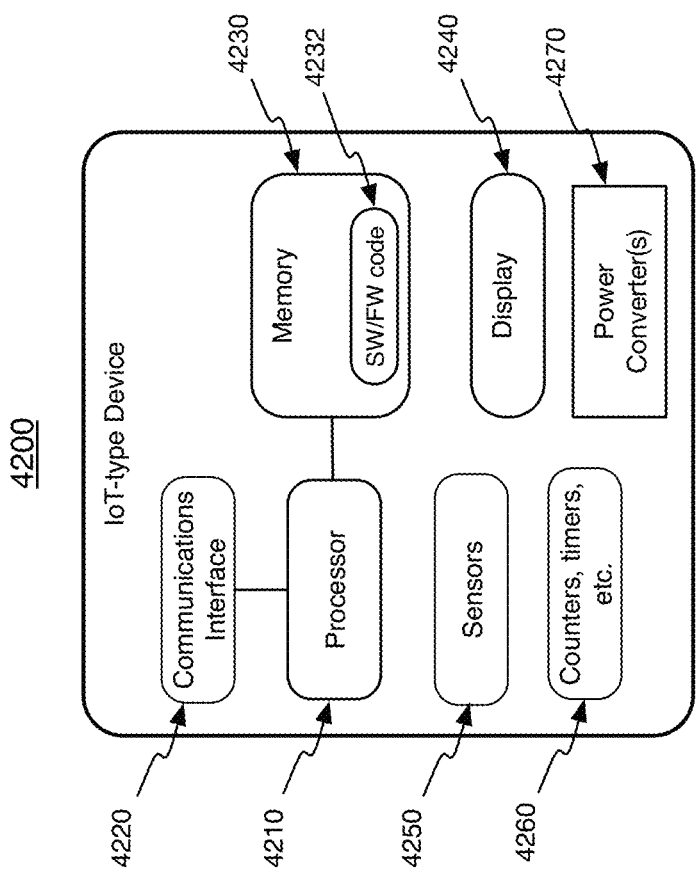
FIG. 42 is a schematic block diagram depicting an embodiment of an example Internet of Things (IoT) type device.

FIG. 42 is an illustration of an embodiment 4200 of an example particular IoT device. Of course, claimed subject matter is not limited in scope to the particular configurations and/or arrangements of components depicted and/or described for example devices mentioned herein. In an embodiment, an IoT-type device, such as 4200, may comprise one or more processors, such as processor 4210, and/or may comprise one or more communications interfaces, such as communications interface 4220. In an embodiment, one or more communications interfaces, such as communications interface 4220, may enable wireless communications between an electronic device, such as an IoT-type device 4200, and one or more other computing devices. In an embodiment, wireless communications may occur substantially in accordance any of a wide range of communication protocols, such as those mentioned herein, for example.

In a particular implementation, an IoT-type device, such as IoT-type device 4200, may include a memory, such as memory 4230. In a particular implementation, memory 4230 may comprise a non-volatile memory, for example. Further, in a particular implementation, a memory, such as memory 4230, may have stored therein executable instructions, such as for one or more operating systems, communications protocols, and/or applications, for example. A memory, such as 4230, may further store particular instructions, such as software and/or firmware code 4232, that may be updated via one or more example implementations and/or embodiments described herein. Further, in a particular implementation, an IoT-type device, such as IoT-type device 4200, may comprise a display, such as display 4240, and/or one or more sensors, such as one or more sensors 4250. As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Example sensors may include, but are not limited to, one or more accelerometers, gyroscopes, thermometers, magnetometers, barometers, light sensors, proximity sensors, heart-rate monitors, perspiration sensors, hydration sensors, breath sensors, cameras, microphones, etc., and/or any combination thereof.

In particular implementations, IoT-type device 4200 may include one or more timers and/or counters and/or like circuits, such as circuitry 4260, for example. In an embodiment, one or more timers and/or counters and/or the like may track one or more aspects of device performance and/or operation.

Additionally, IoT-type device 4200 may include one or more power converters 4270. In particular implementations, power converter 4270 may comprise one or more example implementations described herein. In a particular implementation, power converter circuits 4270 may provide power to one or more circuits, sensors, processors, memory devices, display devices, communications interfaces, etc., of IoT-type device 4200.

Although FIG. 42 depicts a particular example implementation of an IoT-type device, such as IoT-type device 4200, other embodiments may include other types of electronic and/or computing devices incorporating microprocessors and/or servers at data centers, for example. Example types of electronic and/or computing devices may include, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, or any combination of the foregoing.

In particular implementations, power converters 4270, for example, may include at least some aspects of multi-stage hybrid power converters, such as example implementations described herein. Embodiments of multi-stage hybrid power converters, for example, may include a resonant switched capacitor arrangement having a first node and a second node, the resonant switched capacitor arrangement may include a first plurality of inductors to be coupled to the second node. A multi-stage hybrid power converter, in an implementation, may also include a regulator arrangement having a second plurality of inductors in an electrical configuration with the resonant switched capacitor arrangement. In an implementation, the first node of the resonant switched capacitor arrangement may be coupled to a first voltage supply node, wherein the resonant switched capacitor arrangement may be operable to provide, via the second node of the resonant switched capacitor arrangement, a first intermediate voltage based at least in part on a particular topology. Also, in an implementation, the regulator arrangement may receive the first intermediate voltage at the first node of the regulator arrangement and the regulator arrangement may generate a regulated voltage at a second node of the regulator arrangement based, at least in part, on the electrical configuration and the particular topology.

In an implementation, during operation, the regulator arrangement may affect, at least in part, charging or discharging, or a combination thereof, of a plurality of capacitors of the resonant switched capacitor arrangement. In an implementation, the second plurality of inductors may comprise coupled inductors. Further, in an implementation, the regulator arrangement may comprise a series capacitor buck converter. In an implementation, the series capacitor buck converter may comprise a four-level series capacitor buck converter. Also, in an implementation, the electrical configuration may include an intermediate bus to interconnect the resonant switched capacitor arrangement and the regulator arrangement. In an implementation, at most about 10% of current provided by the switched capacitor voltage divider arrangement to the intermediate bus may be conducted through a decoupling capacitor away from the intermediate bus.

Further, in an implementation, the intermediate bus may comprise a substantially non-capacitive power path to be formed between the second node of the resonant switched capacitor arrangement and the first node of the regulator arrangement, wherein the power path may exclude capacitors. Also, in an implementation, the resonant switched capacitor arrangement may comprise a resonant switched capacitor voltage divider arrangement. Further, in an implementation, the regulator arrangement to comprise a multi-phase voltage regulator arrangement. In an implementation, the multi-phase voltage regulator may comprise a second plurality of switches and the second plurality of inductors in accordance with the particular topology, and the resonant switched capacitor voltage divider arrangement may comprise the first plurality of inductors, a first plurality of switches and a first plurality of capacitors in accordance with the particular topology.

In an implementation, a multi-stage hybrid power converter may also comprise a control arrangement to control an operation of the resonant switched capacitor voltage divider arrangement and the multi-phase voltage regulator arrangement. In an implementation, a substantial majority of current provided by the resonant switched capacitor voltage divider arrangement to the intermediate bus may be received at the first node of the multi-phase voltage regulator arrangement.

Further, in an implementation, the resonant switched capacitor voltage divider arrangement may comprise a plurality of interleaved structures individually including at least one capacitor of the first plurality of capacitors and at least one of the plurality of switches in accordance with the particular topology, and the multi-phase voltage regulator arrangement may comprise a plurality of interleaved structures individually including at least one inductor of the second plurality of inductors and at least one switch of the second plurality of switches in accordance with the particular topology. In an implementation, the at least one inductor of the second plurality of inductors of the respective individual interleaved structures of the multi-phase voltage regulator arrangement may operate as dc inductors with significant dc average current level and relatively small peak-to-peak current level.

In an implementation, the resonant switched capacitor arrangement may comprise at least one inductor of the plurality of inductors to resonate with a plurality of capacitors of the resonant switched capacitor arrangement such that the plurality of capacitors may charge with current in a substantially and/or partially sinusoidal manner. Also, in an implementation, at least one inductor of the plurality of inductors and one or more capacitors of a plurality of capacitors of the resonant switched capacitor arrangement may form one or more low impedance current paths to facilitate ripple cancellation. Additionally, in an implementation, the resonant switched capacitor arrangement may produce a substantially trapezoidal wave current having a lower peak and/or RMS value to occur at least partially due to the particular topology. In an implementation, a plurality of capacitors of the resonant switched capacitor voltage divider arrangement may be charged with current provided at least in part by the second plurality of inductors of the regulator arrangement.

In an implementation, the particular topology may include a motherboard and first and second daughter boards stacked over the motherboard, wherein power may be vertically delivered from the first daughter board comprising the resonant switch capacitor arrangement, at least in part, to the second daughter board comprising the regulator arrangement, at least in part, and the power may further be delivered from the regulator arrangement on the second daughter board to the motherboard, wherein the first and second daughter boards and the motherboard may be coupled via one or more vertical connectors.

In an implementation, the regulator arrangement may receive a lower voltage at the second node of the regulator arrangement, and the regulator arrangement may generate a second intermediate voltage on the first node of the regulator arrangement based at least in part on the received lower voltage. In an implementation, the second intermediate voltage may be received at the second node of the resonant switched capacitor arrangement, and the resonant switched capacitor arrangement may generate a higher voltage on the first node of the resonant switched capacitor arrangement based at least in part on the second intermediate voltage.

As mentioned, particular implementations, power converters 4270, for example, may include at least some aspects of multi-stage hybrid power converters, such as example implementations described herein. Embodiments of multi-stage hybrid power converters, for example, may comprise an apparatus to convert a first voltage into a second voltage, In an implementation, the apparatus may comprise a controller to generate one or more control signals to at least partially control at least a deadtime interval based, at least in part, on a periodic signal. The apparatus may further include a hybrid switched capacitor power converter comprising a switched capacitor arrangement to be arranged in a configuration with a voltage regulating arrangement, wherein the voltage regulating arrangement may comprise one or more structures individually including at least a first terminal of a first switch of a plurality of switches coupled to an input node of the voltage regulating arrangement, at least a first capacitor coupled across at least a second switch of the plurality of switches, at least a first inductor coupled between a second terminal of the at least the second switch of the plurality of switches and an output node of the voltage regulating arrangement, and at least a second capacitor coupled between the output node of the voltage regulating arrangement.

In an implementation, the one or more structures of the voltage regulating arrangement may comprise one or more series capacitor buck structures. In an implementation, the one or more series capacitor buck structures may comprise a series-input parallel-output configuration. In an implementation, the series-input parallel-output configuration of the one or more series capacitor buck structures may decouple at least in part a voltage stress on an input node of the voltage regulating arrangement from a current stress on an output node of the voltage regulating arrangement.

In an implementation, the switched capacitor arrangement may comprise a resonant switched capacitor arrangement. Also, in an implementation, the resonant switched capacitor arrangement in the configuration with the voltage regulating arrangement may facilitate soft-charging or soft-switching, or a combination thereof, of the resonant switched capacitor arrangement or the voltage regulating arrangement, or a combination thereof, based at least in part on an intermediate voltage to be coupled between the resonant switch capacitor arrangement and the voltage regulating arrangement. In an implementation, charge sharing between at least some capacitors of a plurality of capacitors of the hybrid switched capacitor power converter may be implemented, at least in part, via a duty ratio to be controlled by the controller, and the controller may further calculate and/or control a phase delay of the one or more control signals.

Embodiments of multi-stage hybrid power converters, such as power converters 4270, for example, may include a switched capacitor arrangement and a regulator in an electrical configuration with the switched capacitor arrangement. In an implementation, the electrical configuration may include an intermediate bus to interconnect the switched capacitor arrangement and the regulator. Further, in an implementation, a first node of the switched capacitor arrangement may be coupled to a first voltage supply node, wherein the switched capacitor arrangement is operable to provide a first intermediate voltage to a first node of the regulator via the intermediate bus, wherein the switched capacitor arrangement may comprise a plurality of structures individually including at least one inductor, at least one capacitor, and at least one additional capacitor or inductor, and wherein the regulator may generate a regulated voltage at a second node of the regulator based at least in part on the first intermediate voltage.

In an implementation, individual frequencies of individual current signals through the at least one inductors of the respective individual structures of the switched capacitor arrangement may differ one from another. Also, in an implementation, the regulator may generate a regulated voltage at a second node of the regulator based at least in part on the first intermediate voltage and further based at least in part on a particular topology of the regulator. In an implementation, the plurality of structures of the switched capacitor arrangement may be electrically coupled in parallel. Further, in an implementation, the plurality of structures of the switched capacitor arrangement may comprise a first structure including a first inductor coupled in series with a first capacitor and a second structure including a second inductor coupled in series with a second capacitor, wherein a first frequency of a first current signal through the first inductor may be approximately an integer multiple of a second frequency of a second current signal through the second inductor. Also, in an implementation, the apparatus may further comprise a controller to generate timing signals to affect operation of the plurality of structures of the switched capacitor arrangement, wherein the plurality of structures of the switched capacitor arrangement may, based at least in part on the timing signals, suppress ripple of an intermediate current at a second node of the switched capacitor arrangement.

Figure 43:
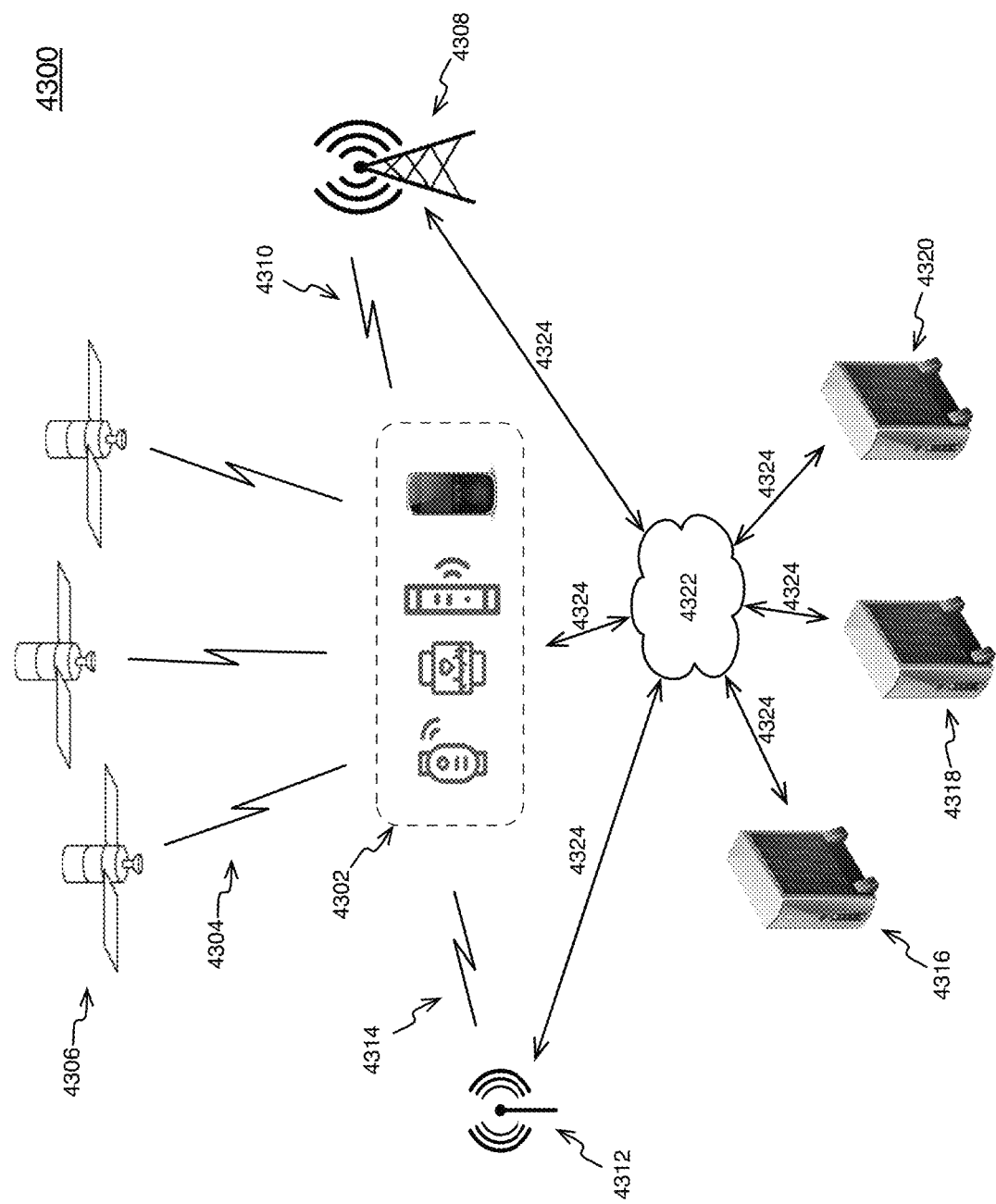
FIG. 43 is a schematic block diagram depicting an embodiment of an example system including one or more server computing devices and/or one or more IoT-type devices.

FIG. 43 is a schematic diagram illustrating features associated with an implementation of an example operating environment 4300 capable of facilitating and/or supporting one or more operations and/or techniques for infrastructure for updating and/or managing IoT-type devices, illustrated generally herein at 4302. As was indicated, the IoT is typically a system of interconnected and/or internetworked physical devices in which computing may be embedded into hardware so as to facilitate and/or support devices' abilities to acquire, collect and/or communicate content over one or more communications networks, for example, at times, without human participation and/or interaction. As mentioned, IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio and/or video devices, personal navigation devices, and/or the like.

It should be appreciated that operating environment 4300 is described herein as a non-limiting example that may be implemented, in whole or in part, in a context of various wired and/or wireless communications networks and/or any suitable portion and/or combination of such networks. Thus, for a particular implementation, one or more operations and/or techniques for updating and/or managing IoT-type devices may be performed, at least in part, in an indoor environment and/or an outdoor environment, or any combination thereof.

Thus, as illustrated, in a particular implementation, one or more IoT-type devices 4302 may, for example, receive and/or acquire satellite positioning system (SPS) signals 4304 from SPS satellites 4306. In some instances, SPS satellites 4306 may be from a single global navigation satellite system (GNSS), such as the GPS or Galileo satellite systems, for example. In other instances, SPS satellites 4306 may be from multiple GNSS such as, but not limited to, GPS, Galileo, Glonass, or Beidou (Compass) satellite systems, for example. In certain implementations, SPS satellites 4306 may be from any one several regional navigation satellite systems (RNSS) such as, for example, WAAS, EGNOS, QZSS, just to name a few examples.

At times, one or more IoT-type devices 4302 may, for example, transmit wireless signals to and/or receive wireless signals from a suitable wireless communication network. In one example, one or more IoT-type devices 4302 may communicate with a cellular communication network, such as by transmitting wireless signals to and/or receiving wireless signals from one or more wireless transmitters capable of transmitting and/or receiving wireless signals, such as a base station transceiver 4308 over a wireless communication link 4310, for example. Similarly, one or more IoT-type devices 4302 may transmit wireless signals to and/or receive wireless signals from a local transceiver 4312 over a wireless communication link 4314, for example. Base station transceiver 4308, local transceiver 4312, etc. may be of the same or similar type, for example, and/or may represent different types of devices, such as access points, radio beacons, cellular base stations, femtocells, an access transceiver device, or the like, depending on an implementation. Similarly, local transceiver 4312 may comprise, for example, a wireless transmitter and/or receiver capable of transmitting and/or receiving wireless signals. For example, at times, wireless transceiver 4312 may be capable of transmitting and/or receiving wireless signals from one or more other terrestrial transmitters and/or receivers.

In a particular implementation, local transceiver 4312 may, for example, be capable of communicating with one or more IoT-type devices 4302 at a shorter range over wireless communication link 4314 than at a range established via base station transceiver 4308 over wireless communication link 4310. For example, local transceiver 4312 may be positioned in an indoor or like environment and/or may provide access to a wireless local area network (WLAN, e.g., IEEE Std. 802.11 network, etc.) and/or wireless personal area network (WPAN, e.g., Bluetooth® network, etc.). In another example implementation, local transceiver 4312 may comprise a femtocell and/or picocell capable of facilitating communication via link 4314 according to an applicable cellular or like wireless communication protocol. Again, it should be understood that these are merely examples of networks that may communicate with one or more IoT-type devices 4302 over a wireless link, and claimed subject matter is not limited in this respect. For example, in some instances, operating environment 4300 may include a larger number of base station transceivers 4308, local transceivers 4312, networks, terrestrial transmitters and/or receivers, etc.

In an implementation, one or more IoT-type devices 4302, base station transceiver 4308, local transceiver 4312, etc. may, for example, communicate with one or more servers, referenced herein at 4316, 4318, and 4320, over a network 4322, such as via one or more communication links 4324. Network 4322 may comprise, for example, any combination of wired and/or wireless communication links. In a particular implementation, network 4322 may comprise, for example, Internet Protocol (IP)-type infrastructure capable of facilitating or supporting communication between one or more IoT-type devices 4302 and one or more servers 4316, 4318, 4320, etc. via local transceiver 4312, base station transceiver 4308, directly, etc. In another implementation, network 4322 may comprise, for example cellular communication network infrastructure, such as a base station controller and/or master switching center to facilitate and/or support mobile cellular communication with one or more IoT-type devices 4302. Servers 4316, 4318 and/or 4320 may comprise any suitable servers or combination thereof capable of facilitating or supporting one or more operations and/or techniques discussed herein. For example, servers 4316, 4318 and/or 4320 may comprise one or more update servers, back-end servers, management servers, archive servers, location servers, positioning assistance servers, navigation servers, map servers, crowdsourcing servers, network-related servers, or the like. In particular implementations, servers 4316, 4318 and/or 4320 may be supplied power by one or more example power converters such as described herein, for example.

Even though a certain number of computing platforms and/or devices are illustrated herein, any number of suitable computing platforms and/or devices may be implemented to facilitate and/or support one or more techniques and/or processes associated with operating environment 4300. For example, at times, network 4322 may be coupled to one or more wired and/or wireless communication networks (e.g., WLAN, etc.) so as to enhance a coverage area for communications with one or more IoT-type devices 4302, one or more base station transceivers 4308, local transceiver 4312, servers 4316, 4318, 4320, or the like. In some instances, network 4322 may facilitate and/or support femtocell-based operative regions of coverage, for example. Again, these are merely example implementations, and claimed subject matter is not limited in this regard.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

A "signal measurement" and/or a "signal measurement vector" may be referred to respectively as a "random measurement" such that the term "random" may be understood in context with respect to the fields of probability, random variables and/or stochastic processes. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, ultrabooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

Although claimed subject matter is not in particular limited in scope to the Internet and/or to the Web; nonetheless, the Internet and/or the Web may without limitation provide a useful example of an embodiment at least for purposes of illustration.

It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 5G, 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 44:
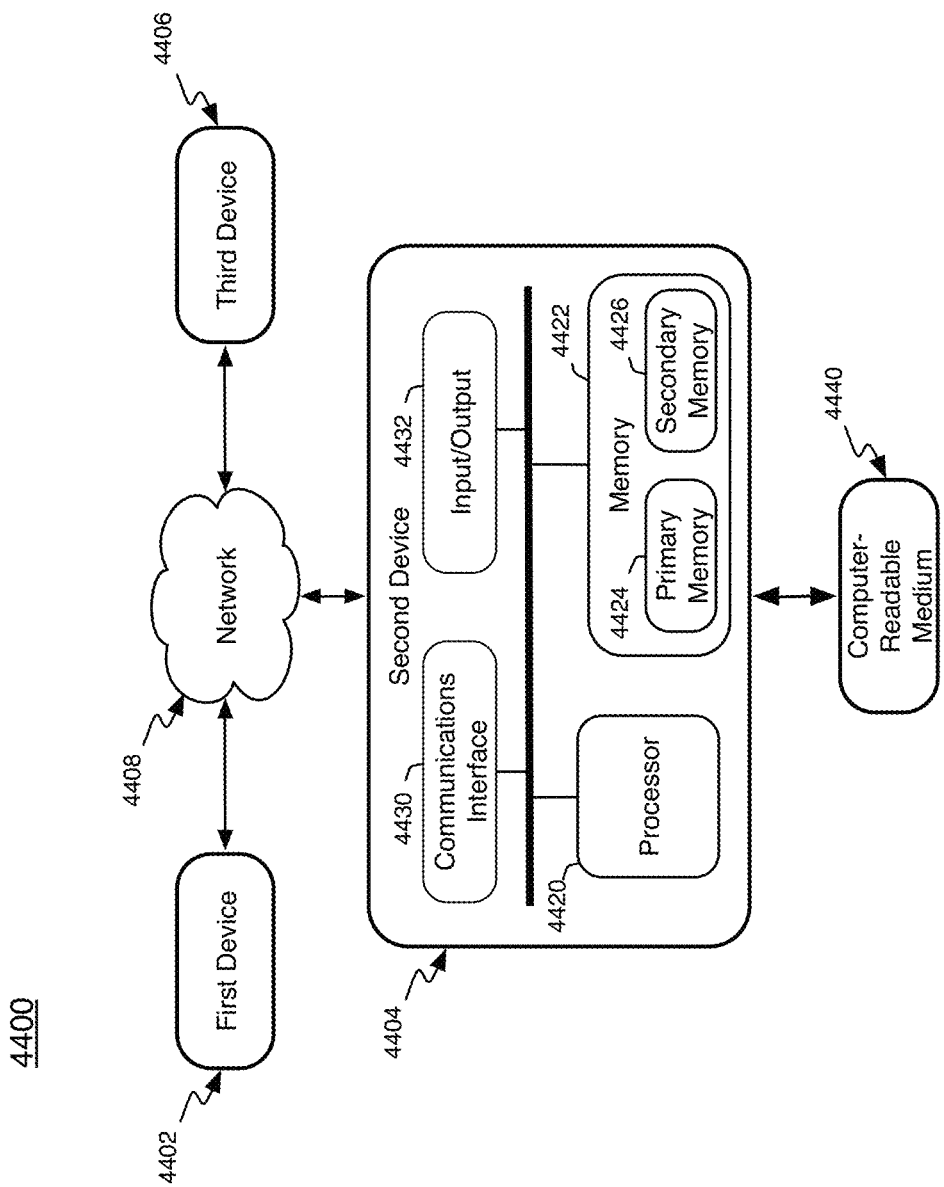
FIG. 44 is a schematic block diagram illustrating an embodiment of an example computing device.

In one example embodiment, as shown in FIG. 44, a system embodiment may comprise a local network (e.g., device 4404 and medium 4440) and/or another type of network, such as a computing and/or communications network. For purposes of illustration, therefore, FIG. 44 shows an embodiment 4400 of a system that may be employed to implement either type or both types of networks. Network 208 may comprise one or more network connections, links, processes, services, applications, and/or resources to facilitate and/or support communications, such as an exchange of communication signals, for example, between a computing device, such as 4402, and another computing device, such as 4406, which may, for example, comprise one or more client computing devices and/or one or more server computing device. By way of example, but not limitation, network 4408 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 44 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU), digital signal processor (DSP) or graphics processing unit (GPU), or any combination thereof, of a computing device which may include a control unit and an execution unit. In some implementations, a processor may combine elements and/or functionality of one or more CPUs, one or more GPUs and/or one or more DSPs, for example. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in some of the various figures and in the text associated with the various figures of the present patent application.

Referring now to FIG. 44, in an embodiment, first and third devices 4402 and 4406 may be capable of rendering a graphical user interface (GUI) for a network device and/or a computing device, for example, so that a user-operator may engage in system use. Device 4404 may potentially serve a similar function in this illustration. Likewise, in FIG. 44, computing device 4402 ('first device' in figure) may interface with computing device 4404 ('second device' in figure), which may, for example, also comprise features of a client computing device and/or a server computing device, in an embodiment. Processor (e.g., processing device) 4420 and memory 4422, which may comprise primary memory 4424 and secondary memory 4426, may communicate by way of a communication bus 4415, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 4404, as depicted in FIG. 44, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX).

In FIG. 44, computing device 4402 may provide one or more sources of executable computer instructions in the form physical states and/or signals (e.g., stored in memory states), for example. Computing device 4402 may communicate with computing device 4404 by way of a network connection, such as via network 4408, for example. As previously mentioned, a connection, while physical, may not necessarily be tangible. Although computing device 4404 of FIG. 44 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

In particular implementations, one or more of computing devices 4402, 4404 and/or 4406 may include one or more power converter circuits, such as one or more example circuits described herein. In particular implementations, multi-stage power converter circuits, such as one or more example circuits described herein, may be utilized to provide power to any of a wide range of circuit types, processors, memory devices, communication interfaces, etc. Further, in particular implementations, one or more of computing devices 4402, 4404 and/or 4406 may include circuitry, processors, oscillators, etc., to control various functionalities and/or operations related to multi-stage power converters. Of course, embodiments are limited in scope in these respects.

Memory 4422 may comprise any non-transitory storage mechanism. Memory 4422 may comprise, for example, primary memory 4424 and secondary memory 4426, additional memory circuits, mechanisms, or combinations thereof may be used. Memory 4422 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 4422 may be utilized to store a program of executable computer instructions. For example, processor 4420 may fetch executable instructions from memory and proceed to execute the fetched instructions. Memory 4422 may also comprise a memory controller for accessing device readable-medium 4440 that may carry and/or make accessible digital content, which may include code, and/or instructions, for example, executable by processor 4420 and/or some other device, such as a controller, as one example, capable of executing computer instructions, for example. Under direction of processor 4420, a non-transitory memory, such as memory cells storing physical states (e.g., memory states), comprising, for example, a program of executable computer instructions, may be executed by processor 4420 and able to generate signals to be communicated via a network, for example, as previously described. Generated signals may also be stored in memory, also previously suggested.

Memory 4422 may store electronic files and/or electronic documents, such as relating to one or more users, and may also comprise a computer-readable medium that may carry and/or make accessible content, including code and/or instructions, for example, executable by processor 4420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 44, processor 4420 may comprise one or more circuits, such as digital circuits, to perform at least a portion of a computing procedure and/or process. By way of example, but not limitation, processor 4420 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 4420 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 44 also illustrates device 4404 as including a component 4432 operable with input/output devices, for example, so that signals and/or states may be appropriately communicated between devices, such as device 4404 and an input device and/or device 4404 and an output device.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
    a resonant switched capacitor arrangement having a first node and a second node, the resonant switched capacitor arrangement to include a first plurality of inductors to be coupled to the second node; and
    a regulator arrangement having a second plurality of inductors in an electrical configuration with the resonant switched capacitor arrangement;
    wherein the first node of the resonant switched capacitor arrangement to be coupled to a first voltage supply node, wherein the resonant switched capacitor arrangement is operable to provide, via the second node of the resonant switched capacitor arrangement, a first intermediate voltage based at least in part on a particular topology;
    wherein the regulator arrangement to receive the first intermediate voltage at a first node of the regulator arrangement and wherein the regulator arrangement to generate a regulated voltage at a second node of the regulator arrangement based, at least in part, on the electrical configuration and the particular topology;
    wherein the resonant switched capacitor arrangement to produce a substantially trapezoidal wave current having a lower peak and/or RMS value to occur at least partially due to the particular topology.

2. The apparatus of claim 1, wherein, during operation, the regulator arrangement to affect, at least in part, charging or discharging, or a combination thereof, of a plurality of capacitors of the resonant switched capacitor arrangement.

3. The apparatus of claim 1, wherein the second plurality of inductors comprise coupled inductors.

4. The apparatus of claim 1, wherein the regulator arrangement comprises a series capacitor buck converter.

5. The apparatus of claim 4, wherein the series capacitor buck converter comprises a four-level series capacitor buck converter.

6. The apparatus of claim 1, wherein the electrical configuration to include an intermediate bus to interconnect the resonant switched capacitor arrangement and the regulator arrangement.

7. The apparatus of claim 6, wherein at most about 10% of current provided by the resonant switched capacitor arrangement to the intermediate bus is conducted through a decoupling capacitor away from the intermediate bus.

8. The apparatus of claim 6, wherein the intermediate bus to comprise a substantially non-capacitive power path to be formed between the second node of the resonant switched capacitor arrangement and the first node of the regulator arrangement to exclude capacitors.

9. The apparatus of claim 6, wherein the resonant switched capacitor arrangement to comprise a resonant switched capacitor voltage divider arrangement.

10. The apparatus of claim 9, wherein the regulator arrangement to comprise a multi-phase voltage regulator arrangement.

11. The apparatus of claim 10, wherein the multi-phase voltage regulator to comprise a second plurality of switches and the second plurality of inductors in accordance with the particular topology, and wherein the resonant switched capacitor voltage divider arrangement to comprise the first plurality of inductors, a first plurality of switches and a first plurality of capacitors in accordance with the particular topology.

12. The apparatus of claim 11, further comprising a control arrangement to control an operation of the resonant switched capacitor voltage divider arrangement and the multi-phase voltage regulator arrangement.

13. The apparatus of claim 12, wherein a substantial majority of current provided by the resonant switched capacitor voltage divider arrangement to the intermediate bus is received at a first node of the multi-phase voltage regulator arrangement.

14. The apparatus of claim 11 , wherein the resonant switched capacitor voltage divider arrangement to comprise a plurality of interleaved structures individually comprising at least one capacitor of the first plurality of capacitors and at least one of the plurality of switches in accordance with the particular topology, and wherein the multi-phase voltage regulator arrangement to comprise a plurality of interleaved structures individually comprising at least one inductor of the second plurality of inductors and at least one switch of the second plurality of switches in accordance with the particular topology.

15. The apparatus of claim 14, wherein the at least one inductor of the second plurality of inductors of the respective individual interleaved structures of the multi-phase voltage regulator arrangement to operate as dc inductors with significant dc average current level and relatively small peak-to-peak current level.

16. The apparatus of claim 1, wherein the resonant switched capacitor arrangement to comprise at least one inductor of the first plurality of inductors to resonate with a plurality of capacitors of the resonant switched capacitor arrangement such that the plurality of capacitors to charge with current in a substantially and/or partially sinusoidal manner.

17. The apparatus of claim 1, wherein at least one inductor of the first plurality of inductors and one or more capacitors of a plurality of capacitors of the resonant switched capacitor arrangement to form one or more low impedance current paths to facilitate ripple cancellation.

18. The apparatus of claim 1, wherein a plurality of capacitors of the resonant switched capacitor arrangement to be charged with current provided at least in part by the second plurality of inductors of the regulator arrangement.

19. The apparatus of claim 18, wherein the particular topology to include a motherboard and first and second daughter boards stacked over the motherboard, wherein power is to be vertically delivered from the first daughter board comprising the resonant switch capacitor arrangement, at least in part, to the second daughter board comprising the regulator arrangement, at least in part, and is further to be delivered from the regulator arrangement on the second daughter board to the motherboard, the first and second daughter boards and the motherboard to be coupled via one or more vertical connectors.

20. An apparatus to convert a first voltage into a second voltage, the apparatus comprising:
 a controller to generate one or more control signals to at least partially control at least a deadtime interval based, at least in part, on a periodic signal; and
 a hybrid switched capacitor power converter comprising a switched capacitor arrangement to be arranged in a configuration with a voltage regulating arrangement, wherein the voltage regulating arrangement to comprise one or more structures individually comprising at least a first terminal of a first switch of a plurality of switches coupled to an input node of the voltage regulating arrangement, at least a first capacitor coupled to at least a second switch of the plurality of switches, at least a first inductor coupled between a second terminal of the at least the second switch of the plurality of switches and an output node of the voltage regulating arrangement, and at least a second capacitor coupled to the output node of the voltage regulating arrangement.

21. The apparatus of claim 20, wherein the one or more structures of the voltage regulating arrangement to comprise one or more series capacitor buck structures.

22. The apparatus of claim 21, wherein the one or more series capacitor buck structures to comprise a series-input parallel-output configuration.

23. The apparatus of claim 22, wherein the series-input parallel-output configuration of the one or more series capacitor buck structures to decouple at least in part a voltage stress on an input node of the voltage regulating arrangement from a current stress on an output node of the voltage regulating arrangement.

24. The apparatus of claim 20, wherein the switched capacitor arrangement to comprise a resonant switched capacitor arrangement.

25. The apparatus of claim 24, wherein the resonant switched capacitor arrangement in the configuration with the voltage regulating arrangement to facilitate soft-charging or soft-switching, or a combination thereof, of the resonant switched capacitor arrangement or the voltage regulating arrangement, or a combination thereof, based at least in part on an intermediate voltage to be coupled between the resonant switch capacitor arrangement and the voltage regulating arrangement.

26. The apparatus of claim 20, wherein charge sharing between at least some capacitors of a plurality of capacitors of the hybrid switched capacitor power converter is to be implemented, at least in part, via a duty ratio to be controlled by the controller, and wherein the controller further to calculate and/or control a phase delay of the one or more control signals.

27. An apparatus, comprising:
a switched capacitor arrangement; and
a regulator in an electrical configuration with the switched capacitor arrangement, wherein the electrical configuration to include an intermediate bus to interconnect the switched capacitor arrangement and the regulator;
wherein a first node of the switched capacitor arrangement to be coupled to a first voltage supply node, wherein the switched capacitor arrangement is operable to provide a first intermediate voltage to a first node of the regulator via the intermediate bus,
wherein the switched capacitor arrangement to comprise a plurality of structures individually including at least one inductor, at least one capacitor, and at least one additional capacitor or inductor; and
wherein the regulator to generate a regulated voltage at a second node of the regulator based at least in part on the first intermediate voltage.

28. The apparatus of claim 27, wherein individual frequencies of individual current signals through the at least one inductors of the respective individual structures of the switched capacitor arrangement to differ one from another.

29. The apparatus of claim 27, wherein the regulator to generate a regulated voltage at a second node of the regulator based at least in part on the first intermediate voltage and further based at least in part on a particular topology of the regulator.

30. The apparatus of claim 27, wherein the plurality of structures of the switched capacitor arrangement are electrically coupled in parallel.

31. The apparatus of claim 27, wherein the plurality of structures of the switched capacitor arrangement to comprise a first structure comprising a first inductor coupled in series with a first capacitor and a second structure comprising a second inductor coupled in series with a second capacitor, wherein a first frequency of a first current signal through the first inductor is approximately an integer multiple of a second frequency of a second current signal through the second inductor.

32. The apparatus of claim 27, further comprising a controller to generate timing signals to affect operation of the plurality of structures of the switched capacitor arrangement, wherein the plurality of structures of the switched capacitor arrangement to, based at least in part on the timing signals, suppress ripple of an intermediate current at a second node of the switched capacitor arrangement.

33. The apparatus of claim 27, wherein the capacitor is coupled in series to the inductor, the capacitor is coupled to a first terminal of the additional capacitor, and the inductor is coupled to a second terminal of the additional capacitor.

34. The apparatus of claim 33, further comprising a second additional capacitor coupled in series to the additional inductor, wherein the second additional capacitor is coupled to a terminal of the capacitor and the additional inductor is coupled to a terminal of the inductor.

35. The apparatus of claim 27, wherein the capacitor is coupled in series to the inductor, the capacitor is coupled to a first terminal of the additional inductor, and the inductor is coupled to a second terminal of the additional inductor.

36. The apparatus of claim 35, further comprising a second additional inductor coupled in series to the additional capacitor, wherein the second additional inductor is coupled to a terminal of the inductor and the additional capacitor is coupled to a terminal of the capacitor.

37. An apparatus, comprising:
a resonant switched capacitor arrangement having a first node and a second node, the resonant switched capacitor arrangement to include a first plurality of inductors to be coupled to the second node; and
a regulator arrangement having a second plurality of inductors in an electrical configuration with the resonant switched capacitor arrangement;
wherein a first node of the regulator arrangement to be coupled to a first voltage supply node, wherein the regulator arrangement is operable to provide, via a second node of the regulator arrangement, a first intermediate voltage based at least in part on a particular topology;
wherein the resonant switched capacitor arrangement to receive the first intermediate voltage at the first node of the resonant switched capacitor arrangement and wherein the resonant switched capacitor arrangement to generate a regulated voltage at the second node of the resonant switched capacitor arrangement based, at least in part, on the electrical configuration and the particular topology.

38. The apparatus of claim 27, wherein the capacitor is coupled in parallel to the inductor, the capacitor and the inductor coupled in series to the additional capacitor.

39. The apparatus of claim 27, wherein the capacitor is coupled in parallel to the inductor, the capacitor and the inductor coupled in series to the additional inductor.

40. The apparatus of claim 37, wherein, during operation, the regulator arrangement to affect, at least in part, charging or discharging, or a combination thereof, of a plurality of capacitors of the resonant switched capacitor arrangement.

41. The apparatus of claim 37, wherein the second plurality of inductors comprise coupled inductors.

42. The apparatus of claim 37, wherein the regulator arrangement comprises a series capacitor buck converter.

43. The apparatus of claim 42, wherein the series capacitor buck converter comprises a four-level series capacitor buck converter.

44. The apparatus of claim 37, wherein the electrical configuration to include an intermediate bus to interconnect the resonant switched capacitor arrangement and the regulator arrangement.

45. The apparatus of claim 44, wherein at most about 10% of current provided to the resonant switched capacitor arrangement from the intermediate bus is conducted through a decoupling capacitor away from the intermediate bus.

46. The apparatus of claim 44, wherein the intermediate bus to comprise a substantially non-capacitive power path to be formed between the first node of the resonant switched capacitor arrangement and the second node of the regulator arrangement to exclude capacitors.

47. The apparatus of claim 44, wherein the resonant switched capacitor arrangement to comprise a resonant switched capacitor voltage divider arrangement.

48. The apparatus of claim 47, wherein the regulator arrangement to comprise a multiphase voltage regulator arrangement.

49. The apparatus of claim 48, wherein the multi-phase voltage regulator to comprise a second plurality of switches and the second plurality of inductors in accordance with the particular topology, and wherein the resonant switched capacitor voltage divider arrangement to comprise the first plurality of inductors, a first plurality of switches and a first plurality of capacitors in accordance with the particular topology.

50. The apparatus of claim 49, further comprising a control arrangement to control an operation of the resonant switched capacitor voltage divider arrangement and the multi-phase voltage regulator arrangement.

51. The apparatus of claim 50, wherein a substantial majority of current provided to the resonant switched capacitor voltage divider arrangement from the intermediate bus is received at a second node of the multi-phase voltage regulator arrangement.

52. The apparatus of claim 49, wherein the resonant switched capacitor voltage divider arrangement to comprise a plurality of interleaved structures individually comprising at least one capacitor of the first plurality of capacitors and at least one of the plurality of switches in accordance with the particular topology, and wherein the multi-phase voltage regulator arrangement to comprise a plurality of interleaved structures individually comprising at least one inductor of the second plurality of inductors and at least one switch of the second plurality of switches in accordance with the particular topology.

53. The apparatus of claim 52, wherein the at least one inductor of the second plurality of inductors of the respective individual interleaved structures of the multiphase voltage regulator arrangement to operate as dc inductors with significant dc average current level and relatively small peak-to-peak current level.

54. The apparatus of claim 37, wherein the resonant switched capacitor arrangement to comprise at least one inductor of the first plurality of inductors to resonate with a plurality of capacitors of the resonant switched capacitor arrangement such that the plurality of capacitors to charge or discharge with current in a substantially and/or partially sinusoidal manner.

55. The apparatus of claim 37, wherein at least one inductor of the first plurality of inductors and one or more capacitors of a plurality of capacitors of the resonant switched capacitor arrangement to form one or more low impedance current paths to facilitate ripple cancellation.

56. The apparatus of claim 37, wherein a plurality of capacitors of the resonant switched capacitor arrangement to be charged or discharged with current provided at least in part by the second plurality of inductors of the regulator arrangement.

57. The apparatus of claim 56, wherein the particular topology to include a motherboard and first and second daughter boards stacked over the motherboard, wherein power is to be vertically delivered from the first daughter board comprising the resonant switch capacitor arrangement, at least in part, to the second daughter board comprising the regulator arrangement, at least in part, and is further to be delivered from the regulator arrangement on the second daughter board to the motherboard, the first and second daughter boards and the motherboard to be coupled via one or more vertical connectors.

* * * * *